(12) United States Patent  
Ueda et al.

(10) Patent No.: US 7,151,348 B1
(45) Date of Patent: Dec. 19, 2006

(54) MOTOR DRIVING APPARATUS

(75) Inventors: Mitsuo Ueda, Nishinomiya (JP);
Hideki Nakata, Katano (JP); Makoto Yoshida, Kusatsu (JP)

(73) Assignee: Matsushita Electric Industrila Co., Ltd., Osaka (JP)

( * ) Notice: Subject to any disclaimer, the term of this patent is extended or adjusted under 35 U.S.C. 154(b) by 337 days.

(21) Appl. No.: 10/822,805

(22) Filed: Apr. 13, 2004

(30) Foreign Application Priority Data

Apr. 14, 2003  (JP) ............................. 2003-109394

(51) Int. Cl.
*H02P 1/00* (2006.01)

(52) U.S. Cl. .......................... 318/114; 318/119; 310/12

(58) Field of Classification Search ................ 318/119, 318/126–128, 135, 686, 114; 310/12–15, 310/17, 36; 417/417
See application file for complete search history.

(56) References Cited

U.S. PATENT DOCUMENTS

| | | | |
|---|---|---|---|
| 4,150,924 A | 4/1979 | Toyoda | 417/417 |
| 4,353,220 A | 10/1982 | Curwen et al. | 62/228.1 |
| 5,342,176 A | 8/1994 | Redlich | 417/212 |
| 6,880,403 B1 * | 4/2005 | Shimada et al. | 73/652 |
| 6,960,893 B1 * | 11/2005 | Yoshida et al. | 318/127 |
| 6,977,474 B1 * | 12/2005 | Ueda et al. | 318/128 |

FOREIGN PATENT DOCUMENTS

| | | |
|---|---|---|
| EP | 0 860 933 | 8/1998 |
| EP | 1 063 760 | 12/2000 |
| EP | 1 349 265 | 10/2003 |
| JP | 8-508558 | 9/1996 |
| JP | 11-324911 | 11/1999 |
| JP | 2002-354864 | 12/2002 |
| WO | 94/23204 | 10/1994 |

* cited by examiner

*Primary Examiner*—Rina Duda
(74) *Attorney, Agent, or Firm*—Wenderoth, Lind & Ponack, L.L.P.

(57) ABSTRACT

A motor driving apparatus for driving a linear vibration motor having a spring member that supports a mover so as to form a spring vibration system including the mover. The motor driving apparatus employs an accurate spring constant of the spring member corresponding to an individual linear vibration motor at a position calculation for obtaining the position of the mover during the operation, thereby increasing the accuracy of the position calculation. The motor driving apparatus includes a mover force vibration unit for making the mover of the linear vibration motor freely vibrate, a relative position detection unit for detecting a timing when the freely vibrating mover passes through a fixed point (relative position), and a natural frequency detection unit for detecting a natural frequency of the mover based on output information from the relative position detection unit, thereby calculating the spring constant based on the detected natural frequency.

50 Claims, 13 Drawing Sheets

MOTOR DRIVING APPARATUS

FIELD OF THE INVENTION

The present invention relates to motor driving apparatuses and, more particularly, to motor driving apparatuses for driving a linear vibration motor including a mover and a spring member that supports the mover.

BACKGROUND OF THE INVENTION

Conventional equipment using linear vibration motors include vibration generators that inform of incoming calls by mechanical vibration, such as handy phones, compressors that compress and circulate gas or liquid, and reciprocating electric razors. In this specification, the handy phones refer to portable phones such as mobile phones and cellular phones. The compressors and the reciprocating electric razors use the linear vibration motors as their driving sources.

A typical linear vibration motor has a structure of a single-phase sync motor, i.e., it has a mover comprising a permanent magnet and a stator obtained by winding a coil around an iron core, and the mover reciprocates when an AC voltage is applied to the coil.

When generating vibrations by the reciprocating motion of the mover, a strong electromagnetic force is needed. However, an energy required for driving the linear vibration motor can be suppressed by forming a spring vibration system including the mover and a spring member supporting the mover. That is, in the linear vibration motor in which the mover is supported by the spring member, the spring vibration system including the mover is vibrated at its natural frequency (resonance frequency), whereby the linear vibration motor can be driven with a relatively low energy.

In the linear vibration motor, however, when the stroke length of the mover becomes larger than a predetermined allowable value, a problem such as a collision between the mover and the motor housing or breakage of the spring member may occur. Therefore, the position of the mover must be detected and controlled.

Japanese Published Patent Application No. Hei.11-324911 discloses a driving apparatus for driving a linear vibration motor, which includes a detector such as a position sensor for detecting the position of the mover of the linear vibration motor, and reduces the output of the linear vibration motor when the stroke length of the mover becomes larger than a predetermined allowable value, i.e., decreases the amplitude value of the voltage or current applied to the linear vibration motor, thereby preventing the linear vibration motor from being broken due to collision between the mover and the motor housing or extension of the spring member over a critical value.

As the above-mentioned position detector, there is employed a sensor that can detect the degree of displacement of the mover (the mover displacement amount) with respect to a mover reference position such as a mover neutral position without contacting the mover of the linear vibration motor. For example, a displacement gauge using an eddy current system, a displacement gauge using a differential transformer, or the like is employed.

However, when such sensor is employed, not only the production cost of the linear vibration motor is increased but also a space for mounting the sensor is needed, which leads to an increase in the size of the housing of the linear vibration motor. Further, when considering the compressor as an application of the linear vibration motor, such sensor may be used with being exposed to a high-temperature and high-pressure gas. Therefore, a problem on reliability of the sensor itself occurs, in other words, a sensor that can be reliably used in high-temperature and high-pressure atmospheres is required.

So, as a method for detecting the position of the piston, there is proposed a method of directly measuring the linear motor driving current and voltage which are supplied to the linear vibration motor, and deriving the position of the mover on the basis of the measured values, without using a position sensor placed in the linear vibration motor (refer to Japanese Unexamined Patent Publication No.Hei.8-508558).

Hereinafter, a description will be given of the mover position detection method used for a linear vibration motor, which is described in the above-mentioned application. The linear vibration motor described in this application is applied to a linear compressor. Therefore, this application describes a case where a mover that reciprocates within a cylinder so as to compress gas in the cylinder constituting the linear compressor is prevented from colliding against a cylinder head.

FIG. 11 is a diagram illustrating an equivalent circuit of a linear vibration motor for driving a mover.

In FIG. 11, L indicates an equivalent inductance [H] of a coil as a component of the linear vibration motor, and R indicates an equivalent resistor [Ω] of the coil. V indicates an instantaneous voltage [V] applied to the linear vibration motor, and I indicates a current [A] applied to the linear vibration motor. Further, α×v indicates a induced electromotive voltage [V] which is generated when the linear motor is driven, wherein α is a thrust constant [N/A] of the linear vibration motor, and v is an instantaneous velocity [m/s] of the linear vibration motor.

Here, the thrust constant α of the linear vibration motor indicates a force [N] which is generated when a unit current [A] is passed through the linear vibration motor. While the unit of the thrust constant α is expressed by [N/A], this unit is equivalent to [Wb/m] or [V·s/m].

The equivalent circuit shown in FIG. 11 is derived from Kirchhoff's law, and an instantaneous velocity v [m/s] of the linear vibration motor is obtained from the equivalent circuit.

That is, under the state where a driving voltage is applied to the linear vibration motor, the voltage (V) applied to the linear vibration motor is balanced with the sum of a dropped voltage (I×R) [V] due to the equivalent resistance of the coil of the linear vibration motor, a dropped voltage (L·dI/dt)[V] due to the equivalent inductance of the coil, and the induced electromotive voltage (α×v) [V] generated when driving the linear vibration motor, and then the following formula (1) is derived.

$$v = \frac{1}{\alpha}\left(V - R \times I - L\frac{dI}{dt}\right) \qquad \text{Formula (1)}$$

The coefficients α[N/A], R[Ω], and L[H] used in formula (1) are constants unique to the motor, and these constants are known values. Accordingly, the instantaneous velocity v[m/s] can be obtained from these constants and the applied voltage V[V] and current I[A] which are measured, on the basis of formula (1).

Further, the mover displacement (a distance from an undefined reference position to the mover) x[m] is obtained by time integration of the instantaneous velocity v[m/s] as shown by the following formula (2). In formula (2), the constant Const. is a mover displacement at the start of the integration.

$$x = \int v\,dt + \text{Const.} \qquad \text{Formula (2)}$$

As described above, in the mover position detection method as proposed in the above application, the measured value V of the applied voltage and the measured value I of the applied current associated with the linear vibration motor are subjected to arithmetic processing including differentiation based on formula (1) to obtain the instantaneous velocity v of the mover, and further, the instantaneous velocity v is subjected to arithmetic processing including integration based on formula (2), whereby the mover displacement x can be obtained.

However, the mover displacement x obtained by the arithmetic processing based on formulae (1) and (2) is a displacement with respect to a certain position on the mover axis, and it is impossible to obtain a distance from the cylinder head which may be collided by the mover to the mover top dead point, directly from the displacement x.

To be more specific, when the compressor to which the linear vibration motor is applied is under a loaded condition, the mover center position (mover amplitude center position) in the mover reciprocating motion is offset with respect to the mover neutral position (i.e., the mover amplitude center position when the pressure in the compression chamber is equal to the back pressure) due to the pressure of a cooling medium gas, and the mover reciprocates around the offset mover amplitude center position. In other words, the mover displacement x obtained by formula (2) includes an average component.

However, every actual analog or digital integrator does not perform ideal integration processing for outputting a perfect response signal with respect to a constant or a DC input, but it is restricted in responding to a DC input. Therefore, an actual integrator cannot subject the mover displacement x to integration processing in which its average component is reflected. The reason why the DC response of the actual integrator is restricted is because the output of the integrator should be prevented from being saturated by unavoidable DC components in the input signal.

As a result, the mover displacement x[m] obtained by the integration processing based on formula (2) using the actual integrator is not a displacement from which an actual distance between the mover and the housing cannot be obtained directly, but a displacement simply indicating the mover position with reference to a certain point on the mover axis.

Therefore, the mover displacement x[m] obtained from formula (2) is converted into a mover displacement x' indicating a mover position with respect to the mover amplitude center position. Further, using the converted mover displacement x', arithmetic processing for obtaining a mover displacement xav" with reference to the cylinder head, which indicates the mover amplitude center position, is carried out.

Hereinafter, these arithmetic processings will be described in more detail.

FIG. 12 is diagram schematically illustrating the mover position in the linear vibration motor housing (the cylinder in this case).

In this figure, Me denotes a mover, and Mc denotes an inner wall (cylinder inner surface) of the linear vibration motor housing that contains the mover.

Initially, three coordinate systems shown in FIG. 12, i.e., a first coordinate system X, a second coordinate system X', and a third coordinate system X", will be briefly described.

The first coordinate system X is a coordinate system expressing the mover displacement x and it has, as an origin (x=0), a certain point Paru on the mover axis. Accordingly, the absolute value of the displacement x indicates the distance from the point Paru to the mover front end position P.

The second coordinate system X' is a coordinate system expressing the mover displacement x' and it has, as an origin (x'=0), the mover amplitude center position Pav. Accordingly, the absolute value of the displacement x' indicates the distance from the amplitude center position Pav to the mover front end position P.

The third coordinate system X" is a coordinate system expressing the mover displacement x" and it has, as an origin (x"=0), the cylinder head position Psh on the mover axis. Accordingly, the absolute value of the displacement x" indicates the distance from the cylinder head position Psh to the mover front end position P.

Next, an arithmetic operation for obtaining the mover displacement x" will be described.

A mover position (mover top dead point position) Ptd in which the mover is closest to the cylinder head is indicated by a displacement xtd on the first coordinate system X, and a mover position (mover bottom dead point position) Pbd in which the mover is farthest from the cylinder head is indicated by a displacement xbd on the first coordinate system X. Then, a mover stroke Lps[m] is obtained from a difference between the displacement xtd corresponding to the mover top dead point position Ptd on the first coordinate system X and the displacement xbd corresponding to the mover bottom dead point position Pbd on the first coordinate system X.

Further, the mover amplitude center position Pav in the state where the mover is reciprocating is a position which is apart from the displacement xtd of the mover position (mover top dead point position) Ptd in which the mover is the closest to the cylinder head, by a length (Lps/2) equal to half the mover stroke Lps[m], away from the cylinder head. Accordingly, the mover amplitude center position Pav is expressed by a displacement xav (=(xbd−xtd)/2) on the first coordinate system X.

Further, when the constant Const. in formula (2) is 0, a new function that indicates the mover front end position P by the mover displacement x'[m] is derived with the mover amplitude center position Pav as a reference (origin), in other words, on the second coordinate system X'.

Subsequently, a description will be given of a method for obtaining the mover displacement xav" indicating a distance from the cylinder head position Psh to the mover amplitude center position Pav on the third coordinate system X" with the cylinder head position Psh as an origin.

Under the state where the linear compressor draws in a cooling medium gas (suction state), i.e., under the state where the inlet valve is open, both of the pressure in the compression chamber and the pressure on the back of the mover are equal to the cooling medium inlet pressure. This is because the linear compressor is constructed so that the differential pressure becomes zero under the state where the inlet valve is open. In this state, a force from the pressure of the cooling medium that acts on the mover can be ignored. That is, in this state, the forces acting on the mover are only the repulsive force of the spring that is generated by bending of the support spring and the electromagnetic force that is generated by applying a current to the linear vibration motor.

According to Newton's law of motion, the sum of these forces is equal to the product of the total mass of the movable member that is moving, and its acceleration.

Accordingly, under this state, the following formula (3) holds as an equation of motion relating to the movable member.

$$m \times a = a \times I - k(x' + xav'' - xini'') \quad \text{Formula (3)}$$

In formula (3), m is the total mass [kg] of the movable member that is reciprocating, a is the instantaneous acceleration [m/s/s] of the movable member, and k is the spring constant [N/m] of the support spring that is incorporated in the linear vibration motor. Further, xav" is the above-mentioned displacement on the third coordinate system X", which indicates the mover amplitude center position, and the absolute value of this displacement xav" expresses the distance from the cylinder head position Psh to the mover amplitude center position Pav. Further, xini" is the displacement on the third coordinate system X", which indicates the mover neutral position Pini, and the absolute value of this displacement xini" expresses the distance [m] between the mover neutral position (the position of the mover in the state where the support spring is not deformed) Pini and the cylinder head position Psh.

Here, the instantaneous acceleration a [m/s/s] is obtained as shown in the following formula (4), by differentiating the instantaneous velocity v[m/s] given by formula (1).

$$a = \frac{dv}{dt} \quad \text{Formula (4)}$$

Furthermore, the displacement x'[m] on the second coordinate system X', which indicates the distance from the mover amplitude center position Pav to the mover front end position P, is obtained by setting the constant Const. in formula (2) at 0.

Furthermore, the total mass m[kg] of the movable member, the spring constant k[N/m] of the support spring, and the displacement xini"[m] on the third coordinate system X", which indicates the distance from the cylinder head position Psh to the mover neutral position Pini, are known values, and the driving current I can be a measured value.

Accordingly, the displacement xav" on the third coordinate system X", which indicates the distance from the cylinder head position Psh to the mover amplitude center position Pav,. can be calculated using formula (3).

Further, the displacement xtd"[m] on the third coordinate system X", which indicates the top dead point position of the mover (the position where the mover is closest to the cylinder head) Ptd, can be obtained as a displacement in a position which is apart from the displacement xav" on the third coordinate system X" obtained by formula (3) (the distance from the cylinder head position Psh to the mover amplitude center position Pav), by a distance equal to half the already-obtained mover stroke Lps[m] (=Lps/2), toward the cylinder head.

In this way, the mover stroke length Lps[m], and the displacement xtd" on the third coordinate system X", which indicates the mover top dead point position Ptd as a distance from the cylinder head position Psh, are calculated from the current I and the voltage V which are applied to the linear vibration motor.

Further, as an example of the method for detecting the mover position without using the position sensor, the inventors propose a method of using a mass/spring ratio m/k, without using the spring constant k (for example, referred to Japanese Published Patent Application No. 2002-354864).

However, in the above-mentioned method of deriving the mover position according to the position arithmetic operation based on the measured values of the driving current and the driving voltage of the linear vibration motor, the result of the arithmetic operation may include an error due to dispersion among units in the spring constant k or the mass/spring ratio m/k which are used in the arithmetic operation, their variations with time, changes caused by heat, and the like.

More specifically, when the spring constant k or the mass/spring ratio m/k α varies by 10%, the calculated mover absolute position varies by more than 10%. In such case, in order to avoid the collision between the mover and the cylinder head on the basis of the position of the mover calculated by the arithmetic operation using the above-mentioned formulae, a margin of 10% or more should be given to the clearance between the mover and the cylinder head. Accordingly, the stroke of the mover cannot be enlarged up to a position in which the mover approaches a collision critical position of the mover (i.e., a position where the mover contacts the cylinder head), which has been calculated by the arithmetic operation.

Further, when the mover reciprocates in such a manner that expansion and contraction of the support spring does not exceed an expansion/contraction range that is estimated for the support spring (estimated expansion/construction range), such reciprocating motion of the mover does not cause great variations with time. However, when the mover reciprocates in such a manner that the expansion and contraction of the support spring exceeds the estimated expansion/contraction range, as in the case of malfunction of the linear vibration motor, the spring constant k or the mass/spring ratio m/k may greatly vary.

In such cases, the linear vibration motor must be replaced together with the motor driving apparatus, which leads to deterioration in the reliability of the linear vibration motor as a driving apparatus.

It is also possible to make the support spring larger to prevent the expansion and contraction of the support spring from exceeding the estimated range even in the case of malfunction of the linear vibration motor. However, by doing so, not only the outer dimension of the linear vibration motor is increased but also the production cost is increased.

SUMMARY OF THE INVENTION

The present invention has for its object to provide a motor driving apparatus which can perform position calculation for obtaining the position of the mover with great accuracy on the basis of the spring constant or the mass/spring ratio which are calculated from the natural frequency of the mover of the linear vibration motor.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a motor driving apparatus for driving a linear vibration motor having a mover which is reciprocatably provided and a spring member which supports the mover, including: a mover force vibration unit for making the mover freely vibrate; a vibration parameter obtaining unit for obtaining a natural vibration parameter that shows natural vibration of the mover on the basis of the free vibration state of the mover; a spring constant decision unit for deciding a spring constant of the spring member using the obtained natural vibration parameter; and a mover position calculation unit for calculating the position of the mover using the spring constant that is decided by the spring constant decision unit. Therefore, the position calculation for obtaining the position of the mover can be carried out with high precision by using an accurate spring constant.

That is, according to the conventional method in which a fixed spring constant is used at the position calculation for obtaining the mover position during the operation of the linear vibration motor, the accuracy of the mover position that is obtained by the position calculation becomes low due to variations in the spring constant among different linear vibration motors, while according to the present invention, the spring constant is calculated for respective linear vibration motors, whereby the position calculation can be performed without being affected by the variations in the spring constant among different linear vibration motors. In other words, it is possible to use an accurate value of the spring constant corresponding to an individual linear vibration motor at the position calculation, thereby increasing the precision in the position calculation.

In addition, according to the present invention, the processing for calculating the spring constant is performed after assembling the linear vibration motor. Accordingly, the following effect is also achieved relative to the case where the calculation of the spring constant is performed at the assembly of the linear vibration motor.

That is, in the method of deciding the spring constant that is used at the calculation of the position of the mover at the assembling of the linear vibration motor, complicated processes for correcting the spring constant are further required at the time of assembling, and also the linear vibration motor for which the spring constant has been decided would be combined with a driving apparatus which has been adapted to the decided spring constant. Consequently, when either the linear vibration motor or the motor driving apparatus is broken, both should be changed.

In contrast, since according to the present invention the processing for calculating the spring constant is performed after assembling the linear vibration motor, the processes for correcting the spring constant at the assembly are not required. In addition, since the spring constant is decided under the state where the motor driving apparatus is combined with the linear vibration motor, even when either the linear vibration motor or the motor driving apparatus is broken, the spring constant can be decided after the broken member is changed, that is, all that is needed is only the changing of the broken member.

According to a 2nd aspect of the present invention, in the motor driving apparatus of the 1st aspect, the vibration parameter obtaining unit includes: a timing detection unit for detecting a timing when the freely vibrating mover passes through a prescribed relative position with respect to a reference position of the vibration; and a natural frequency detection unit for detecting a natural frequency as the natural vibration parameter of the mover on the basis of an output from the timing detection unit, and the spring constant decision unit calculates the spring constant by multiplying the detected natural frequency by a twofold of the ratio of the circumference to the diameter ($\pi$), squaring the result of the multiplication, and multiplying the squared value by a mass of the mover. Therefore, it is possible to obtain an accurate spring constant corresponding to an individual linear vibration motor on the basis of the natural frequency of the mover of the linear vibration motor.

According to a 3rd aspect of the present invention, in the motor driving apparatus of the 1st aspect, the vibration parameter obtaining unit includes: a timing detection unit for detecting a timing when the freely vibrating mover passes through a prescribed relative position with respect to a reference position of the vibration; and a natural angular frequency detection unit for detecting a natural angular frequency as the natural vibration parameter of the mover on the basis of an output from the timing detection unit, and the spring constant decision unit calculates the spring constant by squaring the detected natural angular frequency and multiplying the squared natural angular frequency by a mass of the mover. Therefore, it is possible to obtain an accurate spring constant corresponding to an individual linear vibration motor on the basis of the natural angular frequency of the mover of the linear vibration motor.

According to a 4th aspect of the present invention, in the motor driving apparatus of the 1st aspect, the vibration parameter obtaining unit includes: a timing detection unit for detecting a timing when the freely vibrating mover passes through a prescribed relative position with respect to a reference position of the vibration; and a natural frequency period detection unit for detecting a natural frequency period as the natural vibration parameter of the mover on the basis of an output from the timing detection unit, and the spring constant decision unit calculates the spring constant by dividing the detected natural frequency period by a twofold of the ratio of the circumference to the diameter, squaring the result of the division, multiplying the squared value by an inverse of a mass of the mover, and calculating an inverse of the result of the multiplication. Therefore, it is possible to obtain an accurate spring constant corresponding to an individual linear vibration motor on the basis of the natural frequency period of the mover of the linear vibration motor.

According to a 5th aspect of the present invention, there is provided a motor driving apparatus for driving a linear vibration motor having a mover which is reciprocatably provided and a spring member which supports the mover, including: a motor driver for applying a driving voltage to the linear vibration motor; a current detection unit for detecting a current that is supplied from the motor driver to the linear vibration motor; a voltage detection unit for detecting a voltage that is applied from the motor driver to the linear vibration motor; a resonance frequency detection unit for detecting a resonance frequency of the linear vibration motor from the detected current and the detected voltage; a spring constant decision unit for deciding a spring constant of the spring member by multiplying the resonance frequency that is detected by the resonance frequency detection unit by a two fold of the ratio of the circumference to the diameter, squaring the result of the multiplication, and multiplying the squared value by a mass of the mover; and a mover position calculation unit for calculating the position of the mover using the spring constant that is decided by the spring constant decision unit. Therefore, the position calculation for obtaining the position of the mover can be carried out with high precision by using an accurate spring constant.

In addition, since according to the present invention the processing for calculating the spring constant can be performed after assembling the linear vibration motor, the processes for correcting the spring constant at the assembly are not required in contrast to the case where the calculation of the spring constant is performed at the assembling of the linear vibration motor. Further, since the spring constant is decided under the state where the motor driving apparatus is combined with the linear vibration motor, even when either the linear vibration motor or the motor driving apparatus is broken, the spring constant can be decided after the broken member is changed, that is, all that is needed is only the changing of the broken member.

According to a 6th aspect of the present invention, in the motor driving apparatus of any of the 1st to 4th aspects, the timing detection unit detects the timing when the freely vibrating mover passes through the prescribed relative position with respect to the reference position of the vibration using an induced voltage that occurs on a coil of the linear vibration motor due to the free vibration of the mover. Therefore, it is possible to calculate the natural frequency period or the like of the mover that is freely vibrating using a component such as the existing voltage detector, without using a special position sensor, whereby the number of components can be reduced, resulting in reduction of the size or cost of the apparatus.

According to a 7th aspect of the present invention, in the motor driving apparatus of any of the 1st to 4th aspects, the mover force vibration unit mechanically applies a force to the mover so that the mover freely vibrates. Therefore, the mover force vibration unit can be realized by a simple mechanism.

According to an 8th aspect of the present invention, in the motor driving apparatus of any of the 1st to 4th aspect, the mover force vibration unit temporarily cuts off the current that is supplied to the linear vibration motor so that the mover freely vibrates. Therefore, the mover force vibration unit can be realized using the existing component, such as a motor driver, without using a special component, whereby the number of components can be reduced, resulting in reduction of the size or cost of the apparatus. Further, the method of freely vibrating the mover according to the present invention is effective when the linear vibration motor is sealed and no force can be mechanically applied to a mover that is included in the vibration motor.

According to a 9th aspect of the present invention, in the motor driving apparatus of any of the 1st to 4th aspects, the mover force vibration unit disconnects a load that is connected to the linear vibration motor so that the mover freely vibrates. Therefore, the mover force vibration unit can be realized using the existing component, such as a motor driver, without using a special component, whereby the number of components can be reduced, resulting in reduction of the size or cost of the apparatus. Further, the method of freely vibrating the mover according to the present invention is effective when the linear vibration motor is sealed and no force can be mechanically applied to a mover that is included in the vibration motor.

According to a 10th aspect of the present invention, the motor driving apparatus of any of the 1st to 5th aspects includes a control unit for setting an operation mode to either a driving mode for driving the linear vibration motor to operate a load that is connected to the linear vibration motor, or an arithmetic mode for calculating the spring constant of the spring member, the control unit temporarily setting the operation mode to the arithmetic mode before a start of the operation of the load, the spring constant calculation unit calculating the spring constant in the arithmetic mode before the start of the operation of the load, and the mover position calculation unit calculating the position of the mover in the driving mode using the spring constant that has been calculated before the start of the operation of the load. Therefore, the arithmetic operation for obtaining the position of the mover can be performed always using the spring constant in the latest state of the linear vibration motor. Accordingly, even when the spring constant varies with time, a quite accurate position calculation can be performed.

According to an 11th aspect of the present invention, the motor driving apparatus of any of the 1st to 5th aspects includes a control unit for setting an operation mode to either a driving mode for driving the linear vibration motor to operate a load that is connected to the linear vibration motor, or an arithmetic mode for calculating the spring constant of the spring member, the control unit temporarily setting the operation mode to the arithmetic mode after a completion of the operation of the load, the spring constant calculation unit calculating the spring constant in the arithmetic mode after the completion of the operation of the load, and the mover position calculation unit calculating the position of the mover in the driving mode using the spring constant that has been calculated in a recently set arithmetic mode. Therefore, the arithmetic operation for obtaining the position of the mover can be performed always using the spring constant in the latest state of the linear vibration motor. Accordingly, even when the spring constant varies with time, a quite accurate position calculation can be performed.

Further, since according to the present invention the calculation of the spring constant is performed immediately after the operation of the linear vibration motor, the spring constant is calculated under a state where the temperature of the motor is approximately the same as the temperature of a time when the linear vibration motor is actually operated. That is, although the spring constant varies according to the temperature, it is possible to obtain an accurate spring constant at the operation of the linear vibration motor by calculating the spring constant at a temperature when the motor is actually operated. Accordingly, the position calculation for obtaining the mover position can be achieved with high accuracy.

Further, since the calculation of the spring constant is performed after the completion of the operation, the operation of calculating the spring constant does not hinder the driving of the linear vibration motor.

According to a 12th aspect of the present invention, the motor driving apparatus of any of the 1st to 5th aspects includes a control unit for setting an operation mode to either a driving mode for driving the linear vibration motor to operate a load that is connected to the linear vibration motor, or an arithmetic mode for calculating the spring constant of the spring member; a temperature detection unit for detecting a temperature of the linear vibration motor; and a spring constant estimation unit for estimating the spring constant in a load operating state, in which the control unit temporarily sets the operation mode to the arithmetic mode at least one of before a start of the operation of the load and after a completion of the operation of the load, the spring constant estimation unit, in the arithmetic mode, derives a relationship between the temperature of the linear vibration motor and the spring constant on the basis of the calculated spring constant and the temperature that is detected by the temperature detection unit when the spring constant is calculated, and, in the driving mode, estimates the spring constant in the load operating state on the basis of the temperature detected by the temperature detection unit using the derived relationship between the temperature and the spring constant, and the mover position calculation unit calculates the position of the mover in the driving mode using the estimated spring constant. Therefore, it is possible to always use an accurate spring constant at the calculation of the mover position that is carried out during the operation of the linear vibration motor, thereby increasing the precision in the position calculation.

Further, since according to the present invention the spring constant of the linear vibration motor during the operation is estimated from the temperature at a time when the linear vibration motor is actually operated, the calculation of the mover position can be carried out with high precision using an accurate spring constant even in a state where the temperature of the linear vibration motor greatly varies.

According to a 13th aspect of the present invention, there is provided a motor driving apparatus for driving a linear vibration motor having a mover which is reciprocatably provided and a spring member which supports the mover, including: a mover force vibration unit for making the mover freely vibrate; a vibration parameter obtaining unit for obtaining a natural vibration parameter that shows natural vibration of the mover on the basis of the free vibration state of the mover; a mass/spring ratio decision unit for deciding a mass/spring ratio that is a ratio between a mass of the mover and a spring constant of the spring member using the obtained natural vibration parameter; and a mover position calculation unit for calculating the position of the mover using the mass/spring ratio that is decided by the mass/spring ratio decision unit. Therefore, the position calculation for obtaining the position of the mover can be carried out with high precision by using an accurate mass/spring ratio.

That is, according to the conventional method in which a fixed mass/spring ratio is used at the position calculation for obtaining the mover position during the operation of the linear vibration motor, the accuracy of the mover position that is obtained by the position calculation becomes low due to variations in the mass/spring ratio among different linear vibration motors, while according to the present invention, the mass/spring ratio is calculated for respective linear vibration motors, whereby the position calculation can be performed without being affected by the variations in the mass/spring ratio among different linear vibration motors. In other words, it is possible to use an accurate value of the mass/spring ratio corresponding to an individual linear vibration motor at the position calculation, thereby increasing the precision in the position calculation.

In addition, according to the present invention, the processing for calculating the mass/spring ratio is performed after assembling the linear vibration motor. Accordingly, the following effect is also achieved relative to the case where the calculation of the mass/spring ratio is performed at the assembly of the linear vibration motor.

That is, in the method of deciding the mass/spring ratio that is used at the calculation of the position of the mover at the assembling of the linear vibration motor, complicated processes for correcting the mass/spring ratio are further required at the assembling, and also the linear vibration motor for which the mass/spring ratio has been decided would be combined with a driving apparatus which has been adapted to the decided mass/spring ratio. Consequently, when either the linear vibration motor or the motor driving apparatus is broken, both should be changed.

In contrast, since according to the present invention the processing for calculating the mass/spring ratio is performed after assembling the linear vibration motor, the processes for correcting the mass/spring ratio at the assembly are not required. In addition, since the mass/spring ratio is decided under the state where the motor driving apparatus is combined with the linear vibration motor, even when either the linear vibration motor or the motor driving apparatus is broken, the mass/spring ratio can be decided after the broken member is changed, that is, all that is needed is only the changing of the broken member.

According to a 14th aspect of the present invention, in the motor driving apparatus of the 13th aspect, the vibration parameter obtaining unit includes: a timing detection unit for detecting a timing when the freely vibrating mover passes through a prescribed relative position with respect to a reference position of the vibration; and a natural frequency detection unit for detecting a natural frequency as the natural vibration parameter of the mover on the basis of an output from the timing detection unit, and the mass/spring ratio decision unit decides the mass/spring ratio by multiplying the detected natural frequency by a twofold of the ratio of the circumference to the diameter ($\pi$), squaring the result of the multiplication, and calculating an inverse of the squared value. Therefore, it is possible to obtain an accurate mass/spring ratio corresponding to an individual linear vibration motor on the basis of the natural frequency of the mover of the linear vibration motor.

According to a 15th aspect of the present invention, in the motor driving apparatus of the 13th aspect, the vibration parameter obtaining unit includes: a timing detection unit for detecting a timing when the freely vibrating mover passes through a prescribed relative position with respect to a reference position of the vibration; and a natural angular frequency detection unit for detecting a natural angular frequency as the natural vibration parameter of the mover on the basis of an output from the timing detection unit, and the mass/spring ratio decision unit calculates the mass/spring ratio by squaring the detected natural angular frequency and calculating an inverse of the squared natural angular frequency. Therefore, it is possible to obtain an accurate mass/spring ratio corresponding to an individual linear vibration motor on the basis of the natural angular frequency of the mover of the linear vibration motor.

According to a 16th aspect of the present invention, in the motor driving apparatus of the 13th aspect, the vibration parameter obtaining unit includes: a timing detection unit for detecting a timing when the freely vibrating mover passes through a prescribed relative position with respect to a reference position of the vibration; and a natural frequency period detection unit for detecting a natural frequency period as the natural vibration parameter of the mover on the basis of an output from the timing detection unit, and the mass/spring ratio decision unit decides the mass/spring ratio by dividing the detected natural frequency period by a twofold of the ratio of the circumference to the diameter, and squaring the result of the division. Therefore, it is possible to obtain an accurate spring constant corresponding to an individual linear vibration motor on the basis of the natural frequency period of the mover of the linear vibration motor.

According to a 17th aspect of the present invention, there is provided a motor driving apparatus for driving a linear vibration motor having a mover which is reciprocatably provided and a spring member which supports the mover, including: a motor driver for applying a driving voltage to the linear vibration motor; a current detection unit for detecting a current that is supplied from the motor driver to the linear vibration motor; a voltage detection unit for detecting a voltage that is applied from the motor driver to the linear vibration motor; a resonance frequency detection unit for detecting a resonance frequency of the linear vibration motor from the detected current and the detected voltage; a mass/spring ratio decision unit for deciding a mass/spring ratio by multiplying the resonance frequency that is detected by the resonance frequency detection unit by a twofold of the ratio of the circumference to the diameter, squaring the result of the multiplication, and calculating an inverse of the squared value; and a mover position calculation unit for calculating the position of the mover using the mass/spring ratio that is decided by the mass/spring ratio decision unit. Therefore, the position calculation for obtaining the position of the mover can be carried out with high precision by using an accurate spring constant.

In addition, since according to the present invention the processing for calculating the mass/spring ratio is performed after assembling the linear vibration motor, the processes for correcting the mass/spring ratio at the assembly are not required in contrast to the case where the calculation of the mass/spring ratio is performed at the assembling of the linear vibration motor. In addition, since the mass/spring ratio is decided under the state where the motor driving apparatus is combined with the linear vibration motor, even when either the linear vibration motor or the motor driving apparatus is broken, the mass/spring ratio can be decided after the broken member is changed, that is, all that is needed is only the changing of the broken member.

According to a 18th aspect of the present invention, in the motor driving apparatus of any of the 13th to 16th aspects, the timing detection unit detects the timing when the freely vibrating mover passes through the prescribed relative position with respect to the reference position of the vibration using an induced voltage that occurs on a coil of the linear vibration motor due to the free vibration of the mover. Therefore, it is possible to calculate the natural frequency period or the like of the mover that is freely vibrating using a component such as the existing voltage detector, without using a special position sensor, whereby the number of components can be reduced, resulting in reduction of the size or cost of the apparatus.

According to a 19th aspect of the present invention, in the motor driving apparatus of any of the 13th to 16th aspects, the mover force vibration unit mechanically applies a force to the mover so that the mover freely vibrates. Therefore, the mover force vibration unit can be realized by a simple mechanism.

According to a 20th aspect of the present invention, in the motor driving apparatus of any of the 13th to 16th aspects, the mover force vibration unit temporarily cuts off the current that is supplied to the linear vibration motor so that the mover freely vibrates. Therefore, the mover force vibration unit can be realized using the existing component, such as a motor driver, without using a special component, whereby the number of components can be reduced, resulting in reduction of the size or cost of the apparatus. Further, the method of freely vibrating the mover according to the present invention is effective when the linear vibration motor is sealed and no force can be mechanically applied to a mover that is included in the vibration motor.

According to a 21st aspect of the present invention, in the motor driving apparatus of any of the 13th to 16th aspects, the mover force vibration unit disconnects a load that is connected to the linear vibration motor so that the mover freely vibrates. Therefore, the mover force vibration unit can be realized using the existing component, such as a motor driver, without using a special component, whereby the number of components can be reduced, resulting in reduction of the size or cost of the apparatus. Further, the method of freely vibrating the mover according to the present invention is effective when the linear vibration motor is sealed and no force can be mechanically applied to a mover that is included in the vibration motor.

According to a 22nd aspect of the present invention, the motor driving apparatus of any of the 13th to 17th aspects includes a control unit for setting an operation mode to either a driving mode for driving the linear vibration motor to operate a load that is connected to the linear vibration motor, or an arithmetic mode for calculating the mass/spring ratio, the control unit temporarily setting the operation mode to the arithmetic mode before a start of the operation of the load, the mass/spring ratio decision unit deciding the mass/spring ratio in the arithmetic mode before the start of the operation of the load, and the mover position calculation unit calculating the position of the mover in the driving mode using the mass/spring ratio that has been calculated before the start of the operation of the load. Therefore, the arithmetic operation for obtaining the position of the mover can be performed always using the mass/spring ratio in the latest state of the linear vibration motor. Accordingly, even when the mass/spring ratio varies with time, a quite accurate position calculation can be performed.

According to a 23rd aspect of the present invention, the motor driving apparatus of any of the 13th to 17th aspects includes a control unit for setting an operation mode to either a driving mode for driving the linear vibration motor to operate a load that is connected to the linear vibration motor, or an arithmetic mode for calculating the mass/spring ratio, the control unit temporarily setting the operation mode to the arithmetic mode after a completion of the operation of the load, the mass/spring ratio decision unit deciding the mass/spring ratio in the arithmetic mode after the completion of the operation of the load, and the mover position calculation unit calculating the position of the mover in the driving mode using the mass/spring ratio that has been calculated in a recently set arithmetic mode. Therefore, the arithmetic operation for obtaining the position of the mover can be performed always using the mass/spring ratio in the latest state of the linear vibration motor. Accordingly, even when the mass/spring ratio varies with time, a quite accurate position calculation can be performed.

Further, since according to the present invention the calculation of the mass/spring ratio is performed immediately after the operation of the linear vibration motor, the mass/spring ratio is calculated under a state where the temperature of the motor is approximately the same as the temperature of a time when the linear vibration motor is actually operated. That is, although the mass/spring ratio varies according to the temperature, it is possible to obtain an accurate mass/spring ratio at the operation of the linear vibration motor by calculating the mass/spring ratio at a temperature when the motor is actually operated. Accordingly, the position calculation for obtaining the mover position can be achieved with high accuracy.

Further, since the calculation of the mass/spring ratio is performed after the end of the operation, the operation of calculating the mass/spring ratio does not hinder the driving of the linear vibration motor.

According to a 24th aspect of the present invention, the motor driving apparatus of any of the 13th to 17th aspects includes a control unit for setting an operation mode to either a driving mode for driving the linear vibration motor to operate a load that is connected to the linear vibration motor, or an arithmetic mode for calculating the mass/spring ratio; a temperature detection unit for detecting a temperature of the linear vibration motor; a mass/spring ratio estimation unit for estimating the mass/spring ratio in a load operating state, in which the control unit temporarily sets the operation mode to the arithmetic mode at least one of before a start of the operation of the load and after a completion of the operation of the load, the mass/spring ratio estimation unit, in the arithmetic mode, derives a relationship between the temperature of the linear vibration motor and the mass/spring ratio on the basis of the calculated mass/spring ratio and the temperature that is detected by the temperature detection unit when the mass/spring ratio is calculated, and, in the driving mode, estimates the mass/spring ratio in the load operating state on the basis of the temperature detected by the temperature detection unit using the derived relationship between the temperature and the mass/spring ratio, and the mover position calculation unit calculates the position of the mover in the driving mode using the estimated mass/spring ratio. Therefore, it is possible to always use an accurate mass/spring ratio at the calculation of the mover position that is carried out during the operation of the linear vibration motor, thereby increasing the precision in the calculation of the mover position.

Further, since according to the present invention the mass/spring ratio of the linear vibration motor during the operation is estimated from the temperature at a time when the linear vibration motor is actually operated, the calculation of the mover position can be carried out with high precision using an accurate mass/spring ratio even in a state where the temperature of the linear vibration motor greatly varies.

According to a 25th aspect of the present invention, there is provided an air conditioner provided with a compressor which has a cylinder and a piston, and compresses a liquid in the cylinder by a reciprocating motion of the piston, including: a linear vibration motor for making the piston reciprocate, having a mover which is reciprocatably provided, and a spring member which supports the mover; a motor driving apparatus for driving the linear vibration motor; and the motor driving apparatus being the motor driving apparatus as defined in any of the 1st, 5th, 13th, and 17th aspects. Therefore, the spring constant or the mass/spring ratio is calculated in the mode where the linear vibration motor is not operated, and the position of the mover of the linear vibration motor is calculated by an arithmetic operation using the calculated spring constant or mass/spring ratio in the mode of driving the linear vibration motor. Accordingly, in an air conditioner which comprises the linear vibration motor within a sealed enclosure and is used in environments where the temperature and the pressure greatly vary, the position of the mover of the linear vibration motor can be obtained with high precision according to an arithmetic operation using the spring constant or mass/spring ratio, without using a position sensor. Thereby, the clearance between the piston and the cylinder head can be reduced, resulting in miniaturization of the compressor, which leads to miniaturization of the air conditioner.

Further, since in this air conditioner the piston of the compressor is driven by the linear vibration motor, friction loss can be reduced as compared with an air-conditioner in which the piston of the compressor is driven by a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, resulting in a contribution to conservation of global environment.

According to a 26th aspect of the present invention, there is provided a refrigerator provided with a compressor which has a cylinder and a piston, and compresses a liquid in the cylinder by a reciprocating motion of the piston, including: a linear vibration motor for making the piston reciprocate, having a mover which is reciprocatably provided, and a spring member which supports the mover; a motor driving apparatus for driving the linear vibration motor; and the motor driving apparatus being the motor driving apparatus as defined in any of the 1st, 5th, 13th, and 17th aspects. Therefore, in a refrigerator which comprises the linear vibration motor within a sealed enclosure and is used in environments where the temperature and the pressure greatly vary, the position of the mover of the linear vibration motor can be obtained with high precision according to an arithmetic operation using the spring constant or mass/spring ratio without using a position sensor, as in the air-conditioner. Thereby, the clearance between the piston and the cylinder head can be reduced, resulting in miniaturization of the compressor, which leads to miniaturization of the refrigerator.

Further, since in this refrigerator the piston of the compressor is driven by the linear vibration motor, friction loss can be reduced and the sealability can be increased as compared with a refrigerator in which the piston of the compressor is driven by a conventional rotation-type motor, whereby efficiency of the compressor is enhanced. Moreover, since friction loss is reduced, the amount of lubricating oil can be significantly reduced. Thereby, recyclability is enhanced, and the amount of refrigerant to be filled in the compressor is reduced, resulting in a contribution to conservation of global environment.

According to a 27th aspect of the present invention, there is provided a cryogenic freezer provided with a compressor which has a cylinder and a piston, and compresses a liquid in the cylinder by a reciprocating motion of the piston, including: a linear vibration motor for making the piston reciprocate, having a mover which is reciprocatably provided, and a spring member which supports the mover; a motor driving apparatus for driving the linear vibration motor; and the motor driving apparatus being the motor driving apparatus as defined in any of the 1st, 5th, 13th, and 17th aspects. Therefore, in a cryogenic freezer which comprises the linear vibration motor within a sealed enclosure and is used in environments where the temperature and the pressure greatly vary, the position of the mover of the linear vibration motor can be obtained with high precision according to an arithmetic operation using the spring constant or mass/spring ratio without using a position sensor, as in the air-conditioner. Thereby, the clearance between the piston and the cylinder head can be reduced, resulting in miniaturization of the compressor, which leads to miniaturization of the cryogenic freezer.

Further, since in this cryogenic freezer the piston of the compressor is driven by the linear vibration motor, friction loss can be reduced and the sealability can be increased as compared with a refrigerator in which the piston of the compressor is driven by a conventional rotation-type motor, whereby efficiency of the compressor is enhanced. Moreover, since friction loss is reduced, the amount of lubricating oil can be significantly reduced. Thereby, recyclability is enhanced, and the amount of refrigerant to be filled in the compressor is reduced, resulting in a contribution to conservation of global environment.

According to a 28th aspect of the present invention, there is provided a hot-water supply unit provided with a compressor which has a cylinder and a piston, and compresses a liquid in the cylinder by a reciprocating motion of the piston, including: a linear vibration motor for making the piston reciprocate, having a mover which is reciprocatably provided, and a spring member which supports the mover;

a motor driving apparatus for driving the linear vibration motor; and the motor driving apparatus being the motor driving apparatus as defined in any of the 1st, 5th, 13th, and 17th aspects. Therefore, in a hot-water supply unit which comprises the linear vibration motor within a sealed enclosure and is used in environments where the temperature and the pressure greatly vary, the position of the mover of the linear vibration motor can be obtained with high precision according to an arithmetic operation using the spring constant or mass/spring ratio without using a position sensor, as in the air-conditioner. Thereby, the clearance between the piston and the cylinder head can be reduced, resulting in miniaturization of the compressor, which leads to miniaturization of the hot-water supply unit.

Further, since in this hot-water supply unit the piston of the compressor is driven by the linear vibration motor, friction loss can be reduced and the sealability can be increased as compared with a hot-water supply unit in which the piston of the compressor is driven by a conventional rotation-type motor, whereby efficiency of the compressor is enhanced. Moreover, since friction loss is reduced, the amount of lubricating oil can be significantly reduced. Thereby, recyclability is enhanced, and the amount of refrigerant to be filled in the compressor is reduced, resulting in a contribution to conservation of global environment.

According to a 29th aspect of the present invention, there is provided a handy phone provided with a linear vibration motor for generating vibration, and a motor driving apparatus for driving the linear vibration motor, including: the linear vibration motor having a mover which is reciprocatably provided, and a spring member which supports the mover; and the motor driving apparatus being the motor driving apparatus as defined in any of the 1st, 5th, 13th, and 17th aspects. Therefore, it is possible to transmit vibration to outside with two degrees of freedom, i.e., the number of vibrations and the amplitude of the vibrations. Accordingly as compared to the case where the vibration is generated by the conventional rotation-type motor, a variety of vibration patterns can be provided. Further, the motor diving apparatus calculates the spring constant or the mass/spring ratio in the mode where the linear vibration motor is not operated, and calculates the position of the mover using the calculated spring constant or mass/spring ratio in the mode for driving the linear vibration motor, thereby detecting the position of the mover with high accuracy during the operation of the linear vibration motor. Accordingly, the clearance between the mover and its peripheral member can be reduced, resulting in miniaturization of the linear vibration motor, which leads to miniaturization of the handy phone.

DETAILED DESCRIPTION OF THE PREFERRED EMBODIMENTS

Hereinafter, embodiments of the present invention will be described.

Embodiment 1

Figure 1:
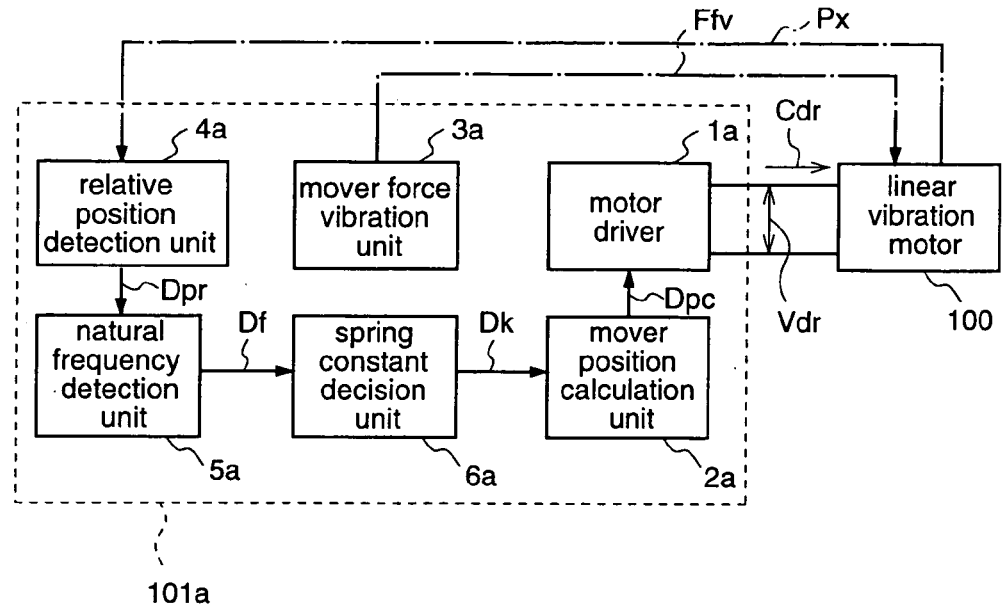
FIG. 1 is a block diagram for explaining a motor driving apparatus 101a according to a first embodiment of the present invention.

FIG. 1 is a block diagram for explaining a motor driving apparatus according to a first embodiment of the present invention.

The motor driving apparatus 101a according to the first embodiment has two operation modes for operating a linear vibration motor. One of the operation modes is a driving mode of driving the linear vibration motor 100 with a driving voltage or a driving current corresponding to a required motor output to operate a load that is connected to a linear vibration motor 100. In this driving mode, the motor driving apparatus 101a operates the load, as well as calculates the position of the mover of the linear vibration motor on the basis of the driving voltage and the driving current, thereby controlling the driving of the linear vibration motor according to the calculated position of the mover. The other operation mode is an arithmetic mode of performing an arithmetic operation for calculating a spring constant k of a spring member that supports the mover, by freely vibrating the mover of the linear vibration motor 100.

More specifically, the motor driving apparatus 101a according to the first embodiment includes a motor driver 1a for driving/controlling the linear vibration motor 100 on the basis of position information Dpc which indicates the position Px of the mover, and a mover position calculation unit 2a for performing position calculation of calculating the position Px of the mover on the basis of the spring constant k of the spring member.

The motor driving apparatus 101a further includes a mover force vibration unit 3a for temporarily applying a force (forced vibration force) Ffv so that the mover of the linear vibration motor 100 freely vibrates, a relative position detection unit 4a for detecting a timing when the mover passes through a prescribed relative position Pr with respect to a vibration reference position such as the center of the vibration under the freely vibrating state of the mover and outputting timing information Dpr which indicates the detected timing, a natural frequency detection unit 5a for detecting a natural frequency f of the mover on the basis of the timing information Dpr outputted from the relative position detection unit 4a, and a spring constant decision unit 6a for deciding (calculating a spring constant k of the spring member from the detected natural frequency f and outputting spring constant information Dk that indicates the decided (calculated) spring constant to the mover position detection unit 2a. Strictly speaking, the above-mentioned natural frequency f is a natural frequency of a spring vibration system including the mover.

The motor driving apparatus 101a includes a control unit (not shown) for controlling the respective components 1a, 2a, 3a, 4a, 4a, and 6a of the motor driving apparatus 101a on the basis of an instruction signal in accordance with a user operation. Immediately before the driving of the linear vibration motor, the operation mode of the motor driving apparatus 101a is temporarily turned into the arithmetic mode for calculating the spring constant by the control of the control unit, and thereafter turned into the driving mode for operating the load.

Hereinafter, the linear vibration motor 100, and the motor driver 1a, the mover position calculation unit 2a, the mover force vibration unit 3a, the relative position detection unit 4a, the natural frequency detection unit 5a, and the spring constant decision unit 6a, which are constituents of the motor driving apparatus 101a, will be described in more detail.

The linear vibration motor 100 includes a stator, a mover, and a spring member that supports the mover so as to form a spring vibration system including the mover. The driving frequency of the linear vibration motor 100 is a resonance frequency of the reciprocating motion of the mover, i.e., the resonance frequency of the spring vibration system, or a frequency that is close to the resonance frequency. Further, the stator comprises an electromagnet that is obtained by winding a coil around an iron core, and the mover comprises a permanent magnet.

The motor driver 1a receives a supply voltage, and applies a driving voltage Vdr to the linear vibration motor 100 to drive the linear vibration motor 100. Normally, an AC voltage is applied to the linear vibration motor 100 as the driving voltage Vdr, and an AC current is supplied to the linear vibration motor 100 as the driving current Cdr. The motor driver 1a can make the mover of the linear vibration motor 100 reciprocate at a frequency that is the same as the frequency of the AC voltage, by applying the AC voltage to the linear vibration motor 100 as the driving voltage Vdr. When a DC voltage is applied to the linear vibration motor 100, the mover receives a prescribed electromagnetic force.

Further, the motor driver 1a decides the level (peak value) of the driving voltage (AC voltage) Vdr on the basis of the position information Dpc that indicates the position Px of the mover, which is obtained by the calculation of the mover position calculation unit 2a.

The mover position calculation unit 2a obtains the position Px of the mover by an arithmetic operation during the operation of the linear vibration motor 100, i.e., under a state where the mover is reciprocating, and outputs the position information Dpc that indicates the position of the mover to the motor driver 1a.

As a specific method, there is employed the method for calculating the position of the mover according to the motion equation for the linear vibration motor 100; as disclosed in Japanese Unexamined Patent Publication No.Hei.8-508558 that has been described above as the prior art. In this case, the spring constant k that is used in the calculation of the mover position is decided by the spring constant decision unit 6a.

The mover force vibration unit 3a mechanically applies the forced vibration force Ffv to the mover from outside the linear vibration motor. When the forced vibration force Ffv is applied to the mover, the mover freely vibrates. The mover force vibration unit 3a can be implemented by a simple mechanism.

However, there is considered a case where the housing of the linear vibration motor 100 (motor housing) is sealed and no force can be applied directly to the mover that is included in the housing from outside the motor housing. In such case, the mover force vibration unit 3a applies an electromagnetic force to the mover using a current that is supplied to the linear vibration motor 100. As a specific method of applying the electromagnetic force to the mover, there is for example a method of instantaneously stopping the current that is supplied from the motor driver 1a to the linear vibration motor 100. That is, when the current that is supplied from the motor driver 1a to the linear vibration motor 100 is stopped instantaneously, the mover that is supported by the spring member comes to freely vibrate. The mover force vibration unit can be realized using the existing component, such as a motor driver, without using special components, resulting in reduction of the number of components, which leads to reduction of the size or the cost of the apparatus.

The current that is supplied to the linear vibration motor 100 may be instantaneously stopped under the normal driving state of the linear vibration motor 100, i.e., under a state where the mover is reciprocating, while this instantaneous stopping of the current can be also realized by stopping a DC current under a state where the electromagnetic force is applied to the mover by supplying a DC current from the motor driver 1a to the linear vibration motor 100 that is standing still. In this case, since the linear vibration motor 100 is not operated, i.e., no load is applied to the linear vibration motor 100, it is possible to make the mover freely vibrate at a desired amplitude that is affected by no load.

Further, the mover force vibration unit 3a can disconnect a load that is connected to the linear vibration motor so as to make the mover freely vibrate. In this case, the mover force vibration unit 3a can be realized using the existing component, such as the motor driver, without using a special component, resulting in the reduction of the number of components, which leads to the reduction of the size or the cost of the apparatus. It goes without saying that the mover force vibration unit 3a that makes the mover freely vibrate by disconnecting the load that is connected to the linear vibration motor is also effective in the case where the linear vibration motor is sealed and, for example, no force can be mechanically applied to the mover that is included therein.

The relative position detection unit 4a detects a timing when the mover passes through a prescribed relative position Pr with respect to a reference position such as the center of the vibration under the state where the mover of the linear vibration motor 100 is freely vibrating, and outputs timing information Dpr that indicates the detected timing. More specifically, a position sensor employing a Hall element or the like can be utilized as the relative position detection unit 4a. However, as the relative position detection unit 4a, any element can be utilized so long as it outputs the timing information Dpr from which the natural frequency f of the mover can be obtained. In other words, the position sensor that is utilized as the relative position detection unit 4a may be a simple one, and a sensor having high timing detection accuracy or high frequency response characteristics is not required.

As the method for detecting that the mover which is freely reciprocating has passed through the relative position, there is a method of utilizing an induced voltage of the linear vibration motor 100, in place of using the position sensor. As a specific example, there is a method of measuring an induced voltage generated on a line which is connected to the linear vibration motor 100, i.e., a coil constituting the electromagnet, due to the free vibration of the mover under a state where the output of the motor driver 1a is open, i.e., under a state where the motor driver 1a and the linear vibration motor are not connected.

The natural frequency detection unit 5a detects the natural frequency f of the mover from the timing information Dpr that is outputted from the relative position detection unit 4a. More specifically, the natural frequency detection unit 5a detects the number of times the freely vibrating mover passes through a fixed point (i.e., the relative position) per unit time, on the basis of the timing information Dpr from the relative position detection unit 4a. Usually, the center of the vibration of the mover is utilized as the relative position Pr.

That is, the natural frequency detection unit 5a detects the natural frequency f of the mover by detecting the number of times the mover passes through the fixed point (the relative position) within a prescribed time. By extending this prescribed time, the accuracy of the detection of the natural frequency can be increased.

The natural frequency detection unit 5a may measure a time period from when the mover has passed through the relative position (a fixed point) and to which the mover passes through again the relative position, and calculates a period of the natural vibration on the basis of the measured time period, thereby obtaining an inverse of the period as the natural frequency. Also in this case, by measuring a time period which is required by the mover to pass through the relative position by a large number of times which are more than twice, for example, 10 times or 20 times, the precision in the detection of the natural frequency can be increased.

The spring constant decision unit 6a decides the spring constant k from the natural frequency f that is detected by the natural frequency detection unit 5a. More specifically, the spring constant k is calculated by multiplying the natural frequency f by a twofold of the ratio of the circumference to the diameter (i.e., $\pi$), squaring the result of the multiplication, and further multiplying the squared value by the mass of the mover.

The operation of the motor driving apparatus will be described.

In the motor driving apparatus 101a according to the first embodiment, when an instruction signal that instructs a start of the operation of the linear vibration motor is inputted to the control unit (not shown) by a user operation, the respective components 1a, 2a, 3a, 4a, 5a, and 6a of the motor driving apparatus 101a are controlled in accordance with a control signal from the control unit so that the operation mode of the motor driving apparatus 101a temporarily becomes the arithmetic mode and then turns into the driving mode.

Initially, the operation of the motor driving apparatus in the arithmetic mode for deciding the spring constant k of the spring member of the linear vibration motor 100 will be described.

The mover force vibration unit 3a temporarily applies a forced vibration force Ffv to the mover of the linear vibration motor 100 in the arithmetic mode, i.e., under the state where the linear vibration motor 100 is not operated, in accordance with the control signal from the control unit (not shown), thereby making the mover freely vibrate.

The relative position detection unit 4a outputs the timing information Dpr that indicates the timing of the passing of the mover each time the mover passes through the relative position under the state where the mover of the linear vibration motor 100 is freely vibrating.

The natural frequency detection unit 5a detects the natural frequency f of the mover on the basis of the timing information Dpr from the relative position detection unit 4a. More specifically, the natural frequency detection unit 5a detects the number of times the freely vibrating mover passes through the relative position within a prescribed time on the basis of the timing information Dpr, thereby obtaining the natural frequency f of the mover, and outputs frequency information Df that indicates the natural frequency f.

The spring constant decision unit 6a calculates the spring constant k on the basis of the frequency information Df from the natural frequency detection unit 5a by multiplying the natural frequency f indicated by the frequency information Df by a twofold of the ratio of the circumference to the diameter ($\pi$), and squaring the result of the multiplication, and further multiplying the squared value by the mass of the mover, and outputs spring constant information Dk that indicates the spring constant to the mover position calculation unit 2a.

Thereafter, the operation mode of the motor driving apparatus 101a switches from the arithmetic mode to the driving mode for driving the linear vibration motor.

Hereinafter, the operation in the driving mode for driving the linear vibration motor 100 will be described.

The motor driver 1a applies the AC voltage (driving voltage) Vdr to the linear vibration motor 100 to drive the linear vibration motor 100. Thereby, the normal operation of the linear vibration motor 100 is started.

At this time, the mover position calculation unit 2a performs position calculation for obtaining the position of the mover on the basis of a driving current Cdr and a driving voltage Vdr which are applied to the motor driver 1a, using the spring constant k that is calculated by the spring constant decision unit 6a, and outputs mover position information Dpc which indicates the calculated mover position Px to the motor driver 1a.

Then, the motor driver 1a controls the amplitude (voltage level) of the driving voltage Vdr that is applied to the linear vibration motor 100 on the basis of the position information Dpc so that the mover that is reciprocating does not exceed its critical position.

As described above, the motor driving apparatus 101a according to the first embodiment for driving the linear vibration motor 100 includes the mover force vibration unit 3a that makes the mover of the linear vibration motor 100 freely vibrate, the relative position detection unit 4a that detects a timing when the freely vibrating mover has passed through a fixed point (relative position), and the natural frequency detection unit 5a that detects the natural frequency f of the mover on the basis of the timing information Dpr from the detection unit 4a, thereby deciding the spring constant k of the spring member from the detected natural frequency f. Therefore, it is possible to obtain the position of the mover according to the position calculation using the spring constant k with great accuracy.

Accordingly, it is possible to accurately control the position of the mover while the linear vibration motor is operating. Therefore, the clearance between the mover and the housing of the linear vibration motor can be reduced, thereby realizing miniaturization or power enhancement of the linear vibration motor.

Further, in this first embodiment, the spring constant k of the linear vibration motor is calculated immediately before the start of the operation of the linear vibration motor 100. Therefore, the position calculation for calculating the position of the mover is always performed using the spring constant k in the latest state of the linear vibration motor. Accordingly, even when the spring constant k varies with time, the position of the mover can be accurately obtained by the position calculation.

Further, in this first embodiment, the calculation of the spring constant is performed after assembly of the linear vibration motor to which the motor driving apparatus is connected. Therefore, as compared with the case where the calculation of the spring constant is performed during assembly of the linear vibration motor while the motor driving apparatus is not connected, the following effect is achieved.

That is, in the case of calculating the spring constant that is used in the mover position calculation during assembly of the linear vibration motor, the calculated value of the spring constant of respective linear vibration motors needs to be held in the motor driving apparatus that is to be combined with the respective linear vibration motors.

For example, in a motor driving apparatus that performs an arithmetic operation for obtaining the mover position by hardware, the default of the spring constant is set at the calculated value of the spring constant of the linear vibration motor that is to be combined with the motor driving apparatus, by controlling the volume of an active element such as a resistance. In addition, in a motor driving apparatus that performs the arithmetic operation for obtaining the mover position by software, the default of the spring constant which is stored in a microcomputer is changed to the value of the spring constant calculated at the assembly, or the default of the spring constant is set at the calculated value of the spring constant by controlling the volume of the active element such as a resistance.

Therefore, in the case of calculating the spring constant at the assembly of the linear vibration motor, the complicated processing for correcting the default of the spring constant of the respective motor driving apparatus at the assembly are required. In addition, when the motor driving apparatus is combined with the linear vibration motor, the default of the spring constant of the motor driving apparatus is set at the calculated value of the spring constant of the linear vibration motor with which the driving apparatus is combined. Therefore, even when one of the motor and the driving apparatus is broken, both of these should be changed.

On the other hand, in the case of calculating the spring constant after the assembly of the linear vibration motor as in this first embodiment, the complicated processing for correcting the default of the spring constant of the motor driving apparatus are not required at the assembly. Further, the value of the spring constant that is held in the motor driving apparatus is set in the state where the driving apparatus is combined with the linear vibration motor. Therefore, even when either the linear vibration motor or the driving apparatus is broken, it is possible to set the spring constant of the motor driving apparatus after the broken member is changed. In other words, when one of the motor and the driving apparatus is broken, the only requirement is changing the broken member.

In this first embodiment, the motor driving apparatus 101a calculates the spring constant k of the linear vibration motor 100 immediately before starting the operation of the linear vibration motor 100, while the motor driving apparatus 101a may calculate the spring constant k immediately after completing the operation of the linear vibration motor 100.

In this case, during the operation of the linear vibration motor, the position calculation operation for obtaining the position of the mover is performed using the spring constant k that was calculated immediately after the completion of the previous operation of the linear vibration motor. Therefore, also in this case, the position calculation for obtaining the position of the mover can be performed using the spring constant k in the latest state of the linear vibration motor. Accordingly, even when the spring constant k varies with time, the position of the mover can be accurately obtained by the position calculation.

Further, since in this case the calculation of the spring constant is performed immediately after the end of the operation of the linear vibration motor, the spring constant is calculated in a state where the temperature of the motor is approximately the same as the actual temperature of a time when the linear vibration motor is operated. That is, although the spring constant varies according to the temperature, an accurate spring constant at the operation of the linear vibration motor can be obtained by calculating the spring constant at a temperature when the motor is actually working. Accordingly, the position calculation for obtaining the mover position can be achieved with high accuracy.

Further, in this case, as the calculation of the spring constant is performed after the end of the operation of the linear vibration motor, it is possible to obtain the spring constant without hindering the operation of the linear vibration motor.

In this first embodiment, when the instruction signal that instructs the start of the operation of the linear vibration motor is inputted to control unit by the user operation, the operation mode of the motor driving apparatus 101a temporarily turns into the arithmetic mode and thereafter turns into the driving mode. However, the operation in the arithmetic mode and the operation in the driving mode may be carried out independently in accordance with instruction signals that are respectively generated by the user operation.

Embodiment 2

Figure 2:
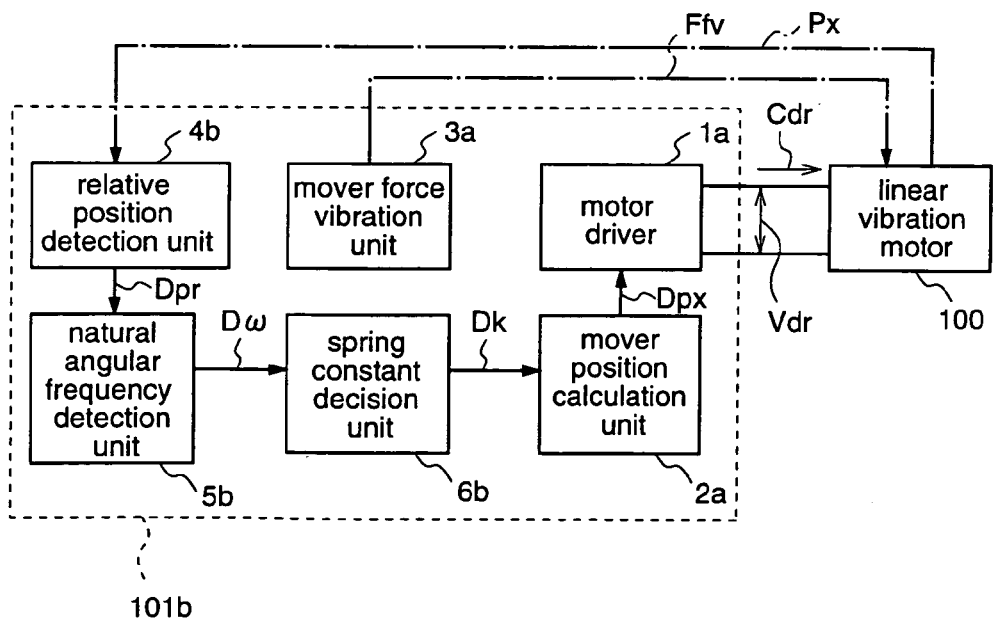
FIG. 2 is a block diagram for explaining a motor driving apparatus 101b according to a second embodiment of the present invention.

FIG. 2 is a block diagram illustrating a motor driving apparatus 101b according to a second embodiment of the present invention.

The motor driving apparatus 101b according to the second embodiment is different from the motor driving apparatus 101a according to the first embodiment only in that the apparatus 101b calculates the spring constant k that is used for the position calculation for obtaining the position of the mover on the basis of a natural angular frequency ω of the mover.

More specifically, the motor driving apparatus 101b according to the second embodiment includes a natural angular frequency detection unit 5b for detecting a natural angular frequency (natural angular velocity) 107 of the mover on the basis of the timing when the freely vibrating mover passes through a fixed point (relative position), in place of the natural frequency detection unit 5a in the motor driving apparatus 101a according to the first embodiment, and a spring constant decision unit 6b for calculating the spring constant k of the spring member on the basis of the natural angular frequency ω, in place of the spring constant decision unit 6a of the motor driving apparatus 101a according to the first embodiment.

Hereinafter, the motor driver 1a, the mover position calculation unit 2a, the mover force vibration unit 3a, the relative position detection unit 4b, the natural angular frequency detection unit 5b, and the spring constant decision unit 6b, which are constituents of the motor driving apparatus 101b, will be described in more detail.

The motor driver 1a, the mover position calculation unit 2a, and the mover force vibration unit 3a are identical to those in the motor driving apparatus 101a according to the first embodiment.

The relative position detection unit 4b detects timings when the mover passes through two relative positions (first and second relative positions) with respect to a reference position such as the center of the vibration, respectively, and outputs timing information Dpr that indicates the detected timings.

The natural angular frequency detection unit 5b detects the natural angular frequency (natural angular velocity) ω of the mover on the basis of the detected information Dpr that is outputted from the relative position detection unit 4b, and outputs angular frequency information Dω that indicates the natural angular frequency ω. As a specific method for detecting the natural angular frequency ω, there are a first method of dividing the maximum value Mv0 of the speed Mv of the mover by the maximum value Mx0 of displacement Mx of the mover, a second method of dividing the maximum value Ma0 of the acceleration Ma of the mover by the maximum value Mv0 of the speed Mv of the mover, a third method of dividing the maximum value Ma0 of the acceleration Ma of the mover by the maximum value Mx0 of the displacement Mx of the mover and obtaining the square root of the result of the division, and the like. In this case, the natural angular frequency detection unit 5b detects the natural angular frequency (natural angular velocity) ω of the mover on the basis of the timings at which the mover passes through the two relative positions, which is indicated by the timing information Dpr from the relative position detection unit 4b, according to the first method, i.e., using the maximum value Mv0 of the speed Mv of the mover and the maximum value Mx0 of the displacement Mx.

Hereinafter, the first to third methods will be briefly described.

The displacement Mx, the speed Mv, and the acceleration Ma of the mover are expressed as functions of the time t by following formulae (5) to (7).

$$Mx = Mx0 \cdot \sin(\omega t) \quad (5)$$

$$Mv = Mv0 \cdot \sin(\omega t) \quad (6)$$

$$Ma = Ma0 \cdot \sin(\omega t) \quad (7)$$

Further, as the speed Mv is obtained by differentiating the displacement Mx, the formula (6) is converted into a following formula (8).

$$Mv = (Mx)' = Mx0 \cdot \omega \cdot \cos(\omega t) \quad (8)$$

As the acceleration Ma is obtained by differentiating the speed Mv, the formula (7) is converted into a following formula (9).

$$Ma = (Mv)' = Mv0 \cdot \omega \cdot \cos(\omega t) \quad (9)$$

Further, as the acceleration Ma is obtained by differentiating the displacement Mx twice, the formula (7) is converted into a following formula (10).

$$Ma = ((Mx)')' = -Mx0 \cdot \omega \cdot \omega \cdot \sin(\omega t) \quad (10)$$

Here, ( )' indicates differentiation.

Therefore, according to the above formula (8), the maximum value Mv0 of the speed Mv is the product of the maximum value Mx0 of the displacement Mx and the angular frequency ω, and thus the angular frequency ω is obtained by dividing the maximum value Mv0 of the speed Mv of the mover by the maximum value Mx0 of the displacement Mx of the mover (the first method).

Further, according to the formula (9), the maximum value Ma0 of the acceleration Ma is the product of the maximum value Mv0 of the speed Mv and the angular frequency ω, and thus the angular frequency ω is obtained by dividing the maximum value Ma0 of the acceleration Ma of the mover by the maximum value Mv0 of the speed Mv of the mover (the second method).

Further, according to the formula (10), the maximum value Ma0 of the acceleration Ma is the product of the maximum value Mx0 of the displacement Mx and the square of the angular frequency ω, and thus the angular frequency ω is obtained by dividing the maximum value Ma0 of the acceleration Ma of the mover by the maximum value Mx0 of the displacement Mx of the mover and calculating the square root of the result of the division (the third method).

The spring constant decision unit 6b decides the spring constant k from the angular frequency ω that is detected by the natural angular frequency detection unit 5b, and outputs the spring constant information Dk that indicates the decided spring constant k. More specifically, the arithmetic operation for obtaining the spring constant k in the spring constant decision unit 6b ($=\omega^2 \cdot m$) is an operation of squaring the natural frequency ω that is indicated by the frequency information Dω outputted from the natural angular frequency detection unit 5b, and multiplying the squared natural frequency by the mass m of the mover.

Next, the operation of the motor driving apparatus will be described.

In the motor driving apparatus 101b according to the second embodiment, when an instruction signal that instructs start of the operation of the linear vibration motor is inputted to the control unit (not shown) by a user operation, the respective components 1a, 2a, 3a, 4b, 5b, and 6b of the motor driving apparatus 101b are controlled in accordance with a control signal from the control unit so that the operation mode of the motor driving apparatus 101b temporarily becomes the arithmetic mode and then turns into the driving mode, like in the first embodiment.

Initially, the operation in the arithmetic mode for deciding the spring constant k of the spring member of the linear vibration motor 100 will be described.

In this motor driving apparatus 101b according to the second embodiment, the mover force vibration unit 3a operates in the same manner as in the motor driving apparatus 101a according to the first embodiment.

In this second embodiment, the relative position detection unit 4b outputs the timing information Dpr that indicates the timing when the mover that is freely vibrating passes through the first relative position and the timing when the mover passes through the second relative position.

The natural angular frequency detection unit 5b detects the natural angular frequency ω of the mover on the basis of the timing information Dpr outputted from the relative position detection unit 4b, and outputs the angular frequency information DCO that indicates the natural angular frequency ω. Here, the natural angular frequency detection unit 5b detects the angular frequency ω by obtaining the maximum value Mv0 of the speed of the mover and the maximum value Mx0 of the displacement on the basis of the timing information Dpr from the relative position detection unit 4b, and dividing the maximum value Mv0 of the speed of the mover by the maximum value Mx0 of the displacement of the mover.

The spring constant decision unit 6b receives the angular frequency information Dω from the natural angular frequency detection unit 5b, and calculates the spring constant k ($=\omega^2 \cdot m$) by squaring the natural angular frequency ω that is indicated by the angular frequency information Dω and multiplying the squared angular frequency by the mass m of the mover, and outputs spring constant information Dk that indicates the spring constant k.

Thereafter, the operation mode of the motor driving apparatus 101b switches from the arithmetic mode to the driving mode.

In the driving mode, the motor driving apparatus 101b according to the second embodiment operates in the same manner as in the first embodiment.

As described above, the motor driving apparatus 101b for driving the linear vibration motor 100 according to the second embodiment includes the mover force vibration unit 3a that makes the mover of the linear vibration motor 100 freely vibrate, the relative position detection unit 4b that detects the timings at which the mover that is freely vibrating passes through two fixed points (relative positions), respectively, and the natural angular frequency detection unit 5b that detects the natural angular frequency ω of the mover on the basis of the timing information Dpr from the relative position detection unit 4b, thereby deciding the spring constant k of the spring member from the detected natural angular frequency ω. Therefore, the mover position can be obtained by the position calculation using the spring constant k with great accuracy, thereby realizing miniaturization or power enhancement of the linear vibration motor as in the first embodiment.

Further, in this second embodiment, the spring constant k of the linear vibration motor is calculated immediately before the start of the operation of the linear vibration motor 100, like in the first embodiment. Therefore, even when the spring constant k varies with time, the position of the mover can be accurately obtained by the position calculation using the spring constant k.

In this second embodiment, the motor driving apparatus 101b calculates the spring constant k of the linear vibration motor 100 immediately before starting the operation of the linear vibration motor 100, while the motor driving apparatus 101b may calculate the spring constant k immediately after completing the operation of the linear vibration motor 100.

Embodiment 3

Figure 3:
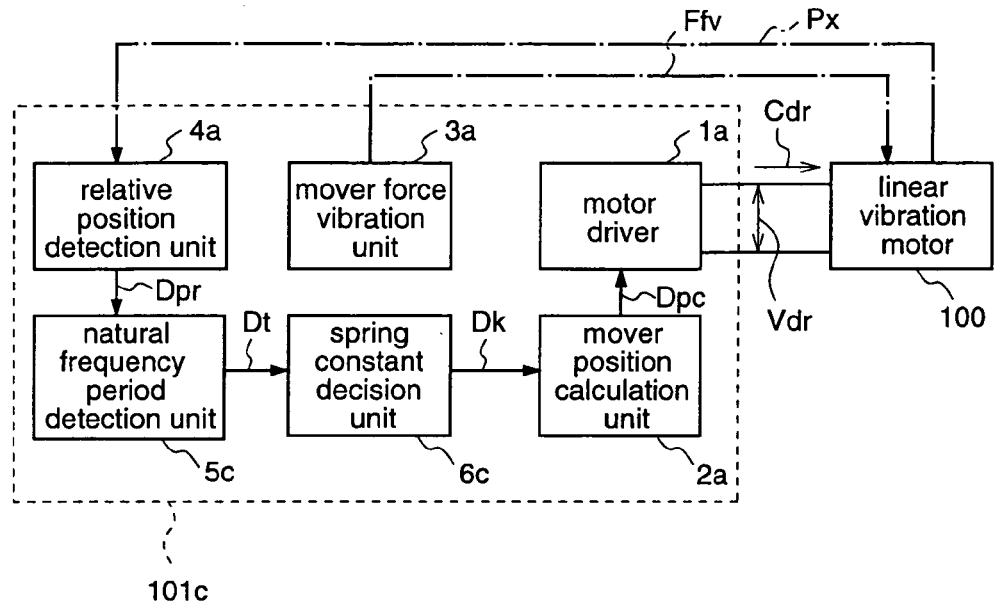
FIG. 3 is a block diagram for explaining a motor driving apparatus 101c according to a third embodiment of the present invention.

FIG. 3 is a block diagram for explaining a motor driving apparatus according to a third embodiment of the present invention.

The motor driving apparatus 101c according to the third embodiment is different from the motor driving apparatus 101a according to the first embodiment only in that the apparatus 101c calculates the spring constant k that is used at the position calculation for obtaining the position of the mover on the basis of a natural frequency period T of the mover.

That is, the motor driving apparatus 101c according to the third embodiment includes a natural frequency period detection unit 5c for detecting a natural frequency period T of the mover on the basis of a timing when the mover that is freely vibrating passes through a fixed point (relative position), in place of the natural frequency detection unit 5a of the motor driving apparatus 101a according to the first embodiment, and a spring constant decision unit 6c for deciding the spring constant k of the spring member on the basis of the natural frequency period T, in place of the spring constant decision unit 6a of the motor driving apparatus 101a according to the first embodiment.

Hereinafter, the motor driver 1a, the mover position calculation unit 2a, the mover force vibration unit 3a, the relative position detection unit 4a, the natural frequency period detection unit 5c, and the spring constant decision unit 6c, which are constituents of the motor driving apparatus 10c, will be described in more detail.

The motor driver 1a, the mover position calculation unit 2a, the mover force vibration unit 3a, and the relative position detection unit 4a are identical to those in the motor driving apparatus 101a according to the first embodiment.

The natural frequency period detection unit 5c detects the natural frequency period T of the mover on the basis of the timing information Dpr from the relative position detection unit 4a, and outputs the period information Dt that indicates the natural frequency period T. More specifically, the natural frequency period detection unit 5c detects a time period from when the mover has passed through a fixed point to when the mover passes through the fixed point again in the same direction on the basis of the timing information Dpr from the relative position detection unit 4a. In other words, the natural frequency detection unit 5c obtains the natural frequency period on the basis of a time period from when the mover has passed through a prescribed relative position with respect to the center of the vibration (usually, the center of the vibration of the mover itself is selected) to when the mover passes through the relative position again. Here, when a time period that is required for the mover to reciprocate several times is employed to detect the natural frequency period without using a time period that is required for the mover to go back and forth one time, the detection accuracy can be increased. Further, in the case of using the time period that is required for the mover to reciprocate several times, when the number of times of reciprocation is increased, the detection accuracy can be increased further.

As the method for obtaining the natural frequency period, there is not only the above-mentioned method of directly detecting a time period that is required for the mover to go back and forth one time, but also a method of detecting the number of times the mover passes through a fixed point within a prescribed time period, thereby detecting the natural frequency, and calculating the natural frequency period from the detected natural frequency. In this case, by making the prescribed time period, i.e., the time period for measuring the number of times the mover passes through the fixed points longer, the accuracy in the detection of the natural frequency period can be increased.

The spring constant decision unit $6c$ decides the spring constant k from the natural frequency period T that is detected by the natural frequency period detection unit $5c$, and outputs spring constant information Dk that indicates the spring constant k. More specifically, the operation for calculating the spring constant k in the spring constant decision unit $6c$ $(=1/(T/2\pi)^2 \cdot (1/m))$ is an operation of dividing the natural frequency period T by a twofold of the ratio of the circumference to the diameter, squaring the result of the division, multiplying the squared value by an inverse of the mass of the mover, and calculating an inverse of the result of the multiplication.

Next, the operation of the motor driving apparatus will be described.

In the motor driving apparatus $101c$ according to the third embodiment, when an instruction signal that instructs a start of the operation of the linear vibration motor is inputted to the control unit by a user operation, the respective components $1a$, $2a$, $3a$, $4a$, $5c$, and $6c$ of the motor driving apparatus $101c$ are controlled in accordance with a control signal from the control unit (not shown) so that the operation mode of the motor driving apparatus $101c$ temporarily becomes the arithmetic mode and then turns into the driving mode, as in the first embodiment.

Initially, the operation of the motor driving apparatus in the arithmetic mode for deciding the spring constant k of the linear vibration motor 100 will be described.

In the motor driving apparatus $101c$ according to the third embodiment, the mover force vibration unit $3a$ and the relative position detection unit $4a$ operate in the same manners as in the motor driving apparatus $101a$ according to the first embodiment.

In this third embodiment, the natural frequency period detection unit $5c$ detects the natural frequency period T of the mover on the basis of the timing information Dpr from the relative position detection unit $4a$, and outputs period information Dt that indicates the natural frequency period T. For example, the natural frequency period detection unit $5c$ detects a time period from when the mover has passed through a fixed point to when the mover passes through the fixed point again in the same direction.

The spring constant decision unit $6c$ receives the period information Dt from the natural frequency period detection unit $5c$, calculates the spring constant $k(=1/(T/2\pi)^2 \cdot (1/m))$ according to an operation of dividing the natural frequency period T that is indicated by the period information Dt by a twofold of the ratio of the circumference to the diameter ($\pi$), squaring the result of the division, multiplying the squared value by an inverse of the mass of the mover, and calculating an inverse of the result of the multiplication, and outputs spring constant information Dk that indicates the spring constant k.

Thereafter, the operation mode of the motor driving apparatus $101c$ switches from the arithmetic mode to the driving mode.

In the driving mode, the motor driving apparatus $101c$ according to the third embodiment operates in the same manner as in the first embodiment.

As described above, the motor driving apparatus $101c$ according to the third embodiment for driving the linear vibration motor 100 includes the mover force vibration unit $3a$ that makes the mover of the linear vibration motor 100 freely vibrate, the relative position detection unit $4a$ that detects a timing when the mover that is freely vibrating passes through a fixed point (relative position), and the natural frequency period detection unit $5c$ that detects the natural frequency period T of the mover on the basis of the timing information Dpr that indicates the detected timing, thereby deciding the spring constant k of the spring member from the detected natural frequency period T. Therefore, a highly accurate mover position can be obtained by the position calculation using the spring constant k, whereby miniaturization or power enhancement of the linear vibration motor can be realized as in the first embodiment.

Further, in this third embodiment, the spring constant k of the linear vibration motor 100 is calculated immediately before the start of the operation of the linear vibration motor, like in the first embodiment. Therefore, even when the spring constant k varies with time, the position of the mover can be more accurately obtained by the position calculation using the spring constant.

In this third embodiment, the motor driving apparatus $101c$ calculates the spring constant k of the linear vibration motor 100 immediately before starting the operation of the linear vibration motor 100, while the motor driving apparatus $101c$ may calculate the spring constant k immediately after completing the operation of the linear vibration motor 100.

Embodiment 4

Figure 4:
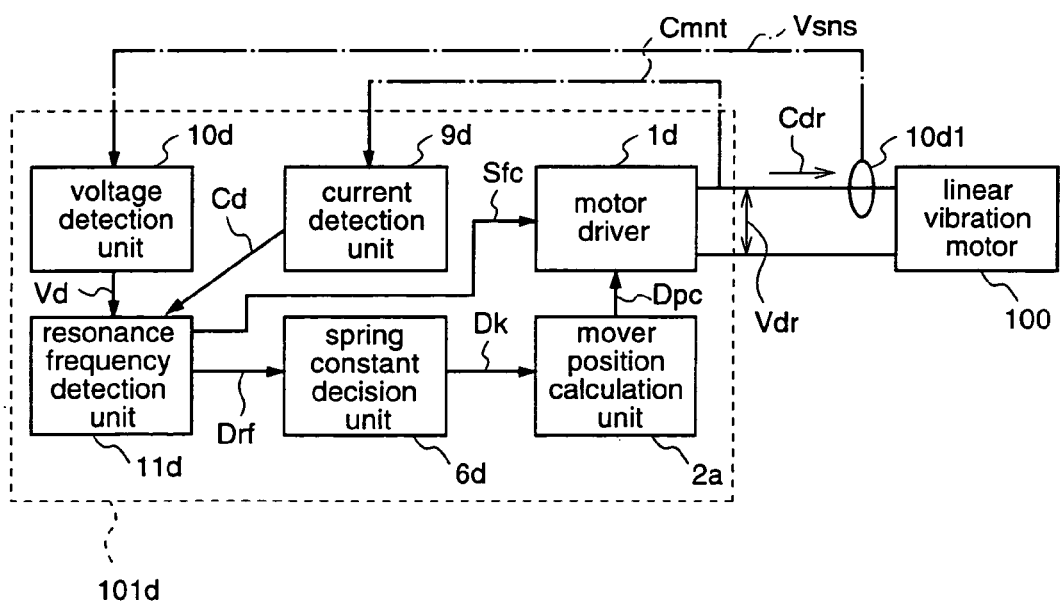
FIG. 4 is a block diagram for explaining a motor driving apparatus 101d according to a fourth embodiment of the present invention.

FIG. 4 is a block diagram for explaining a motor driving apparatus according to a fourth embodiment of the present invention.

The motor driving apparatus $101d$ according to the fourth embodiment has two operation modes of operating the linear vibration motor. One of the operation modes is a driving mode of driving the linear vibration motor 100 with a driving voltage or a driving current corresponding to a required motor output, thereby operating a load that is connected to the linear vibration motor 100. The other operation mode is an arithmetic mode of controlling a driving frequency of the linear vibration motor 100 to detect a resonance frequency, and calculating a spring constant k of a spring member that support the mover on the basis of the resonance frequency. In the driving mode, the motor driving apparatus $101d$ operates the load, as well as calculates the position of the linear vibration motor on the basis of the calculated spring constant k, the driving current, and the driving voltage, and controls the driving of the linear vibration motor according to the calculated position of the mover.

More specifically, the motor driving apparatus $101d$ according to the fourth embodiment includes a motor driver $1d$ for driving/controlling the linear vibration motor 100 on the basis of position information Dpc that indicates the position Px of the mover, and a mover position calculation unit $2a$ for performing position calculation of calculating the position Px of the mover on the basis of the spring constant k of the spring member in the linear vibration motor 100.

The motor driving apparatus $101d$ further includes a current detection unit $9d$ for detecting a driving current Cdr that is supplied to the linear vibration motor 100, a voltage detection unit $10d$ for detecting a driving voltage Vdr that is applied to the linear vibration motor 100, a resonance frequency detection unit $11d$ for controlling the motor driver $1d$ on the basis of the detected driving current Cdr and the detected driving voltage Vdr and detecting a resonance driving frequency f' of the linear vibration motor 100, and a spring constant decision unit $6d$ for deciding a spring constant k of the spring member on the basis of the detected resonance driving frequency f' and outputting spring constant information Dk that indicates the spring constant k to the mover position detection unit 2a.

In this fourth embodiment, the motor driving apparatus 101d further includes a control unit (not shown) for controlling the respective components 1d, 2a, 6d, 9d, 10d, and 11d of the motor driving apparatus 101d on the basis of an instruction signal according to a user operation. Immediately before the start of the operation of the linear vibration motor, the operation mode of the motor driving apparatus 101d temporarily becomes the arithmetic mode for calculating the spring constant by the control of the control unit, and thereafter turns into the driving mode for operating the load.

Hereinafter, the linear vibration motor, and the motor driver 1d, the mover position calculation unit 2a, the current detection unit 9d, the voltage detection unit 10d, the resonance frequency detection unit 11d, and the spring constant decision unit 6d, which are constituents of the motor driving apparatus 101d, will be described in more detail.

Here, the linear vibration motor 100 and the mover position calculation unit 2a are the same as those in the first embodiment.

The motor driver 1d applies the driving voltage Vdr to the linear vibration motor 100 as well as controls the driving voltage Vdr. In the driving mode, the motor driver 1d controls the driving voltage that is applied to the linear vibration motor 100 so that the driving voltage has a level corresponding to a motor output that is required by the linear vibration motor 100, while in the arithmetic mode, the motor driver 1d controls the driving voltage so that the driving frequency of the linear vibration motor 100 becomes the resonance frequency in accordance with a driving frequency control signal Sfc from the resonance frequency detection unit 11d.

When an AC voltage is applied as the driving voltage, the linear vibration motor 100 can make the mover as a constituent of the linear vibration motor 100 reciprocate at a frequency that is the same as the frequency of the applied voltage. When a DC voltage is applied as the driving voltage, a thrust of the mover at a prescribed level occurs.

The current detection unit 9d detects a driving current Cdr that is supplied from the motor driver 1d to the linear vibration motor 100, i.e., outputs a current detection signal Cd which indicates the driving current in accordance with a current monitor signal Cmnt that is obtained by monitoring the driving current Cdr. As a specific example of the current detection method, there are considered a method that utilizes a contactless current sensor or a method that utilizes a Shunt resistance.

The voltage detection unit 10d includes a voltage sensor 10d1 that detects a driving voltage Vdr which is applied from the motor driver 1d to the linear vibration motor 100, and outputs a voltage detection signal Vd that indicates the driving voltage Vdr on the basis of the output (sensor output) Vsns from the sensor 10d1. In this case, a method of utilizing the voltage sensor is shown as a specific example of the voltage detection method. However, as the driving voltage detection method, there are considered a method of measuring the driving voltage by directly subjecting the driving voltage that is applied to the linear vibration motor to resistance division, or a method of estimating the driving voltage Vdr from voltage information indicating the driving voltage Vdr which is generated in the motor driver 1d.

The resonance frequency detection unit 11d detects the resonance driving frequency f' of the linear vibration motor on the basis of the current detection signal Cd from the current detection unit 9d and the voltage detection signal Vd from the voltage detection unit 10d. More specifically, the resonance frequency detection unit 11d controls the motor driver 1d so that the driving frequency of the linear vibration motor in a state where the amplitude of the driving current that is supplied to the linear vibration motor 100 is fixed becomes a frequency that maximizes the power supplied to the linear vibration motor, detects the resonance driving frequency (hereinafter, also referred to simply as a resonance frequency) f' of the linear vibration motor on the basis of the driving frequency that maximizes the supplied power, and outputs resonance frequency information Drf that indicates the detected resonance frequency f'.

The spring constant decision unit 6d decides the spring constant k from the resonance frequency f' that is detected by the resonance frequency detection unit 11d, and outputs spring constant information Dk that indicates the spring constant k. More specifically, the spring constant decision unit 6d calculates the spring constant k $(=(f' \cdot 2\pi)^2 \cdot m)$ by multiplying the resonance frequency f' by a twofold of the ratio of the circumference to the diameter $(\pi)$, squaring the result of the multiplication, and further multiplying the squared value by the mass m of the mover.

In addition, it is desirable that the operation of the spring constant decision unit 6d for deciding the spring constant k be performed when the linear vibration motor 100 has no spring load. To be more specific, when the load includes a spring element, a combination of a spring constant of the linear vibration motor and a spring constant of the spring element of the load is calculated, and thus the accurate spring constant of the linear vibration motor 100 cannot be obtained. Thus, in this case, it is assumed that the operation in the arithmetic mode for calculating the spring constant is carried out under a no load state.

Next, the operation of the motor driving apparatus will be described.

In the motor driving apparatus 101d according to the fourth embodiment, when an instruction signal that instructs a start of the operation of the linear vibration motor is inputted to the control unit by a user operation, the respective components 1d, 2a, 6d, 9d, 10d, and 11d of the motor driving apparatus 101d are controlled in accordance with a control signal from the control unit (not shown) so that the operation mode of the motor driving apparatus 101d temporarily becomes the arithmetic mode and then turns into the driving mode.

Initially, the operation of the motor driving apparatus in the arithmetic mode for deciding the spring constant k of the spring member of the linear vibration motor 100 will be described.

The motor driver 1d supplies a driving voltage or a driving current to the linear vibration motor 100 in accordance with a control signal from the control unit (not shown) to drive the linear vibration motor 100. At this time, the voltage detection unit 10d detects the driving voltage Vdr on the basis of a sensor output Vsns from the voltage sensor 10d1, and outputs a voltage detection signal Vd. The current detection unit 9d detects the driving current Cdr that is supplied from the motor driver 1d to the linear vibration motor 100, and outputs a current detection signal Cd.

The resonance frequency detection unit 11d outputs a driving frequency control signal Sfc to the motor driver 1d in accordance with the output signal Vd from the voltage detection unit 10d and the output signal Cd from the current detection unit 9d. Then, the motor driver 1d controls the frequency of the driving voltage Vdr that is applied to the linear vibration motor 100 so that the driving frequency of the linear vibration motor 100 becomes a frequency that maximizes the power supplied to the linear vibration motor 100, and detects a resonance frequency f' that is the frequency which maximizes the power supplied to the linear vibration motor.

The spring constant decision unit 6d calculates the spring constant k on the basis of the frequency information Drf that indicates the resonance frequency f' detected by the resonance frequency detection unit 11d according to an operation of multiplying the resonance frequency f' by a twofold of the ratio of the circumference to the diameter, squaring the result of the multiplication, and further multiplying the squared value by the mass of the mover, and outputs spring constant information Dk that indicates the calculated spring constant.

Thereafter, the operation mode of the motor driving apparatus 101d switches from the arithmetic mode to the driving mode.

Hereinafter, the operation in the driving mode will be described.

The motor driver 1d applies an AC voltage (driving voltage) Vdr to the linear vibration motor 100 by a control of the control unit (not shown). Thereby, the linear vibration motor 100 is driven.

At this time, the mover position calculation unit 2a performs position calculation for obtaining the position of the mover on the basis of the driving current Cdr and the driving voltage Vdr which are applied to the linear vibration motor 100, using the spring constant k that is calculated by the spring constant decision unit 6d, and outputs mover position information Dpc which indicates the calculated mover position to the motor driver 1d.

Then, the motor driver 1d controls the level of the driving voltage Vdr that is applied to the linear vibration motor 100 on the basis of the position information Dpc so that the mover that reciprocates does not exceed its critical position.

As described above, the motor driving apparatus 101d according to the fourth embodiment for driving the linear vibration motor 100 includes the current detection unit 9d that detects the driving current Cdr that is supplied to the linear vibration motor 100, the voltage detection unit 10d that detects the driving voltage Vdr that is applied to the linear vibration motor 100, and the resonance frequency detection unit 11d that detects the resonance frequency f' of the linear vibration motor 100 by controlling the motor driver 1d on the basis of the detected driving current Cdr and the detected driving voltage Vdr, thereby deciding the spring constant k of the spring member on the basis of the detected resonance frequency f'. Therefore, the position of the mover can be obtained by the position calculation using the spring constant k with great accuracy, whereby miniaturization or power enhancement of the linear vibration motor can be realized as in the first embodiment.

Further, in this fourth embodiment, the spring constant k of the linear vibration motor 100 is calculated immediately before the start of the operation of the linear vibration motor, like in the first embodiment. Therefore, even when the spring constant k varies with time, the position of the mover can be accurately obtained according to the position calculation.

In this fourth embodiment, the motor driving apparatus 101d calculates the spring constant k of the linear vibration motor 100 immediately before the start of the operation of the linear vibration motor 100, while the motor driving apparatus 101d may calculate the spring constant k immediately after the completion of the operation of the linear vibration motor 100.

In this case, during the operation of the linear vibration motor, the position calculation for obtaining the position of the mover is performed using the spring constant k that was calculated immediately after the end of the previous operation of the linear vibration motor. Therefore, also in this case, the position calculation for obtaining the position of the mover can be always performed using the spring constant k in the latest state of the linear vibration motor. Accordingly, even when the spring constant varies with time, it is possible to obtain the position of the mover with accuracy according to the position calculation.

Further, since in this case the calculation of the spring constant k is performed immediately after the end of the operation of the linear vibration motor, the spring constant k is calculated in a state where the temperature of the motor is approximately the same as the actual temperature of a time when the linear vibration motor was operating. That is, although the spring constant k varies according to the temperature, an accurate spring constant k at the operation of the linear vibration motor can be obtained by calculating the spring constant k at a temperature when the motor was actually working. Accordingly, the position calculation for obtaining the mover position can be achieved with higher accuracy.

Further, in this case, as the calculation of the spring constant k is performed after the end of the operation of the linear vibration motor, it is possible to obtain the spring constant k without hindering the operation of the linear vibration motor.

Further, in this fourth embodiment, the resonance frequency detection unit 11d controls the motor driver 1d under a state where the amplitude of the driving current that is supplied to the linear vibration motor 100 is fixed, so that the driving frequency of the linear vibration motor becomes a frequency that maximizes the power supplied to the linear vibration motor, and detects the resonance frequency f' of the linear vibration motor on the basis of the driving frequency that maximizes the supplied power. However, the resonance frequency detection unit 11d may detect the resonance frequency from a phase difference between the driving current and the driving voltage under a state where the linear vibration motor is resonating.

To be brief, the phase difference between the driving current and the driving voltage is not always fixed but uniquely decided on the basis of the amplitude of the driving current, the driving frequency, and an induced voltage value (the amplitude or effective value of the induced voltage).

Accordingly, the resonance frequency detection unit lid may control the frequency of the driving voltage that is applied from the motor driver 1d so that the phase difference between the driving voltage and the driving current becomes a phase difference in the resonant state, which is uniquely decided from the amplitude of the driving current, the driving frequency, and the induced voltage value, and decide the resonance frequency at a frequency of the driving voltage when the phase difference between the driving voltage and the driving current becomes a phase difference in the resonant state.

In addition, in this fourth embodiment, the motor driving apparatus 101d has the two operation modes, i.e., the driving mode and the arithmetic mode. In the driving mode, the motor driving apparatus 101d drives the linear vibration motor 100 at a driving voltage value (or a driving current value) corresponding to a required motor output, while in the arithmetic mode, the motor driving apparatus 101d detects the resonance frequency of the linear vibration motor 100 and obtains (calculates) the spring constant on the basis of the detected resonance frequency. However, it is also possible that the motor driving apparatus 101d has only one operation mode (driving mode) for operating the load of the linear vibration motor and, in this driving mode, detects the resonance frequency of the linear vibration motor and drives the linear vibration motor at the detected resonance frequency as well as decides (calculates) the spring constant k on the basis of the detected resonance frequency.

Embodiment 5

Figure 5:
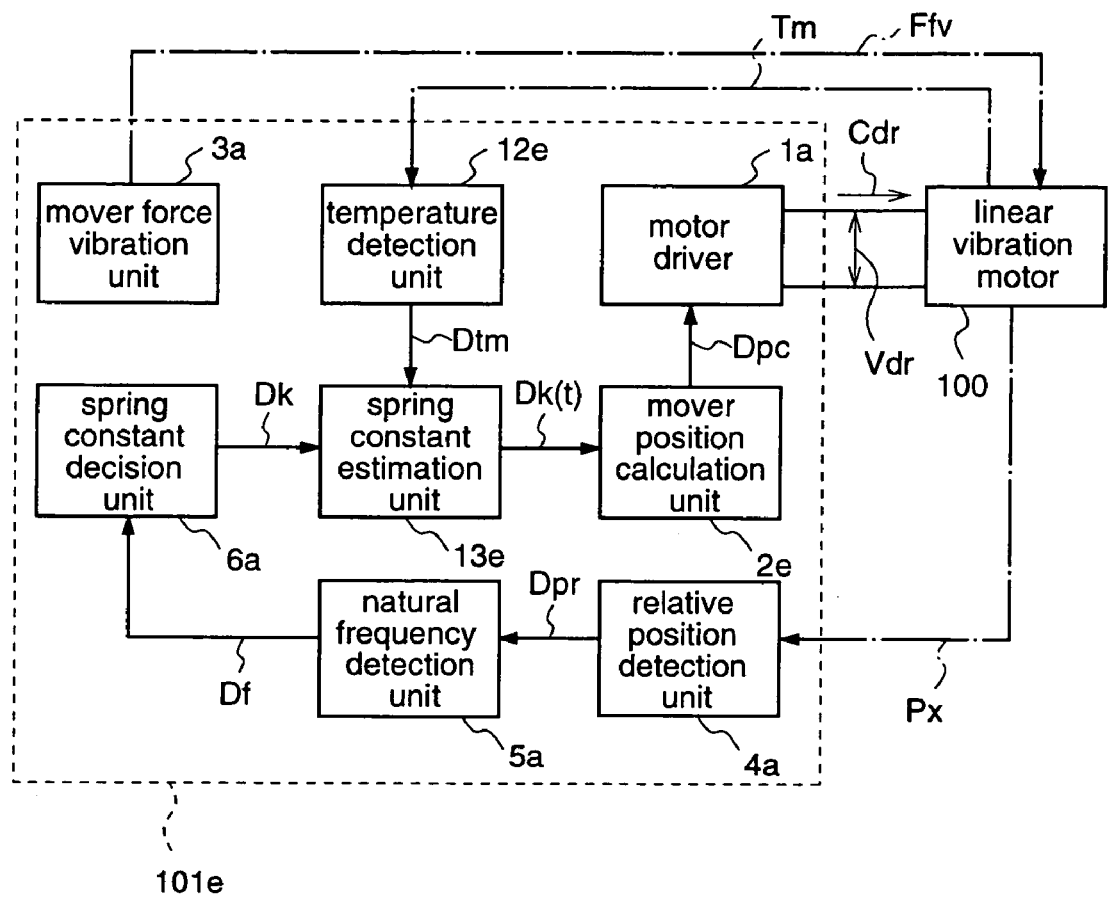
FIG. 5 is a block diagram for explaining a motor driving apparatus 101e according to a fifth embodiment of the present invention.

FIG. 5 is a block diagram for explaining a motor driving apparatus according to a fifth embodiment of the present invention.

The motor driving apparatus 101e has two operation modes for operating the linear vibration motor. One of the operation modes is a driving mode of driving the linear vibration motor 100 with a driving voltage or a driving current corresponding to a motor output, to operate a load of the linear vibration motor. The other operation mode is an arithmetic mode of calculating the spring constant k of the spring member of the linear vibration motor 100 and deriving a relationship between the spring constant k and the motor temperature T (spring constant-temperature function) Qa. In the driving mode, the motor driving apparatus 101e estimates the spring constant of the linear vibration motor from the motor temperature Tm on the basis of the spring constant-temperature function Qa, calculates the position of the mover using the estimated spring constant k(t), and controls the driving of the linear vibration motor 100 according to the calculated position of the mover.

The linear vibration motor 100 is the same as that in the first embodiment.

More specifically, the motor driving apparatus 101e according to the fifth embodiment includes a motor driver 1a for driving/controlling the linear vibration motor 100 on the basis of position information Dpc which indicates the position Px of the mover, and a mover position calculation unit 2e for performing position calculation of calculating the position Px of the mover on the basis of the spring constant k(t) that is estimated in the driving mode of the linear vibration motor 100.

Here, the motor driver 1a is identical to that in the first embodiment. The mover position calculation unit 2e obtains the position Px of the mover at a time when the linear vibration motor 100 is reciprocating by a position calculation operation, as the mover position calculation unit 2a according to the first embodiment. As a specific position calculation operation, the position Px of the mover is calculated using the equation of motion of the linear vibration motor 100, as described in the first embodiment or the prior art. In this mover position calculation unit 2e according to the fifth embodiment, an estimated spring constant k(t) that is estimated from the motor temperature Tm is used in the position calculation as the spring constant.

The motor driving apparatus 101e includes a mover force vibration unit 3a for temporarily applying a forced vibration force Ffv to the mover of the linear vibration motor 100 to make the mover freely vibrate, a relative position detection unit 4a for detecting a timing when the mover of the linear vibration motor 100 passes through a prescribed relative position with respect to a reference position such as the center of the vibration under a state where the mover is freely vibrating, and outputting timing information Dpr which indicates the detected timing, and a natural frequency detection unit 5a for detecting a natural frequency fpv of the spring vibration system on the basis of the timing information Dpr. Here, the mover force vibration unit 3a, the relative position detection unit 4a, and the natural frequency detection unit 5a are identical to those in the first embodiment.

The motor driving apparatus 101e further includes a spring constant decision unit 6a for deciding a spring constant k of the spring member from the detected natural frequency fpv and outputting spring constant information Dk that indicates the decided spring constant, a temperature detection unit 12e for detecting a motor temperature Tm of the linear vibration motor 100 and outputting temperature information Dtm that indicates the detected motor temperature Tm, and a spring constant estimation unit 13e that estimates the spring constant of the spring member of the linear vibration motor that is operating on the basis of the spring constant information Dk and the temperature information Dtm.

Here, the temperature detection unit 12e comprises a temperature sensor that is mounted on the linear vibration motor 100 to monitor the motor temperature Tm. The spring constant decision unit 6a is identical to that in the first embodiment. More specifically, the spring constant decision unit 6a decides (calculates) the spring constant k by multiplying the natural frequency fpv that is detected by the natural frequency detection unit 5a by a twofold of the ratio of the circumference to the diameter, squaring the result of the multiplication, and further multiplying the squared value by the mass of the mover, and outputs spring constant information Dk that indicates the decided spring constant k. In the arithmetic mode, the spring constant estimation unit 13e derives a spring constant-temperature function Qa that shows a relationship between the spring constant k and the motor temperature Tm on the basis of the spring constant information Dk and the temperature information Dtm. In the driving mode, the spring constant estimation unit 13e estimates the spring constant of the linear vibration motor that is operated in the loaded state from the detected motor temperature Tm using the spring constant-temperature function Qa, and outputs estimated spring constant information Dk(t) that indicates the estimated spring constant k(t). Here, the spring constant estimation unit 13e performs the derivation of the spring constant-temperature function Qa on the basis of a temperature coefficient αk of the spring member, which indicates a ratio of a change in the spring constant relative to the change in the temperature. More specifically, the spring constant estimation unit 13e holds a temperature coefficient αk depending on the spring member in its internal memory, and derives the spring constant-temperature function Qa as a linear function that indicates the correspondence between the spring constant k and the motor temperature Tm from the spring constant k of the spring member, which has been decided in the arithmetic mode by the spring constant decision unit 6a, the motor temperature Tm which has been detected in the arithmetic mode by the temperature detection unit 12e, and the temperature coefficient αk of the spring member, which is held in the internal memory.

Here, the spring constant-temperature function Qa is not limited to the linear function that indicates the correspondence between the spring constant k and the motor temperature Tm, but may be a two-dimensional-matrix that indicates the correspondence between the spring constant k and the motor temperature Tm.

As described above, the motor driving apparatus 101e according to the fifth embodiment estimates the spring constant k(t) of the linear vibration motor from the motor temperature Tm in the driving mode, calculates the position of the mover from the estimated spring constant k(t), and controls the driving of the linear vibration motor according to the calculated position of the mover.

Next, the operation of the motor driving apparatus will be described.

In the motor driving apparatus 101e according to the fifth embodiment, when an instruction signal that instructs a start of the operation of the linear vibration motor is inputted to the control unit by a user operation, the respective components 1a, 2e, 3a, 4a, 5a, 6a, 12e, and 13e of the motor driving apparatus 101e are controlled in accordance with a control signal from the control unit (not shown) so that the operation mode of the motor driving apparatus 101e temporarily becomes the arithmetic mode and then turns into the driving mode, as in the first embodiment.

Hereinafter, the operation of the motor driving apparatus in the arithmetic mode for deciding the spring constant k of the spring member of the linear vibration motor 100 will be described.

The mover force vibration unit 3a temporarily applies a forced vibration force Ffv to the mover of the linear vibration motor 100 in accordance with the control signal from the control unit (not shown) in the arithmetic mode, i.e., under the state where the linear vibration motor 100 is not operated, thereby making the mover freely vibrate.

The relative position detection unit 4a detects a timing when the mover that freely vibrates passes through a fixed point (relative position), and outputs timing information Dpr that indicates the detected timing.

The natural frequency detection unit 5a detects the natural frequency f of the spring vibration system on the basis of the timing information Dpr from the relative position detection unit 4a. More specifically, the natural frequency detection unit 5a detects the number of times the freely vibrating mover passes through a fixed point (usually, the center of the vibration of the mover) within a prescribed time period, and outputs frequency information Df that indicates the natural frequency f.

The spring constant decision unit 6a calculates the spring constant k using the natural frequency f that is detected by the natural frequency detection unit 5a according to an operation of multiplying the natural frequency f by a twofold of the ratio of the circumference to the diameter ($\pi$), squaring the result of the multiplication, and further multiplying the squared value by the mass of the mover, and outputs spring constant information Dk that indicates the spring constant to the spring constant estimation unit 13e.

At this time, the temperature detection unit 12e detects the motor temperature Tm of the linear vibration motor 100, and outputs temperature information Dtm that indicates the detected motor temperature to the spring constant estimation unit 13e.

Then, the spring constant estimation unit 13e derives a spring constant-temperature function Qa that shows the relationship between the spring constant k and the motor temperature Tm on the basis of the temperature coefficient $\alpha$ k of the spring member, which is held in its internal memory, the spring constant information Dk, and the temperature information Dtm, and holds the data of the derived function Qa in its internal memory.

Thereafter, the operation mode of the motor driving apparatus 101e switches from the arithmetic mode to the driving mode.

Hereinafter, the operation of the motor driving apparatus in the driving mode will be described.

When the motor driver 1a applies an AC voltage (driving voltage) Vdr to the linear vibration motor 100, the linear vibration motor 100 is driven and an operation of a load that is connected to the linear vibration motor is started.

At this time, the temperature information Dtm indicating the motor temperature Tm that is detected by the temperature detection unit 12e is inputted to the spring constant estimation unit 13e, and the spring constant estimation unit 13e estimates the spring constant in a state where the linear vibration motor is operated from the detected motor temperature Tm on the basis of the spring constant-temperature function Qa, and outputs estimated spring constant information Dk(t) that indicates the estimated spring constant k(t) to the mover position calculation unit 2e.

Then, the mover position calculation unit 2e performs the position calculation operation for obtaining the position of the mover on the basis of the driving current Cdr and the driving voltage Vdr which are applied to the motor driver 1a, using the estimated spring constant k(t) indicated by the estimated spring constant information Dk(t), and outputs position information Dpc that indicates the calculated position Px of the mover to the motor driver 1a.

Then, the motor driver 1a controls the level of the driving voltage Vdr that is applied to the linear vibration motor 100 on the basis of the position information Dpc so that the mover that is reciprocating does not exceed the critical position.

As described above, the motor driving apparatus 101e according to the fifth embodiment for driving the linear vibration motor 100 includes the mover force vibration unit 3a that makes the mover of the linear vibration motor 100 freely vibrate, the natural frequency detection unit 5a that detects the natural frequency f of the mover on the basis of the freely vibrating state of the mover, the spring constant decision unit 6a that decides the spring constant k on the basis of the detected natural frequency f, and the temperature detection unit 12e that detects the temperature of the linear vibration motor. Then, in the arithmetic mode, the motor driving apparatus derives the relationship Qa between the spring constant k and the motor temperature Tm on the basis of the temperature coefficient $\alpha$k of the spring constant, the detected motor temperature Tm, and the decided spring constant k, while in the driving mode, the motor driving apparatus estimates the spring constant k(t) in the load operating state from the motor temperature Tm that has been detected under the operating state using the spring constant-temperature function Qa. Therefore, under the state where the motor is operated, the position calculation for obtaining the position of the mover is performed using the estimated spring constant k(t) corresponding to the motor temperature Tm, whereby the position of the mover can be obtained in the motor operating state with higher accuracy.

Accordingly, the control of the position of the mover during the operation of the motor can performed with great accuracy, whereby the clearance between the mover and the housing of the linear vibration motor can be further reduced, thereby realizing further miniaturization or power enhancement of the linear vibration motor.

Further, since in this fifth embodiment the spring constant of the linear vibration motor 100 is calculated immediately before the start of the operation of the linear vibration motor, even when the spring constant of the linear vibration motor varies with time, it is possible to calculate the position of the mover with great accuracy by the position calculation for obtaining the position of the mover.

In this first embodiment, the motor driving apparatus 101e performs the calculation of the spring constant k of the linear vibration motor 100 and the detection of the motor temperature Tm immediately before the start of the operation of the linear vibration motor 100, to derive the spring constant-temperature function Qa and, during the operation, estimates the spring constant k(t) from the motor temperature Tm using the spring constant-temperature function Qa that was derived immediately before the start of the operation. However, the motor driving apparatus 101e may derive the spring constant-temperature function Qa by performing the calculation of the spring constant k of the linear vibration motor 100 and the detection of the motor temperature Tm immediately after the end of the operation of the linear vibration motor 100 and, during the operation, estimate the spring constant k(t) from the motor temperature Tm using the spring constant-temperature function Q that was derived at the end of the previous operation.

Further, the motor driving apparatus 101e may derive the spring constant-temperature function Qa by performing the calculation of the spring constant k of the linear vibration motor 100 and the detection of the motor temperature Tm immediately before the start of the operation of the linear vibration motor 100 and immediately after the end of the operation.

In this case, it is desirable that the operation for obtaining the position of the mover in the driving mode should be performed using an average value of the spring constant that is obtained from the spring constant-temperature function Qa which was derived immediately before the start of the present operation, and the spring constant that is obtained from the spring constant-temperature function Qa which was derived immediately after the end of the previous operation.

Further, in this fifth embodiment, the spring constant estimation unit 13e derives the spring constant-temperature function Qa using the temperature coefficient αk of the spring member, which was previously held in the internal memory, while the method of driving the spring constant-temperature function Qa is not restricted to one that utilizes the temperature coefficient αk of the spring member.

For example, the spring constant estimation unit 13e may derive the spring constant-temperature function Qa from the spring constants at different temperatures by performing the calculation of the spring constant k of the linear vibration motor 100 and the detection of the motor temperature Tm immediately before the start of the operation of the linear vibration motor 100 and further performing the calculation of the spring constant k of the linear vibration motor 100 and the detection of the motor temperature Tm immediately after the end of the operation of the linear vibration motor, and estimate the spring constant from the motor temperature using the derived spring constant-temperature function Qa at the next operation.

Further, the spring constant estimation unit 13e may update the spring constant-temperature function each time the spring constant is calculated at a different temperature.

In this fifth-embodiment, the motor driving apparatus 101e decides the spring constant k on the basis of the natural frequency f, as in the first embodiment. However, the motor driving apparatus can decide the spring constant k on the basis of the natural angular frequency ω as in the second embodiment, or decide the spring constant k on the basis of the natural frequency period T as in the third embodiment. Further, the motor driving apparatus 101e can decide the spring constant k on the basis of the resonance frequency that is obtained by the detected driving voltage and the detected driving current as in the fourth embodiment.

Embodiment 6

Figure 6:
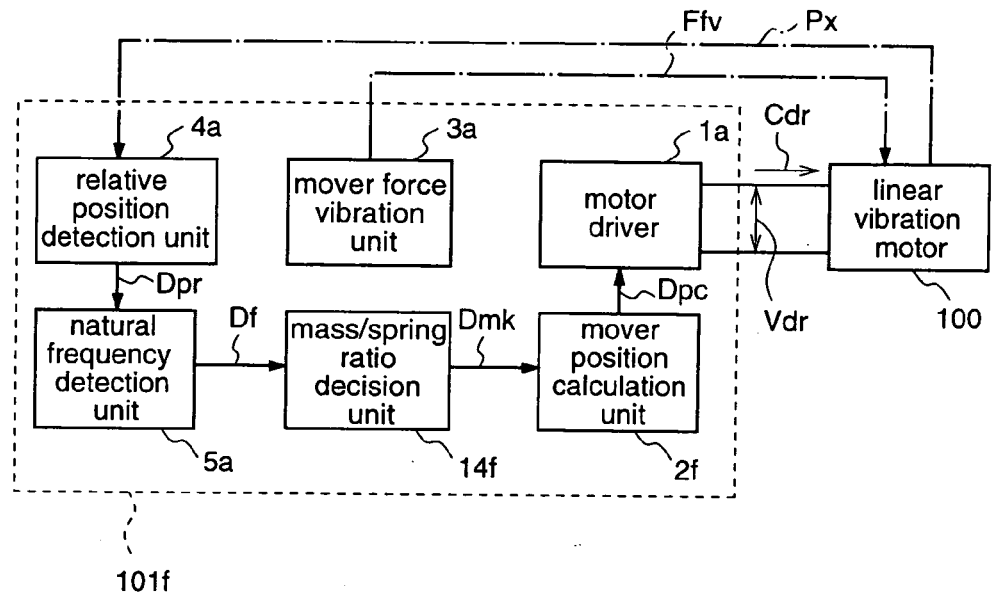
FIG. 6 is a block diagram for explaining a motor driving apparatus 101f according to a sixth embodiment of the present invention.

FIG. 6 is a block diagram for explaining a motor driving apparatus according to a sixth embodiment of the present invention.

The motor driving apparatus 101f according to the sixth embodiment drives/controls the linear vibration motor 100 according to the position of the mover like in the motor driving apparatus 101a according to the first embodiment, and it is different from the motor driving apparatus of the first embodiment only in that the apparatus 101f performs the position calculation operation for obtaining the position of the mover using a mass/spring ratio rmk of the spring vibration system, which is a ratio between the mass of the mover and the spring constant of the spring member.

More specifically, the motor driving apparatus 101f according to the sixth embodiment includes a mass/spring ratio decision unit 14f for deciding a mass/spring ratio rmk of the spring vibration system on the basis of the natural frequency f of the mover, in place of the spring constant decision unit 6a of the motor driving apparatus 101a according to the first embodiment, and a mover position calculation unit 2f for performing an operation for obtaining the position of the mover on the basis of the decided mass/spring ratio rmk, in place of the mover position calculation unit 2a of the motor driving apparatus 101a according to the first embodiment.

Hereinafter, the motor driver 1a, the mover position calculation unit 2f, the mover force vibration unit 3a, the relative position detection unit 4a, the natural frequency detection unit 5a, and the mass/spring ratio decision unit 14f, which are constituents of the motor driving apparatus 101f, will be described in more detail.

Here, the motor driver 1a, the mover force vibration unit 3a, the relative position detection unit 4a, and the natural frequency detection unit 5a are identical to those in the motor driving apparatus 101a according to the first embodiment.

The mass/spring ratio decision unit 14f decides a mass/spring ratio rmk from the natural frequency f of the mover, which is detected by the natural frequency detection unit 5a, and outputs mass/spring ratio information Drmk that indicates the decided mass/spring ratio rmk. Here, as a specific operation for deciding the mass/spring ratio rmk, the natural frequency f is multiplied by a twofold of the ratio of the circumference to the diameter (π), the result of the multiplication is squared, and the inverse of the squared value is obtained.

The mover position calculation unit 2f obtains the position Px of the mover of the linear vibration motor 100 when the mover is reciprocating, according to an operation using the equation of motion of the linear vibration motor 100, as the mover position calculation unit 2a. The mover position calculation unit 2f according to the sixth embodiment is different from the mover position calculation unit 2a according to the first embodiment in that the calculation unit 2f uses the mass/spring ratio (m/k) that is decided by the mass/spring ratio decision unit 14f at the operation for calculating the position of the mover.

Next, the operation of the motor driving apparatus will be described.

In the motor driving apparatus 101f according to the sixth embodiment, when an instruction signal that instructs a start of the operation of the linear vibration motor is inputted to the control unit by a user operation, the respective components 1a, 2f, 3a, 4a, 5a, and 14f of the motor driving apparatus 101f are controlled in accordance with a control signal from the control unit (not shown) so that the operation mode of the motor driving apparatus 101f temporarily becomes the arithmetic mode and then turns into the driving mode, like in the first embodiment.

Initially, the operation of the motor driving apparatus in the arithmetic mode for deciding the mass/spring ratio rmk of the spring vibration system of the linear vibration motor 100 will be described.

In the motor driving apparatus 101$f$ according to the sixth embodiment, the mover force vibration unit 3$a$, the relative position detection unit 4$a$, and the natural frequency detection unit 5$a$ operate in the same manners as those in the motor driving apparatus 101$a$ according to the first embodiment.

In this sixth embodiment, the mass/spring ratio decision unit 14$f$ calculates the mass/spring ratio rmk ($=1/(f\cdot 2\pi)^2=$m/k) on the basis of the frequency information Df from the natural frequency detection unit 5$a$ according to an operation of multiplying the natural frequency f that is indicated by the frequency information Df by a twofold of the ratio of the circumference to the diameter ($\pi$), squaring the result of the multiplication, and calculating an inverse of the squared value, and outputs mass/spring ratio information Dmk that indicates the calculated mass/spring ratio rmk.

Thereafter, the operation mode of the motor driving apparatus 101$f$ switches from the arithmetic mode to the driving mode.

In the driving mode of the motor driving apparatus 101$f$ according to the sixth embodiment, the motor driver 1$a$ applies an AC voltage (driving voltage) Vdr to the linear vibration motor 100 to drive the linear vibration motor 100, as in the first embodiment.

At this time, the mover position calculation unit 2$f$ performs a position calculation operation for obtaining the position of the mover on the basis of the driving current Cdr and the driving voltage Vdr of the motor driver 1$a$, using the mass/spring ratio rmk that is decided by the mass/spring ratio decision unit 14$f$, and outputs position information Dpc that indicates the calculated position Px of the mover to the motor driver 1$a$.

Then, the motor driver 1$a$ controls the level of the driving voltage Vdr that is applied to the linear vibration motor 100 on the basis of the position information Dpc so that the mover that is reciprocating does not exceed the critical position.

As described above, the motor driving apparatus 101$f$ according to the sixth embodiment for driving the linear vibration motor 100 includes the mover force vibration unit 3$a$ that makes the mover of the linear vibration motor 100 freely vibrate, the relative position detection unit 4$a$ that detects a timing when the freely vibrating mover passes through a fixed point (relative position), and the natural frequency detection unit 5$a$ that detects the natural frequency f of the mover on the basis of the timing information Dpr from the detection unit 4$a$, thereby deciding the mass/spring ratio rmk of the spring vibration system from the detected natural frequency f. Therefore, it is possible to obtain a highly accurate position of the mover according to the position calculation using the mass/spring ratio rmk of the spring vibration system, thereby realizing miniaturization or power enhancement of the linear vibration motor, like in the first embodiment.

Further, in this sixth embodiment, the mass/spring ratio rmk of the linear vibration motor is calculated immediately before the start of the operation of the linear vibration motor 100, as in the first embodiment. Therefore, the position calculation operation for obtaining the position Px of the mover is performed always using the mass/spring ratio rmk in the latest state of the linear vibration motor. Accordingly, even when the mass/spring ratio rmk varies with time, the position of the mover can be obtained more accurately by the position calculation using the mass/spring ratio rmk.

In this sixth embodiment, the motor driving apparatus 101$f$ calculates the mass/spring ratio rmk of the spring vibration system of the linear vibration motor 100 immediately before the start of the operation of the linear vibration motor 100, while the motor driving apparatus 101$f$ may calculate the mass/spring ratio rmk of the spring vibration system of the linear vibration motor immediately after the end of the operation of the linear vibration motor 100.

In this case, during the operation of the linear vibration motor, the position calculation for calculating the position of the mover is performed using the mass/spring ratio rmk that was calculated immediately after the completion of the previous operation of the linear vibration motor. Therefore, also in this case, the position calculation operation for obtaining the position of the mover is performed always using the mass/spring ratio rmk in the latest state of the linear vibration motor. Accordingly, even when the mass/spring ratio of the spring member of the linear vibration motor varies with time, the position of the mover can be accurately obtained according to the position calculation.

Further, since in this case the calculation of the mass/spring ratio is performed immediately after the end of the operation of the linear vibration motor, the mass/spring ratio is calculated under a state where the temperature of the motor is approximately the same as the actual temperature of a time when the linear vibration motor is operated. That is, although the mass/spring ratio varies according to the temperature, an accurate mass/spring ratio at the operation of the linear vibration motor can be obtained by calculating the mass/spring ratio at a temperature when the motor is actually operated. Accordingly, the position calculation for obtaining the mover position can be performed with higher accuracy.

Further, in this case, as the calculation of the mass/spring ratio is performed after the end of the operation of the linear vibration motor, it is possible to obtain the mass/spring ratio without hindering the operation of the linear vibration motor.

Embodiment 7

Figure 7:
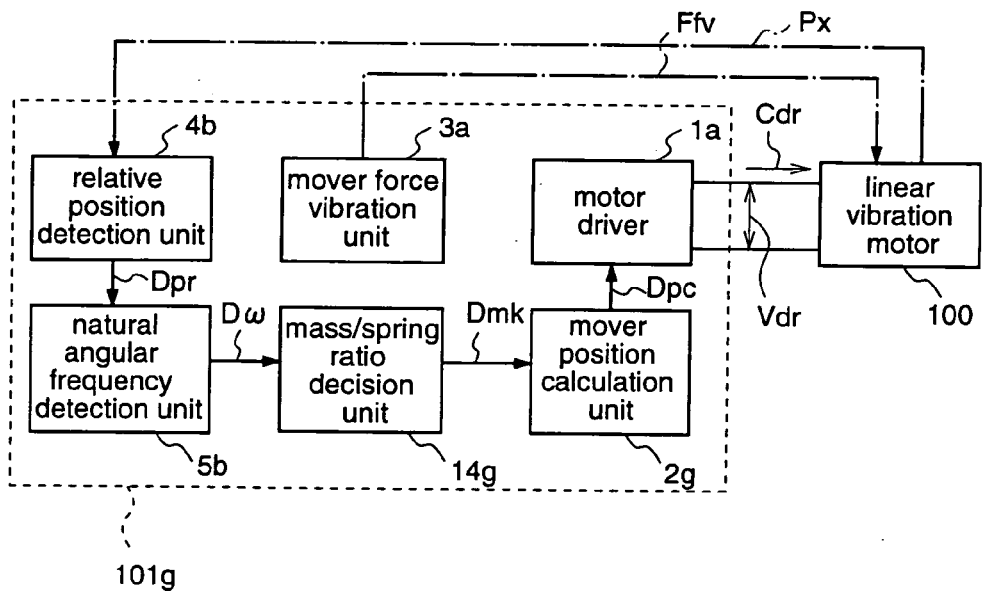
FIG. 7 is a block diagram for explaining a motor driving apparatus 101g according to a seventh embodiment of the present invention.

FIG. 7 is a block diagram for explaining a motor driving apparatus according to a seventh embodiment of the present invention.

The motor driving apparatus 101$g$ according to the seventh embodiment drives/controls the linear vibration motor 100 according to the position of the mover as in the motor driving apparatus 101$b$ of the second embodiment, and it is different from the motor driving apparatus of the second embodiment only in that the position calculation operation for obtaining the position of the mover is performed using a mass/spring ratio rmk of the spring vibration system of the linear vibration motor.

More specifically, the motor driving apparatus 101$g$ according to the seventh embodiment includes a mass/spring ratio decision unit 14$g$ for deciding amass/spring ratio rmk of the spring vibration system on the basis of the natural angular frequency (angular velocity) co of the mover, in place of the spring constant decision unit 6$b$ of the motor driving apparatus 101$b$ according to the second embodiment, and a mover position calculation unit 2$g$ for performing an operation for obtaining the position of the mover on the basis of the decided mass/spring ratio rmk, in place of the mover position calculation unit 2$a$ of the motor driving apparatus 101$b$ according to the second embodiment.

Hereinafter, the motor driver 1a, the mover position calculation unit 2g, the mover force vibration unit 3a, the relative position detection unit 4b, the natural angular frequency detection unit 5b, and the mass/spring ratio decision unit 14g, which are constituents of the motor driving apparatus 101g, will be described in more detail.

Here, the motor driver 1a, the mover force vibration unit 3a, the relative position detection unit 4b, and the natural angular frequency detection unit 5b are identical to those in the motor driving apparatus 101b according to the second embodiment. The mover position calculation unit 2g is identical to the mover position calculation unit 2f of the motor driving apparatus 101f according to the sixth embodiment.

The mass/spring ratio decision unit 14g decides a mass/spring ratio rmk from the natural angular frequency ω which is detected by the natural angular frequency detection unit 5b, and outputs mass/spring ratio information Dmk that indicates the decided mass/spring ratio rmk. As a specific operation of the mass/spring ratio decision unit 14g for obtaining the mass/spring ratio rmk ($=1/\omega^2$), the natural angular frequency ω is squared, and the inverse of the squared value is obtained.

Next, the operation of the motor driving apparatus will be described.

In the motor driving apparatus 101g according to the seventh embodiment, when an instruction signal that instructs start of the operation of the linear vibration motor is inputted to the control unit by a user operation, the respective components 1a, 2g, 3a, 4b, 5b, and 14g of the motor driving apparatus 101g are controlled in accordance with a control signal from the control unit (not shown) so that the operation mode of the motor driving apparatus 101g temporarily becomes the arithmetic mode and then turns into the driving mode, like in the second embodiment.

Initially, the operation of the motor driving apparatus in the arithmetic mode for deciding the mass/spring ratio rmk of the linear vibration motor 100 will be described.

In the motor driving apparatus 101g according to the seventh embodiment, the mover force vibration unit 3a, the relative position detection unit 4b, and the natural angular frequency detection unit 5b operate in the same manners as those in the motor driving apparatus 101b according to the second embodiment.

In this seventh embodiment, the mass/spring ratio decision unit 14g calculates the mass/spring ratio rmk ($=1/\omega^2$) on the basis of the frequency information Dω from the natural angular frequency detection unit 5b by an operation of squaring the natural angular frequency ω indicated by the frequency information D ω and calculating an inverse of the squared value, and outputs mass/spring ratio information Dmk that indicates the calculated mass/spring ratio rmk.

Thereafter, the operation mode of the motor driving apparatus 101g switches from the arithmetic mode to the driving mode.

In the driving mode, the motor driving apparatus 101g according to the seventh embodiment operates in the same manner as in the second embodiment.

As described above, the motor driving apparatus 101g according to the seventh embodiment for driving the linear vibration motor 100 includes the mover force vibration unit 3a that makes the mover of the linear vibration motor 100 freely vibrate, the relative position detection unit 4b that detects timings when the freely vibrating mover passes through two fixed points (relative positions), respectively, and the natural angular frequency detection unit 5b that detects the natural angular frequency ω of the mover on the basis of the timing information Dpr from the relative position detection unit 4a, thereby deciding the mass/spring ratio rmk of the spring vibration system from the detected natural angular frequency ω. Therefore, it is possible to obtain a highly accurate position Px of the mover according to the position calculation using the mass/spring ratio rmk of the spring vibration system, thereby realizing miniaturization or power enhancement of the linear vibration motor, as in the sixth embodiment.

Further, in this seventh embodiment, the mass/spring ratio rmk of the spring vibration system of the linear vibration motor is calculated immediately before the start of the operation of the linear vibration motor 100, as in the sixth embodiment. Therefore, even when the mass/spring ratio rmk varies with time, the position of the mover can be obtained with great accuracy by the position calculation using the mass/spring ratio rmk.

In this seventh embodiment, the motor driving apparatus 101g calculates the mass/spring ratio rmk of the spring vibration system of the linear vibration motor 100 immediately before the start of the operation of the linear vibration motor 100, while the motor driving apparatus 101g may calculate the mass/spring ratio rmk of the spring vibration system immediately after the end of the operation of the linear vibration motor 100.

Embodiment 8

Figure 8:
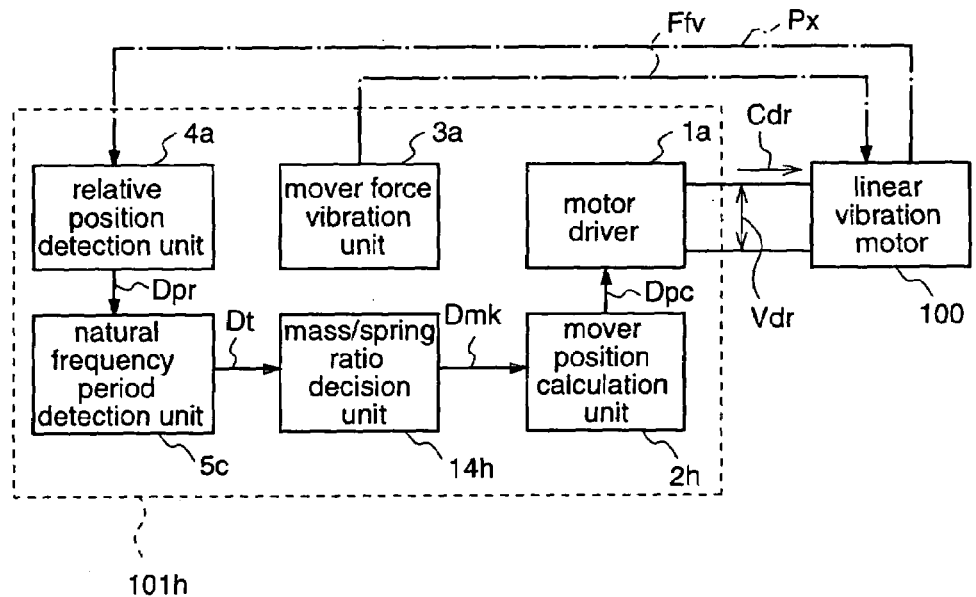
FIG. 8 is a block diagram for explaining a motor driving apparatus 101h according to an eighth embodiment of the present invention.

FIG. 8 is a block diagram for explaining a motor driving apparatus according to an eighth embodiment of the present invention.

The motor driving apparatus 101h according to the eighth embodiment drives/controls the linear vibration motor 100 according to the position of the mover as in the motor driving apparatus 101c according to the third embodiment, and it is different from the motor driving apparatus of the third embodiment only in that the apparatus 101h performs the position calculation operation for obtaining the position of the mover using a mass/spring ratio rmk of the spring vibration system of the linear vibration motor.

More specifically, the motor driving apparatus 101h according to the eighth embodiment includes a mass/spring ratio decision unit 14h for deciding amass/spring ratio rmk of the spring vibration system on the basis of the natural frequency period T of the mover (spring vibration system), in place of the spring constant decision unit 6c of the motor driving apparatus 101c according to the third embodiment, and a mover position calculation unit 2h for performing an operation for obtaining the position Px of the mover on the basis of the decided mass/spring ratio rmk, in place of the mover position calculation unit 2a of the motor driving apparatus 101c according to the third embodiment.

Hereinafter, the motor driver 1a, the mover position calculation unit 2h, the mover force vibration unit 3a, the relative position detection unit 4a, the natural frequency period detection unit 5c, and the mass/spring ratio decision unit 14h, which are constituents of the motor driving apparatus 101h, will be described in more detail.

The motor driver 1a, the mover force vibration unit 3a, the relative position detection unit 4a, and the natural frequency period detection unit 5c are the same as those in the motor driving apparatus 101c according to the third embodiment. The mover position calculation unit 2h is the same as the mover position calculation unit 2f of the motor driving apparatus 101f according to the sixth embodiment.

The mass/spring ratio decision unit 14h decides a mass/spring ratio rmk from the natural frequency period T of the mover, which is detected by the natural frequency period detection unit 5c, and outputs mass/spring ratio information Dmk that indicates the decided mass/spring ratio rmk. As a specific operation of the mass/spring ratio decision unit 14h for obtaining the mass/spring ratio rmk ($=(T/2\pi)^2$), the natural frequency period T is divided by a twofold of the ratio of the circumference to the diameter ($\pi$), and the resultant value is squared.

Next, the operation of the motor driving apparatus will be described.

In the motor driving apparatus 101h according to the eighth embodiment, when an instruction signal that instructs a start of the operation of the linear vibration motor is inputted to the control unit by a user operation, the respective components 1a, 2h, 3a, 4a, 5c, and 14h of the motor driving apparatus 101h are controlled in accordance with a control signal from the control unit (not shown) so that the operation mode of the motor driving apparatus 101h temporarily becomes the arithmetic mode at the start of the operation of the linear vibration motor and thereafter turns into the driving mode, as in the third embodiment.

Initially, the operation of the motor driving apparatus in the arithmetic mode for deciding the mass/spring ratio rmk of the spring vibration system of the linear vibration motor 100 will be described.

In the motor driving apparatus 101h according to the eighth embodiment, the mover force vibration unit 3a, the relative position detection unit 4a, and the natural frequency period detection unit 5c operate in the same manners as those in the motor driving apparatus 101c according to the third embodiment.

In this eighth embodiment, the mass/spring ratio decision unit 14h calculates the mass/spring ratio rmk ($=(T/2\pi)^2$) on the basis of the frequency information Dt from the natural frequency period detection unit 5c by performing an arithmetic operation of dividing the natural frequency period T indicated by the frequency information Dt by a twofold of the ratio of the circumference to the diameter and squaring the resultant value, and outputs mass/spring ratio information Dmk that indicates the calculated mass/spring ratio rmk.

Thereafter, the operation mode of the motor driving apparatus 101h switches from the arithmetic mode to the driving mode.

In the driving mode, the motor driving apparatus 101h according to the eighth embodiment operates in the same manner as in the third embodiment.

As described above, the motor driving apparatus 101h according to the eighth embodiment for driving the linear vibration motor 100 includes the mover force vibration unit 3a that makes the mover of the linear vibration motor 100 freely vibrate, the relative position detection unit 4a that detects a timing when the freely vibrating mover passes through a fixed point (relative position), and the natural frequency period detection unit 5c that detects the natural frequency period T of the mover on the basis of the timing information Dpr that indicates the detected timing, thereby deciding the mass/spring ratio rmk from the detected natural frequency period T. Therefore, it is possible to obtain a highly accurate position Px of the mover according to the position calculation using the mass/spring ratio rmk, thereby realizing miniaturization or power enhancement of the linear vibration motor, as in the sixth embodiment.

Further, in this eighth embodiment, the mass/spring ratio rmk of the spring vibration system of the linear vibration motor 100 is calculated immediately before the start of the operation of the linear vibration motor 100, as in the sixth embodiment. Therefore, even when the mass/spring ratio varies with time, the position of the mover can be obtained with great accuracy by the position calculation using the mass/spring ratio.

In this eighth embodiment, the motor driving apparatus 101h calculates the mass/spring ratio of the spring vibration system of the linear vibration motor 100 immediately before the start of the operation of the linear vibration motor 100, while the motor driving apparatus 101h may calculate the mass/spring ratio of the spring vibration system immediately after the end of the operation of the linear vibration motor 100.

Embodiment 9

Figure 9:
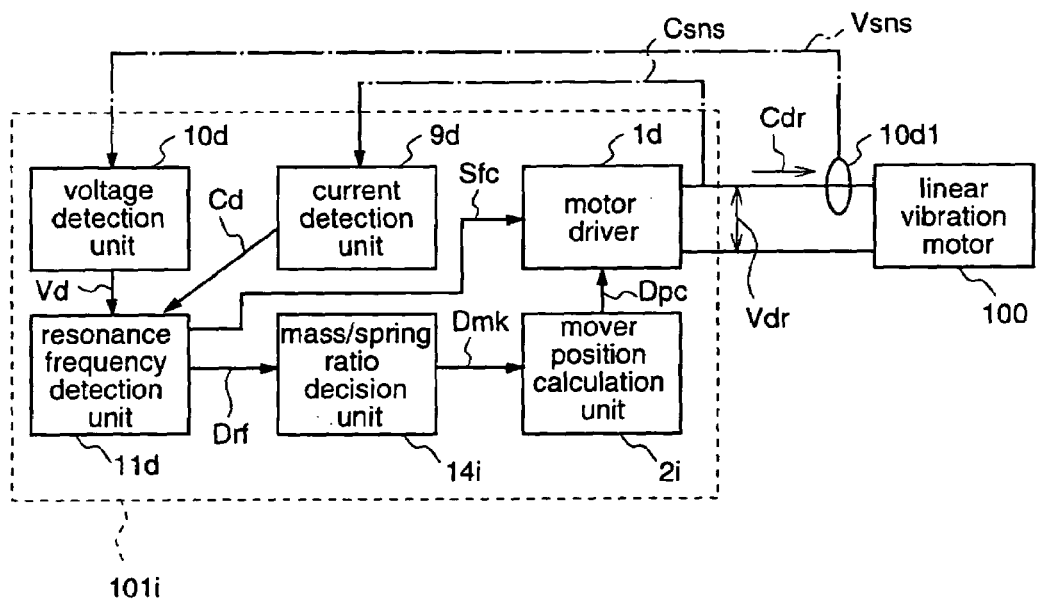
FIG. 9 is a block diagram for explaining a motor driving apparatus 101i according to a ninth embodiment of the present invention.

FIG. 9 is a block diagram for explaining a motor driving apparatus according to a ninth embodiment of the present invention.

The motor driving apparatus 101i according to the ninth embodiment drives/controls the linear vibration motor 100 according to the position of the mover in the motor driving apparatus 101d according to the fourth embodiment, and it is different from the motor driving apparatus of the fourth embodiment only in that the apparatus 101i performs the position calculation operation for obtaining the position of the mover using a mass/spring ratio rmk of the spring vibration system of the linear vibration motor 100.

More specifically, the motor driving apparatus 101i according to the ninth embodiment includes a mass/spring ratio decision unit 14i for deciding a mass/spring ratio rmk of the spring vibration system on the basis of the resonance frequency period f' of the spring vibration system that is in a resonant state, in place of the spring constant decision unit 6d of the motor driving apparatus 101d according to the fourth embodiment, and a mover position calculation unit 2i for performing an operation for obtaining the position of the mover on the basis of the decided mass/spring ratio rmk, in place of the mover position calculation unit 2a of the motor driving apparatus 101d according to the fourth embodiment.

Hereinafter, the motor driver 1d, the mover position calculation unit 2i, the current detection unit 9d, the voltage detection unit 10d, the resonance frequency detection unit 11d, and the mass/spring ratio decision unit 14i, which are constituents of the motor driving apparatus 10i, will be described in more detail.

The motor driver 1d, the current detection unit 9d, the voltage detection unit 10d, and the resonance frequency detection unit 11d are identical to those in the motor driving apparatus 101d according to the fourth embodiment. The mover position calculation unit 2i is identical to the mover position calculation unit 2f of the motor driving apparatus 101f according to the sixth embodiment.

The mass/spring ratio decision unit 14i decides a mass/spring ratio rmk from the resonance frequency f' which is detected by the resonance frequency detection unit 11d, and outputs mass/spring ratio information Dmk that indicates the decided mass/spring ratio rmk. As a specific operation of the mass/spring ratio decision unit 14i for obtaining the mass/spring ratio rmk ($=1/(f'\cdot 2\pi)^2$), an arithmetic operation of multiplying the resonance frequency f' by a twofold of the ratio of the circumference to the diameter ($\pi$), squaring the result of the multiplication, and calculating an inverse of the squared value is performed.

Next, the operation of the motor driving apparatus will be described.

In the motor driving apparatus 10i according to the ninth embodiment, when an instruction signal that instructs a start of the operation of the linear vibration motor is inputted to the control unit by a user operation, the respective components 1d, 2i, 9d, 10d, 11d, and 14i of the motor driving apparatus 101i are controlled in accordance with a control signal from the control unit (not shown) so that the operation mode of the motor driving apparatus 101i temporarily becomes the arithmetic mode and then turns into the driving mode.

Initially, the operation of the motor driving apparatus in the arithmetic mode for deciding the mass/spring ratio rmk of the linear vibration motor 100 will be described.

In the motor driving apparatus 101i according to the ninth embodiment, the motor driver 1d, the current detection unit 9d, the voltage detection unit 10d, and the resonance frequency detection unit 11d operate in the same manners as those in the motor driving apparatus 101d according to the fourth embodiment.

In this ninth embodiment, the mass/spring ratio decision unit 14i calculates the mass/spring ratio rmk on the basis of the frequency information Drf that indicates the resonance frequency f' that is detected by the resonance frequency detection unit 11d by performing an arithmetic operation of multiplying the resonance frequency f' by a twofold of the ratio of the circumference to the diameter (π), squaring the resultant value, and calculating an inverse of the squared value, and outputs mass/spring ratio information Dmk that indicates the calculated mass/spring ratio rmk.

Thereafter, the operation mode of the motor driving apparatus 101i switches from the arithmetic mode to the driving mode.

In the driving mode, the motor driving apparatus 101i according to the ninth embodiment operates in the same manner as in the fourth embodiment.

As described above, the motor driving apparatus 101i according to the ninth embodiment for driving the linear vibration motor 100 includes the current detection unit 9d that detects the driving current Cdr of the linear vibration motor 100, the voltage detection unit 10d that detects the driving voltage Vdr of the linear vibration motor 100, and the resonance frequency detection unit 11d that controls the motor driver 1d on the basis of the detected driving current Cdr and the detected driving voltage Vdr and detects the resonance frequency f' of the linear vibration motor 100, thereby deciding the mass/spring ratio rmk of the spring vibration system on the basis of the detected resonance frequency f'. Therefore, it is possible to obtain a quite accurate position Px of the mover according to the position calculation using the mass/spring ratio rmk, thereby realizing miniaturization or power enhancement of the linear vibration motor, as in the sixth embodiment.

Further, in this ninth embodiment, the mass/spring ratio rmk of the spring vibration system of the linear vibration motor 100 is calculated immediately before the start of the operation of the linear vibration motor 100, as in the sixth embodiment. Therefore, even when the mass/spring ratio rmk varies with time, the position of the mover can be obtained by the position calculation with great accuracy.

In this ninth embodiment, the motor driving apparatus 101i calculates the mass/spring ratio rmk of the spring vibration system of the linear vibration motor 100 immediately before the start of the operation of the linear vibration motor, while the motor driving apparatus 101i may calculate the mass/spring ratio rmk of the linear vibration motor 100 immediately after the end of the operation of the linear vibration motor.

In this case, during the operation of the linear vibration motor, the position calculation operation for obtaining the position of the mover is performed using the mass/spring ratio rmk that was calculated immediately after the end of the previous operation of the linear vibration motor. Therefore, also in this case, the position calculation for obtaining the position of the mover is performed always using the mass/spring ratio rmk in the latest state of the linear vibration motor. Accordingly, even when the mass/spring ratio rmk varies with time, the position of the mover can be accurately obtained by the above-mentioned position calculation.

Further, since in this case the calculation of the mass/spring ratio rmk is performed immediately after the end of the operation of the linear vibration motor, the mass/spring ratio rmk is calculated in a state where the temperature of the motor is approximately the same as the actual temperature of a time when the linear vibration motor is operated. That is, although the mass/spring ratio rmk varies according to the temperature, it is possible to obtain an accurate mass/spring ratio rmk at the operation of the linear vibration motor by calculating the mass/spring ratio rmk at a temperature when the motor is actually operated. Accordingly, the position calculation for obtaining the mover position can be achieved with higher accuracy.

Further, in this case, as the calculation of the mass/spring ratio rmk is performed after the end of the operation of the linear vibration motor, it is possible to obtain the mass/spring ratio rmk without hindering the operation of the linear vibration motor.

In this ninth embodiment, the resonance frequency detection unit 11d controls the motor driver 1d under a state where the amplitude of the driving current that is supplied to the linear vibration motor 100 is fixed so that the driving frequency of the linear vibration motor becomes a frequency that maximizes the power supplied to the linear vibration motor, and detects the resonance frequency f' of the linear vibration motor on the basis of the driving frequency that maximizes the supplied power. However, the resonance frequency detection unit 11d may detect the resonance frequency from a phase difference between the driving current and the driving voltage under a state where the linear vibration motor is resonating, as in the fourth embodiment.

Further, in this ninth embodiment, the motor driving apparatus 101i has the two operation modes, i.e., the driving mode and the arithmetic mode. In the driving mode, the motor drivingg apparatus 101i drives the linear vibration motor 100 at a driving frequency corresponding to a required motor output, while in the arithmetic mode, the motor driving apparatus 101i drives the linear vibration motor 100 at the resonance frequency in accordance with the driving frequency control signal Sfc from the resonance frequency detection unit 11d. However, it is also possible that the motor driving apparatus 101i has only one operation mode (driving mode) for operating the load of the linear vibration motor and, in this driving mode, the motor driving apparatus 101i detects the resonance frequency of the linear vibration motor, drives the linear vibration motor at the detected resonance frequency, and decides the mass/spring ratio rmk on the basis of the detected resonance frequency, as described in the fourth embodiment.

Embodiment 10

Figure 10:
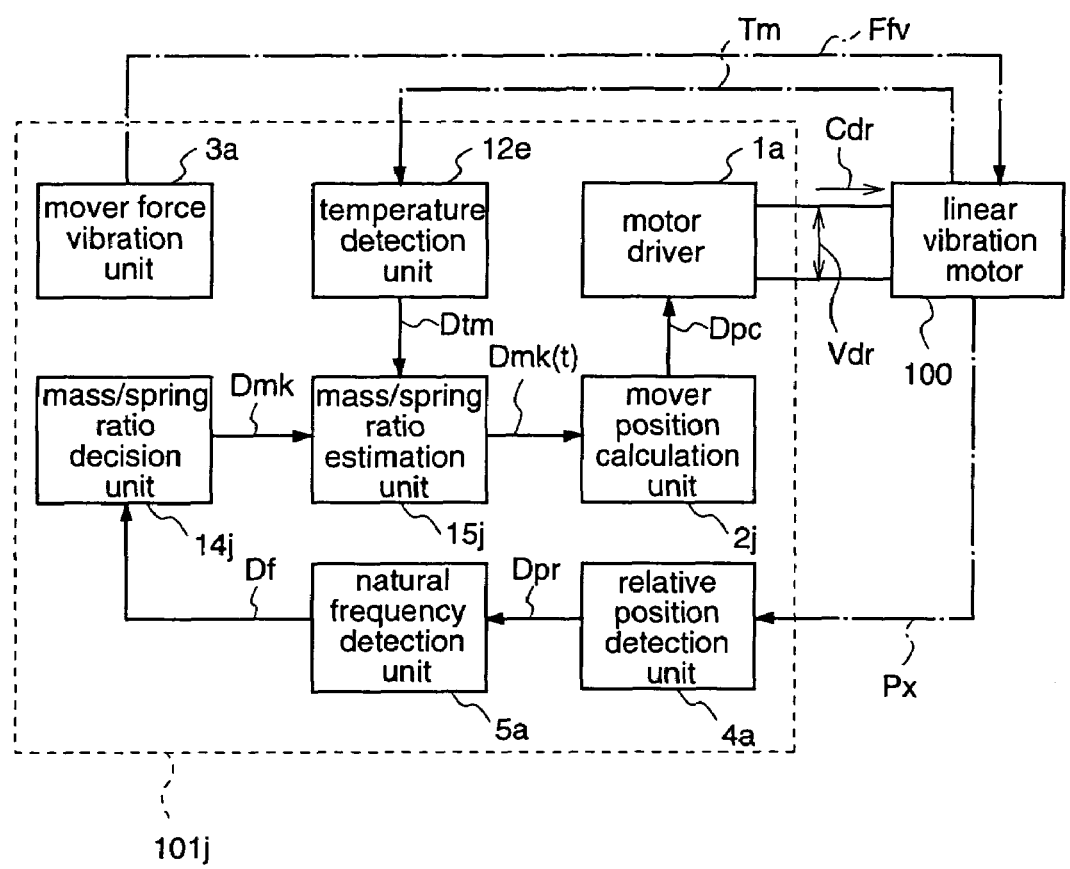
FIG. 10 is a block diagram for explaining a motor driving apparatus 101j according to a tenth embodiment of the present invention.
Figure 11:
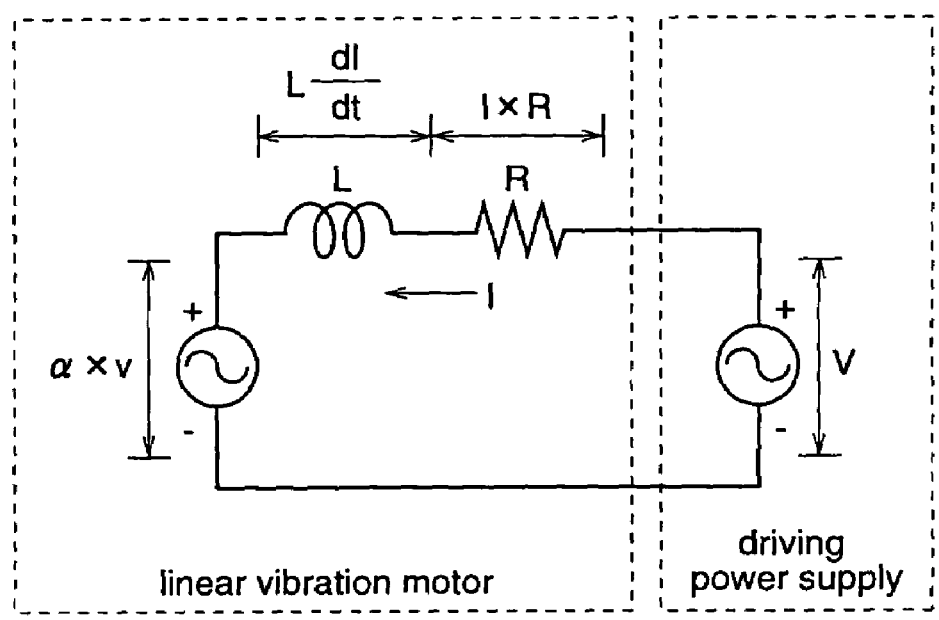
FIG. 11 is a diagram illustrating an equivalent circuit of a linear vibration motor that is used in the prior art.
Figure 12:
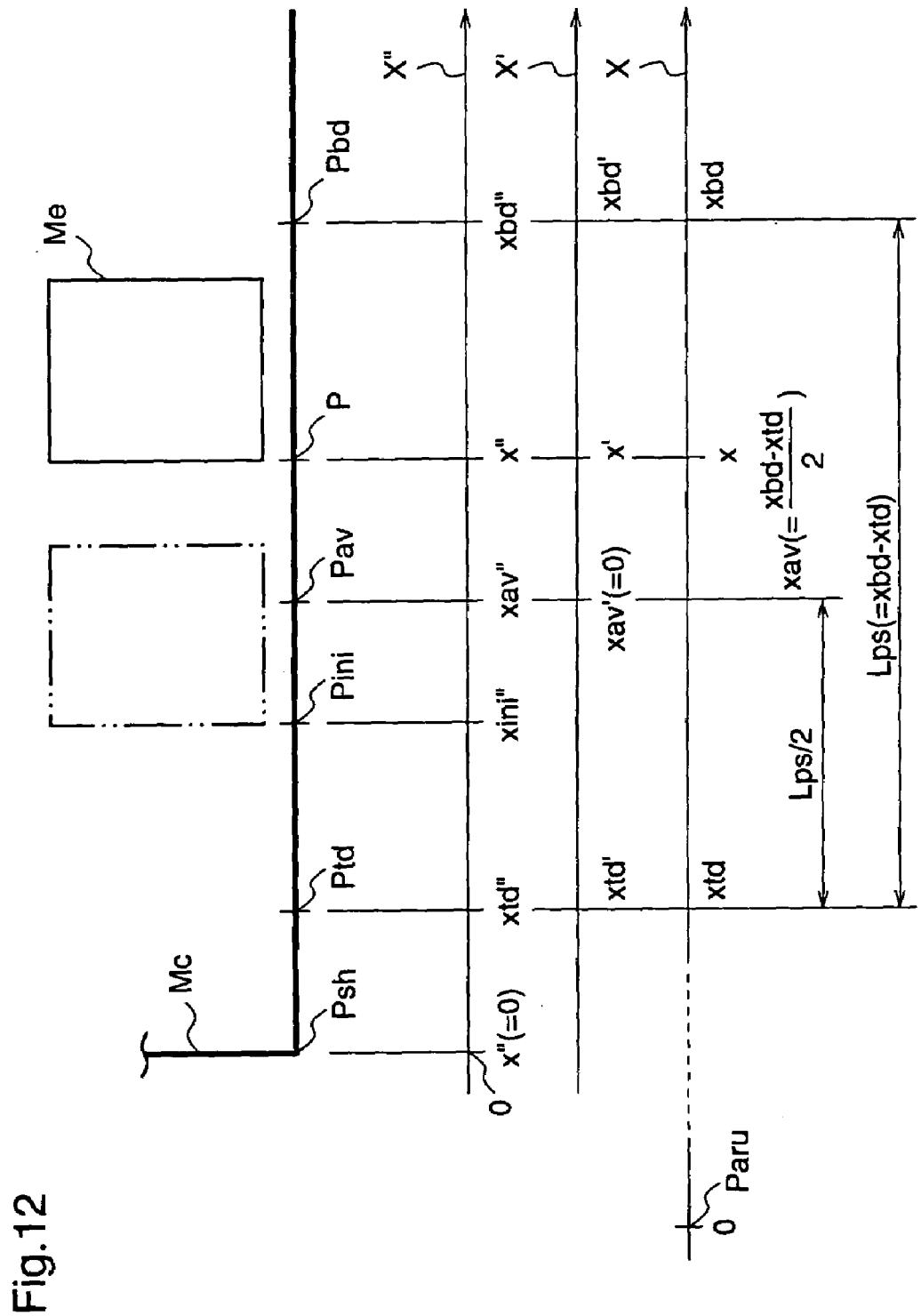
FIG. 12 is a schematic diagram for explaining coordinate systems that indicate the position of the mover in the linear vibration motor.

FIG. 10 is a block diagram for explaining a motor driving apparatus according to a tenth embodiment of the present invention.

The motor driving apparatus 101j according to the tenth embodiment drives/controls the linear vibration motor 100 according to the position of the mover as in the motor driving apparatus 101e according to the fifth embodiment, and it is different from the motor driving apparatus of the fifth embodiment only in that the apparatus 101j performs the position calculation operation for obtaining the position of the mover using a mass/spring ratio rmk of the spring vibration system.

More specifically, the motor driving apparatus 101j according to the tenth embodiment includes a mass/spring ratio decision unit 14j for deciding a mass/spring ratio rmk of the spring vibration system on the basis of the natural frequency f of the spring vibration system, in place of the spring constant decision unit 6e of the motor driving apparatus 101e according to the fifth embodiment, a mass/spring ratio estimation unit 15j for estimating a mass/spring ratio rmk(t) of the mover that is movable on the basis of the decided mass/spring ratio rmk and a motor temperature Tm, in place of the spring constant estimation unit 13e of the motor driving apparatus 101e according to the fifth, embodiment, and a mover position calculation unit 2j for performing an operation for obtaining the position Px of the mover on the basis of the estimated mass/spring ratio rmk(t), in place of the mover position calculation unit 2e of the motor driving apparatus 101e according to the fifth embodiment.

In other words, in the arithmetic mode, the motor driving apparatus 101j calculates the mass/spring ratio rmk of the spring vibration system on the basis of the natural frequency f of the spring vibration system and derives a mass/spring ratio-temperature function Qb from the detected motor temperature Tm and the calculated mass/spring ratio rmk, while in the driving mode, the motor driving apparatus 101j estimates the mass/spring ratio of the linear vibration motor that is being driven, on the basis of the motor temperature Tm using the mass/spring ratio-temperature function Qb, calculates the position of the mover using the estimated mass/spring ratio rmk(t), and controls the driving of the linear vibration motor 100 according to the calculated position of the mover.

Hereinafter, the motor driver 1a, the mover position calculation unit 2j, the mover force vibration unit 3a, the relative position detection unit 4a, the natural frequency detection unit 5a, the temperature detection unit 12e, the mass/spring ratio decision unit 14j, and the mass/spring ratio estimation unit 15j, which are constituents of the motor driving apparatus 101j, will be described in more detail.

The motor driver 1a, the mover force vibration unit 3a, the relative position detection unit 4a, the natural frequency detection unit 5a, and the temperature detection unit 12e are the same as those in the motor driving apparatus 101e according to the fifth embodiment.

The mass/spring ratio decision unit 14j decides a mass/spring ratio rmk from the natural frequency f that is detected by the natural frequency detection unit 5a, and outputs mass/spring ratio information Dmk that indicates the decided mass/spring ratio rmk. As a specific operation for obtaining the mass/spring ratio rmk, an arithmetic operation of multiplying the natural frequency f by a twofold of the ratio of the circumference to the diameter (π), squaring the result of the multiplication, and calculating an inverse of the squared value is performed.

In the arithmetic mode, the mass/spring ratio estimation unit 15j derives the mass/spring ratio-temperature function Qb on the basis of the mass/spring ratio rmk that is decided by the mass/spring ratio decision unit 14j and the motor temperature Tm that is detected by the temperature detection unit 12e while, in the driving mode, the mass/spring ratio estimation unit estimates the mass/spring ratio at the operation of the linear vibration motor 100 on the basis of the detected motor temperature Tm using the derived mass/spring ratio-temperature function Qb, and outputs estimated mass/spring ratio information Dmk(t) that indicates the estimated mass/spring ratio rmk(t).

Here, the mass/spring ratio-temperature function Qb may be a linear function or a two-dimensional matrix that indicates the correspondence between the mass/spring ratio rmk and the motor temperature Tm.

Next, the operation of the motor driving apparatus will be described.

In the motor driving apparatus 101j according to the tenth embodiment, when an instruction signal that instructs a start of the operation of the linear vibration motor is inputted to the control unit by a user operation, the respective components 1a, 2j, 3a, 4a, 5a, 12e, 14j, and 15j of the motor driving apparatus 101j are controlled in accordance with a control signal from the control unit (not shown) so that the operation mode of the motor driving apparatus 101j temporarily becomes the arithmetic mode and then turns into the driving mode.

Initially, the operation of the motor driving apparatus in the arithmetic mode for deciding the mass/spring ratio rmk of the spring member of the linear vibration motor 100 will be described.

In the motor driving apparatus 101j according to the tenth embodiment, the mover force vibration unit 3a, the relative position detection unit 4a, and the natural frequency detection unit 5a operate in the same manners as those in the motor driving apparatus 101e according to the fifth embodiment.

Then, in this tenth embodiment, the mass/spring ratio decision unit 14j calculates the mass/spring ratio rmk using the natural frequency f that is detected by the natural frequency detection unit 15a by performing an arithmetic operation of multiplying the natural frequency f by a twofold of the ratio of the circumference to the diameter (π), squaring the result of the multiplication, and calculating the inverse of the squared value, and outputs mass/spring ratio information Dmk that indicates the calculated mass/spring ratio rmk to the mass/spring ratio estimation unit 15j.

At this time, the temperature detection unit 12e detects the temperature of the linear vibration motor 100 (motor temperature) Tm, and outputs temperature information Dtm that indicates the detected motor temperature to the mass/spring ratio estimation unit 15j.

Then, the mass/spring ratio estimation unit 15j derives a mass/spring ratio-temperature function Qb that shows the correspondence between the mass/spring ratio rmk and the motor temperature Tm on the basis of the mass/spring ratio information Drmk and the temperature information Dtm, and holds the data of the derived mass/spring ratio-temperature function Qb in its internal memory.

Thereafter, the operation mode of the motor driving apparatus 101j switches from the arithmetic mode to the driving mode.

Hereinafter, the operation of the motor driving apparatus in the driving mode will be described.

The motor driver 1a applies an AC voltage (driving voltage) Vdr to the linear vibration motor 100 to drive the linear vibration motor 100.

At this time, the temperature information Dtm indicating the motor temperature Tm that is detected by the temperature detection unit 12e is inputted to the mass/spring ratio estimation unit 151, and the mass/spring ratio estimation unit 15j estimates the mass/spring ratio in the operating state of the linear vibration motor on the basis of the detected motor temperature Tm using the mass/spring ratio-temperature function Qb, and outputs estimated mass/spring ratio information Dmk(t) that indicates the estimated mass/spring ratio rmk(t) to the mover position calculation unit 2j.

Then, the mover position calculation unit 2j performs the position calculation operation for obtaining the position of the mover on the basis of the driving current Cdr and the driving voltage Vdr which are applied to the motor driver 1a, using the estimated mass/spring ratio rmk(t) which is indicated by the estimated mass/spring ratio information Dmk(t) from the mass/spring ratio estimation unit 14j, and outputs position information Dpc that indicates the calculated position Px of the mover to the motor driver 1a.

Then, the motor driver 1a controls the amplitude (voltage level) of the driving voltage Vdr that is applied to the linear vibration motor 100 on the basis of the mover position information Dpc so that the mover that is reciprocating does not exceed the critical position.

As described above, the motor driving apparatus 101j according to the tenth embodiment for driving the linear vibration motor 100 includes the mover force vibration unit 3a that makes the mover of the linear vibration motor 100 freely vibrate, the natural frequency detection unit 5a that detects the natural frequency f of the mover on the basis of the freely vibrating state of the mover, the mass/spring ratio decision unit 14j that decides the mass/spring ratio rmk on the basis of the detected natural frequency f, and the temperature detection unit 12e that detects the temperature of the linear vibration motor. Accordingly, in the arithmetic mode, the motor driving apparatus derives the relationship Qb between the mass/spring ratio rmk and the motor temperature Tm on the basis of the temperature coefficient αmk of the mass/spring ratio, the detected motor temperature Tm, and the decided mass/spring ratio rmk, while in the driving mode, the motor driving apparatus estimates the mass/spring ratio rmk(t) in the load operating state from the motor temperature Tm that is detected in the operation state using the mass/spring ratio-temperature function Qb. Therefore, in the state where the motor is operated, the position calculation for obtaining the position of the mover is performed using the estimated mass/spring ratio rmk(t) corresponding to the motor temperature Tm, whereby the position of the mover can be obtained in the motor operating state with higher accuracy.

Accordingly, the control of the mover position during the operation of the motor can performed with higher accuracy, whereby the clearance between the mover and the housing of the linear vibration motor can be further reduced, thereby realizing further miniaturization or power enhancement of the linear vibration motor.

Further, in this tenth embodiment, the mass/spring ratio rmk of the linear vibration motor 100 is calculated immediately before the start of the operation of the linear vibration motor 100. Therefore, even when the mass/spring ratio rmk of the linear vibration motor varies with time, the position of the mover can be obtained with great accuracy according to the position calculation of obtaining the position of the mover.

In this tenth embodiment, the motor driving apparatus 101j derives the mass/spring ratio-temperature function Qb by performing the calculation of the mass/spring ratio rmk of the linear vibration motor 100 and the detection of the motor temperature Tm immediately before the start of the operation of the linear vibration motor 100, and during the operation, estimates the mass/spring ratio rmk(t) from the motor temperature Tm using the mass/spring ratio-temperature function Qb that was derived immediately before the start of the operation. However, the motor driving apparatus 101l may derive the spring constant-temperature function Qa by performing the calculation of the mass/spring ratio rmk of the linear vibration motor 100 and the detection of the motor temperature Tm immediately after the end of the operation of the linear vibration motor 100, and during the operation, estimate the mass/spring ratio rmk(t) from the motor temperature Tm using the mass/spring ratio-temperature function Qb that was derived at the end of the previous operation.

Further, the motor driving apparatus 101j may derive the mass/spring ratio-temperature function Qb by performing the calculation of the mass/spring ratio rmk of the linear vibration motor 100 and the detection of the motor temperature Tm immediately before the start of the operation of the linear vibration motor 100 and immediately after the end of the operation.

In this case, it is desirable that the arithmetic operation for obtaining the position of the mover in the driving mode is performed using an average value of the mass/spring ratio that is obtained from the mass/spring ratio-temperature function Qb derived immediately before the start of the present operation, and the mass/spring ratio that is obtained from the mass/spring ratio-temperature function Qb derived immediately after the end of the previous operation.

Further, in this tenth embodiment, the mass/spring ratio estimation unit 15j derives the mass/spring ratio-temperature function Qb using the temperature coefficient αmk of the mass/spring ratio, which is held in the internal memory, while the method for driving the mass/spring ratio-temperature function Qb is not restricted to one that utilizes the temperature coefficient αmk of the mass/spring ratio.

For example, the mass/spring ratio estimation unit 15j may derive the mass/spring ratio-temperature function Qb from the mass/spring ratios at different temperatures by performing the calculation of the mass/spring ratio rmk of the linear vibration motor 100 and the detection of the motor temperature Tm immediately before the start of the operation of the linear vibration motor 100 and further performing the calculation of the mass/spring ratio rmk of the linear vibration motor 100 and the detection of the motor temperature Tm immediately after the end of the operation of the linear vibration motor, and estimate the mass/spring ratio rmk(t) from the motor temperature at the next operation using the derived mass/spring ratio-temperature function Qb.

Further, the mass/spring ratio estimation unit 15j may update the mass/spring ratio-temperature function each time the mass/spring ratio rmk is calculated at a different temperature.

In this tenth embodiment, the motor driving apparatus 101j decides the mass/spring ratio rmk on the basis of the natural frequency f as in the sixth embodiment. However, the motor driving apparatus can decide the mass/spring ratio rmk on the basis of the natural angular frequency ω of the spring vibration system as in the seventh embodiment, or decide the mass/spring ratio rmk on the basis of the natural frequency period T of the spring vibration system as in the eighth embodiment. Further, the motor driving apparatus 101j can decide the mass/spring ratio on the basis of the resonance frequency that is obtained from the detected driving voltage and the detected driving current as in the ninth embodiment.

The linear vibration motor and the motor driving apparatus as described in any of the first to tenth embodiments are used as a power source of a compressor or the like. For example, the present invention is effective in a device such as an air conditioner or a refrigerator, which comprises the linear vibration motor within a sealed enclosure and is used in environments where the temperature and the pressure may greatly vary. According to the present invention, the position of the mover of the linear vibration motor can be calculated with high accuracy without using a position sensor.

Hereinafter, a compressor that employs the linear vibration motor and the motor driving apparatus according to the first embodiment, an air conditioner, a refrigerator, a cryogenic freezer, and a hot-water supply unit that employs the compressor will be described in detail.

Embodiment 11

Figure 13:
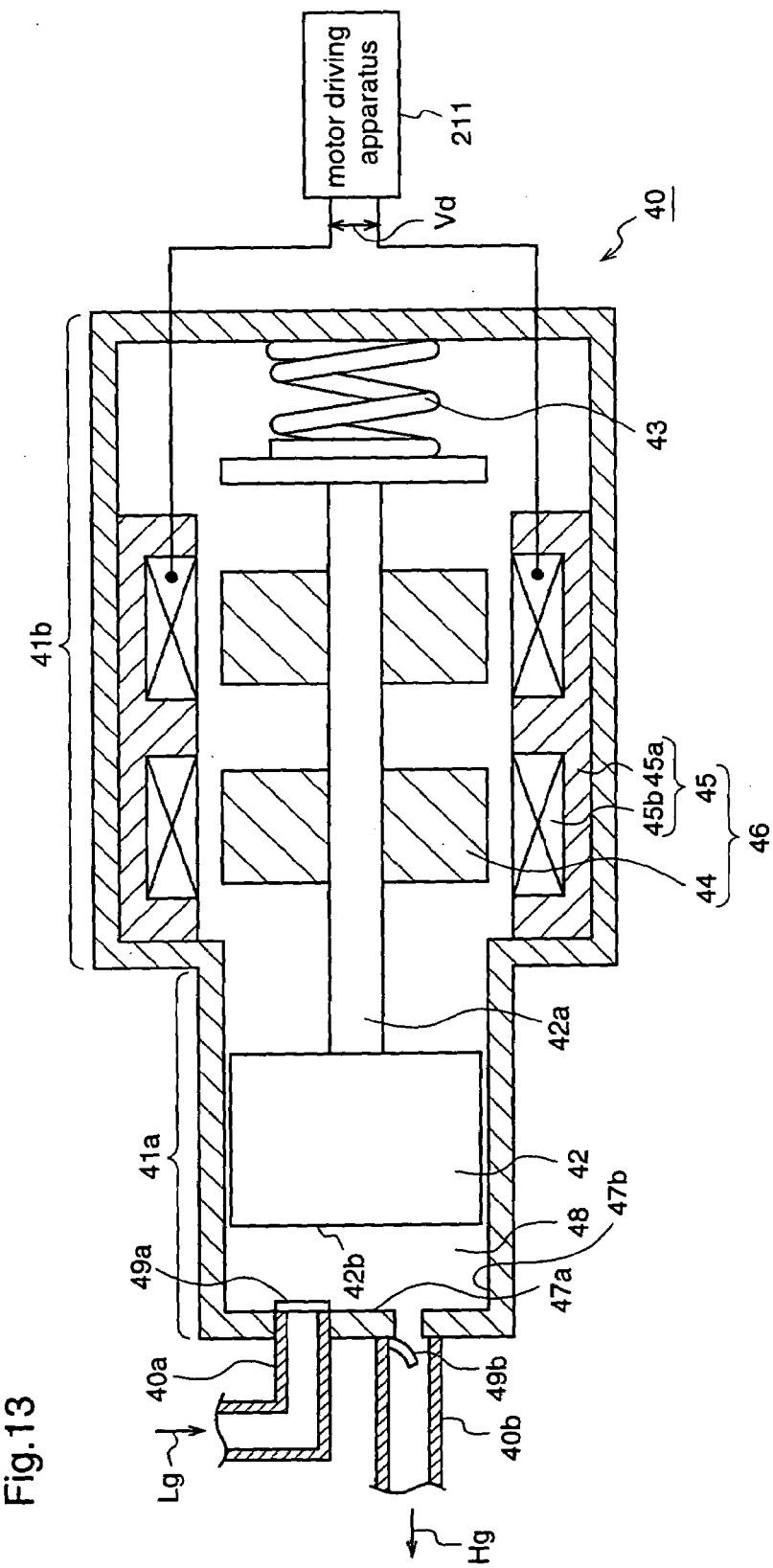
FIG. 13 is a schematic diagram for explaining a motor driving apparatus 211 according to an eleventh embodiment of the present invention.

FIG. 13 is a schematic diagram for explaining a compressor driving apparatus according to an eleventh embodiment of the present invention.

A compressor driving apparatus 211 according to the eleventh embodiment drives a compressor 40 for compressing air, gas, or the like. A power source of the compressor 40 is a linear vibration motor 46 which is identical to the linear vibration motor 100 according to the first embodiment. Further, the compressor driving apparatus 211 is a motor driving apparatus for driving the linear vibration motor 46, and it has the same construction as the motor driving apparatus 101a of the first embodiment. Hereinafter, the compressor 40 according to this eleventh embodiment is referred to as a linear compressor, and this linear compressor 40 will be briefly described.

The linear compressor 40 has a cylinder section 41a and a motor section 41b which are adjacent to each other along a predetermined axis line. In the cylinder section 41a, a piston 42 which is slidably supported along the axis direction is placed. A piston rod 42a whose one end is fixed to the rear side of the piston 42 is placed across the cylinder section 41a and the motor section 41b, and a support spring 43 which applies a force to the piston rod 42a in the axis direction is provided on the other end of the piston rod 42a. Here, the support spring 43 corresponds to the spring member of the linear vibration motor 100 according to the first embodiment.

Further, a magnet 44 is fixed to the piston rod 42a, and an electromagnet 45 comprising an outer yoke 45a and a stator coil 45b embedded in the outer yoke 45a is fixed to a portion of the motor section 41b which is opposed to the magnet 44. In this linear compressor 40, the linear vibration motor 46 is constituted by the electromagnet 45 and the magnet 44 fixed to the piston rod 42a. Accordingly, in the linear compressor 40, the piston 42 reciprocates in its axis direction due to an electromagnetic force generated between the electromagnet 45 and the magnet 44, and elasticity of the spring 43. Here, the piston 42, the piston rod 42a, and the magnet 44 correspond to the mover of the linear vibration motor 100 according to the first embodiment.

Further, in the cylinder section 41a, a compression chamber 48 is formed, which is a closed space surrounded by a cylinder upper portion inner wall 47a, a piston compression wall 42b, and a cylinder peripheral wall 47b. An end of an inlet tube 40a for sucking a low-pressure gas Lg into the compression chamber 48 is opened at the cylinder upper portion inner wall 47a. Further, an end of a discharge tube 40b for discharging a high-pressure gas Hg from the compression chamber 48 is opened at the cylinder upper portion inner wall 47a. An inlet valve 49a and a discharge valve 49b for preventing back flow of the gas are fixed to the inlet tube 40a and the discharge tube 40b, respectively.

In the linear compressor 40 so constructed, the piston 42 reciprocates in its axis direction by application of the driving voltage from the motor driving apparatus 211 to the linear vibration motor 46, whereby suction of the low-pressure gas Lg into the compression chamber 48, compression of the gas in the compression chamber 48, and discharge of the compressed high-pressure gas Hg from the compression chamber 48 are repeatedly carried out.

In the linear compressor 40 according to the eleventh embodiment, the motor driving apparatus 211 calculates the spring constant of the spring member in the arithmetic mode in which the linear vibration motor is not operated and then calculates the position of the mover of the linear vibration motor using the calculated spring constant in the driving mode in which the linear vibration motor is operated, as in the motor driving apparatus 101a according to the first embodiment. Therefore, it is possible to detect the position of the piston with high accuracy during the operation of the linear compressor 40. Accordingly, the clearance between the piston and the cylinder head can be reduced, resulting in miniaturization of the linear compressor.

In this eleventh embodiment, the motor driving apparatus as a constituent of the compressor 40 is the same as that in the first embodiment. However, the motor driving apparatus of the compressor 40 may be the motor driving apparatus according to any of the second to tenth embodiments.

Embodiment 12

Figure 14:
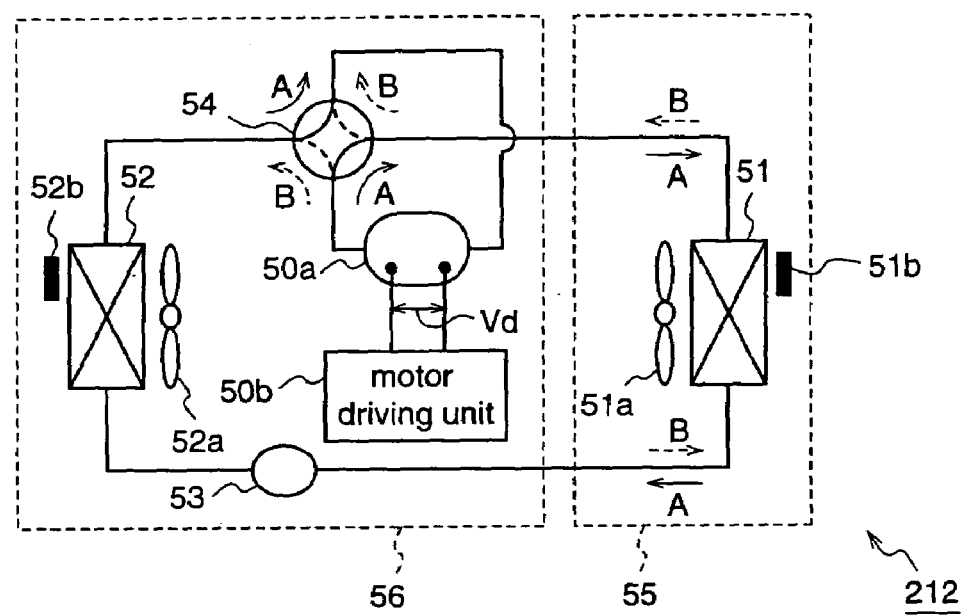
FIG. 14 is a schematic diagram for explaining an air conditioner 212 according to a twelfth embodiment of the present invention.

FIG. 14 is a block diagram for explaining an air conditioner according to a twelfth embodiment of the present invention.

An air conditioner 212 according to the twelfth embodiment has an indoor unit 55 and an outdoor unit 56, and performs cooling and heating. The air conditioner 212 comprises a linear compressor 50a for circulating a refrigerant between the indoor unit 55 and the outdoor unit 56, and a compressor driving unit 50b for driving the linear compressor 50a. The compressor 50a is identical to the linear compressor 40 having the linear vibration motor 46 according to the eleventh embodiment. Further, the compressor driving unit 50b is a motor driving unit which applies the driving voltage Vd to the linear vibration motor of the linear compressor 50a, and it is identical in construction as the motor driving apparatus 211 according to the eleventh embodiment.

More specifically, the air conditioner 212 according to the twelfth embodiment has the linear compressor 50a, a four-way valve 54, a throttle (expansion valve) 53, an indoor heat exchanger 51, an outdoor heat exchanger 52, which form a refrigerant circulation path, and the motor driving unit 50b for driving the linear vibration motor as a driving source of the linear compressor 50a.

The indoor heat exchanger 51 constitutes the indoor unit 55, while the throttle 53, the outdoor heat exchanger 52, the linear compressor 50a, the four-way valve 54, and the motor driving unit 50b constitute the outdoor unit 56.

The indoor heat exchanger 51 has an air blower 51a for increasing the efficiency of heat exchange, and a temperature sensor 51b for measuring the temperature of the heat exchanger 51 or the ambient temperature thereof. The outdoor heat exchanger 52 has an air blower 52a for increasing the efficiency of heat exchange, and a temperature sensor 52b for measuring the temperature of the heat exchanger 52 or the ambient temperature thereof.

In this twelfth embodiment, the linear compressor 50a and the four-way valve 54 are placed in the refrigerant path between the indoor heat exchanger 51 and the outdoor heat exchanger 52. That is, in this air conditioner 212, the four-way valve 54 switches between two states as follows: the state where the refrigerant flows in the direction of arrow A, the refrigerant that has passed through the outdoor heat exchanger 52 is sucked into the linear compressor 50a, and the refrigerant discharged from the linear compressor 50a is supplied to the indoor heat exchanger 51, and the state where the refrigerant flows in the direction of arrow B, the refrigerant that has passed through the indoor heat exchanger 51 is sucked into the linear compressor 50a, and the refrigerant discharged from the linear compressor 50a is supplied to the outdoor heat exchanger 52.

Further, the throttle 53 has both the function of reducing the flow rate of the circulating refrigerant, and the function as a valve for automatically controlling the flow rate of the refrigerant. That is, under the state where the refrigerant is circulating in the refrigerant circulation path, the throttle 53 reduces the flow rate of the liquid refrigerant outputted from a condenser to an evaporator to expand the liquid refrigerant, and supplies a proper amount of refrigerant that is required for the evaporator.

The indoor heat exchanger 51 operates as a condenser during heating and as an evaporator during cooling. The outdoor heat exchanger 52 operates as an evaporator during heating and as a condenser during cooling. In the condenser, the high-temperature and high-pressure refrigerant gas flowing therein loses heat to the air blown into the condenser, and gradually liquefies, resulting in a high-pressure liquid refrigerant in the vicinity of the outlet of the condenser. This is equivalent to the refrigerant radiating heat into the air to liquefy. Further, the liquid refrigerant whose temperature and pressure are reduced by the throttle 53 flows into the evaporator. When the indoor air is blown into the evaporator in this state, the liquid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

In the air conditioner 212, the motor driving unit 50b controls the output of the linear vibration motor of the linear compressor 50a on the basis of the operating conditions of the air conditioner, i.e., the target temperature that is set on the air conditioner and the actual room temperature and outdoor temperature.

Next, the operation of the air conditioner will be described.

In the air conditioner 212 according to the twelfth embodiment, when the driving voltage Vd is supplied from the motor drive control unit 50b to the linear compressor 50a, the refrigerant circulates in the refrigerant circulation path, and heat exchange is carried out in the heat exchanger 51 of the indoor unit 55 and the heat exchanger 52 of the outdoor unit 56. That is, in the air conditioner 212, a well-known heat pump cycle is formed in the refrigerant circulation path by circulating the refrigerant sealed in the circulation path with the linear compressor 50a. Thereby, heating or cooling for a room is carried out.

For example, when the air conditioner 212 performs heating, the four-way valve 54 is set by user operation so that the refrigerant flows in the direction of arrow A. In this case, the indoor heat exchanger 51 operates as a condenser, and discharges heat due to circulation of the refrigerant in the refrigerant circulation path. Thereby, the room is heated.

Conversely, when the air conditioner 212 performs cooling, the four-way valve 54 is set by user operation so that the refrigerant flows in the direction of arrow B. In this case, the indoor heat exchanger 51 operates as an evaporator, and absorbs heat from the ambient air due to circulation of the refrigerant in the refrigerant circulation path. Thereby, the room is cooled.

In the air conditioner 212, the motor driving unit 50b controls the output of the linear vibration motor of the linear compressor 50a on the basis of the target temperature set on the air conditioner and the actual room temperature and outdoor temperature. Thereby, the air conditioner 212 performs comfortable cooling and heating.

As described above, in the air conditioner 212 according to the twelfth embodiment, since the compressor (linear compressor) 50a having the linear vibration motor as a power source is used as the compressor for compressing and circulating a refrigerant, friction loss in the compressor is reduced as compared with an air conditioner using a compressor having a rotation-type motor as a power source, and furthermore, sealability of the compressor for sealing a high-pressure refrigerant and a low-pressure refrigerant is enhanced, resulting in an increase in efficiency of the compressor.

Furthermore, in the compressor 50a using the linear vibration motor according to the twelfth embodiment, since friction loss is reduced, the amount of use of lubricating oil that is indispensable in the compressor using the rotation-type motor can be significantly reduced. Thereby, the amount of waste oil that needs recycling or the like can be reduced, and the amount of refrigerant to be filled in the compressor can be reduced because the amount of refrigerant that dissolves into the oil is reduced, resulting in a contribution to conservation of global environment.

Further, in the air conditioner 212 according to the twelfth embodiment, the motor driving unit 50b calculates the spring constant k of the spring member in the arithmetic mode in which the linear vibration motor is not operated and then calculates the position of the mover of the linear vibration motor using the calculated spring constant k in the driving mode in which the linear vibration motor is operated, as in the motor driving apparatus 211 according to the eleventh embodiment. Therefore, it is possible to detect the position of the piston with high accuracy during the operation of the linear compressor 50a. Accordingly, the clearance between the piston and the cylinder head can be reduced, resulting in miniaturization of the linear compressor, which leads to miniaturization of the air conditioner.

Embodiment 13

Figure 15:
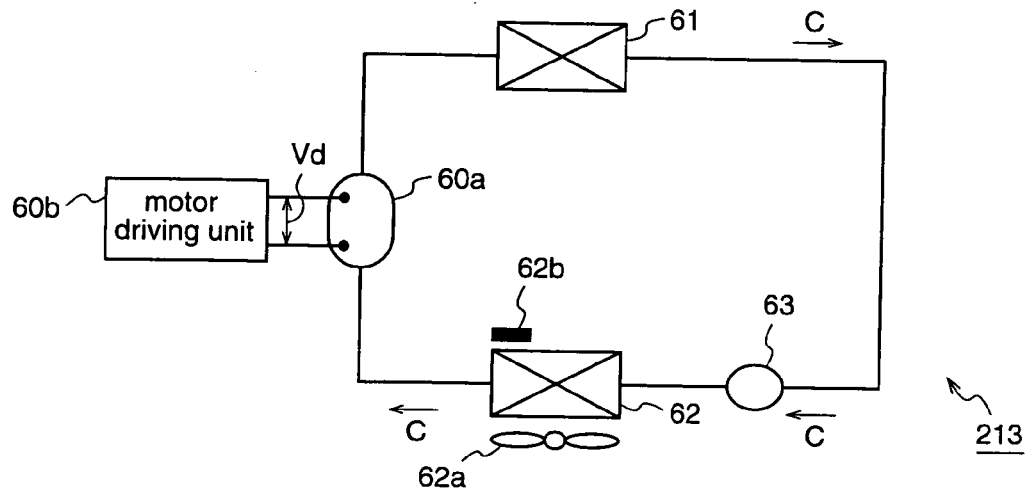
FIG. 15 is a schematic diagram for explaining a refrigerator 213 according to a thirteenth embodiment of the present invention.

FIG. 15 is a block diagram for explaining a refrigerator according to a thirteenth embodiment of the present invention.

A refrigerator 213 of this thirteenth embodiment comprises a linear compressor 60a, a compressor driving unit 60b, a condenser 61, an evaporator 62, and a throttle 63.

The linear compressor 60a, the condenser 61, the throttle 63, and the evaporator 62 form a refrigerant circulation path, and the compressor driving unit 60b is a motor driving unit for driving a linear vibration motor as a driving source of the linear compressor 60a. The linear compressor 60a and the motor driving unit 60b are identical to the linear compressor 40 and the motor driving apparatus 212 according to the eleventh embodiment, respectively.

Like the throttle 53 of the air conditioner 212 according to the twelfth embodiment, the throttle 63 reduces the flow rate of the liquid refrigerant outputted from the condenser 61 to expand the liquid refrigerant, and supplies a proper amount of refrigerant to the evaporator 62, under the state where the refrigerant is circulating in the refrigerant circulation path.

The condenser 61 condenses the high-temperature and high-pressure refrigerant gas flowing therein, and discharges heat of the refrigerant to the outside air. The refrigerant gas introduced in the condenser 61 loses heat to the outside air and gradually liquefies, resulting in a high-pressure liquid refrigerant in the vicinity of the outlet of the condenser.

The evaporator 62 evaporates the low-temperature refrigerant liquid to cool the inside of the refrigerator. The evaporator 62 has an air blower 62a for increasing efficiency of heat exchange, and a temperature sensor 62b for detecting the temperature inside the refrigerator.

In the refrigerator 213, the motor driving unit 60b controls the output of the linear vibration motor of the linear compressor 60a on the basis of the operating conditions of the refrigerator, i.e., the target temperature that is set on the refrigerator and the temperature inside the refrigerator.

Next, the operation will be described.

In the refrigerator 213 according to the thirteenth embodiment, when a driving voltage Vd is supplied from the motor driving unit 60b to the linear vibration motor of the linear compressor 60a, the linear compressor 60a is operated and the refrigerant circulates in the refrigerant circulation path in the direction of arrow C, and thereby heat exchange is carried out in the condenser 61 and in the evaporator 62. Thus, the inside of the refrigerator is cooled.

To be specific, the refrigerant is liquefied in the condenser 61, and the flow rate of the refrigerant is reduced by the throttle 63 to expand the refrigerant, resulting in a low-temperature liquid refrigerant. When the low-temperature liquid refrigerant is sent to the evaporator 62, the low-temperature liquid refrigerant is evaporated in the evaporator 62, whereby the inside of the refrigerator is cooled. At this time, the air in the refrigerator is compulsory sent to the evaporator 62 by the air blower 62a, whereby heat exchange is efficiently carried out in the evaporator 62.

Further, in the refrigerator 213 according to the thirteenth embodiment, the motor driving unit 60b controls the output of the linear vibration motor of the linear compressor 60a on the basis of the target temperature set on the refrigerator 213 and the temperature inside the refrigerator. Thereby, the temperature inside the refrigerator 213 is maintained at the target temperature.

As described above, in the refrigerator 213 according to the thirteenth embodiment, since the linear compressor 60a having the linear vibration motor as a power source is used as the compressor for compressing and circulating the refrigerant, friction loss in the compressor is reduced as compared with a refrigerator using a compressor having a rotation-type motor as a power source, and furthermore, sealability for sealing the refrigerant in the compressor is enhanced, resulting in an increase in operation efficiency of the compressor, like in the air conditioner 212 of the twelfth embodiment.

Furthermore, in the refrigerator 213 according to the thirteenth embodiment, since friction loss in the compressor is reduced, the amount of waste oil (spent lubricating oil) and the amount of refrigerant to be filled in the compressor are reduced, as in the air conditioner 212 of the twelfth embodiment. Therefore, the refrigerator 213 can contribute to conservation of global environment.

Moreover, in the refrigerator 213, the motor driving apparatus 60b calculates the spring constant k of the spring member in the arithmetic mode in which the linear vibration motor is not operated and then calculates the position of the mover of the linear vibration motor using the calculated spring constant k in the driving mode in which the linear vibration motor is operated, as in the motor driving apparatus 211 according to the eleventh embodiment. Therefore, it is possible to detect the position of the piston with high accuracy during the operation of the linear compressor 60a. Accordingly, the clearance between the piston and the cylinder head can be reduced, resulting in miniaturization of the linear compressor, which leads to miniaturization of the refrigerator.

Embodiment 14

Figure 16:
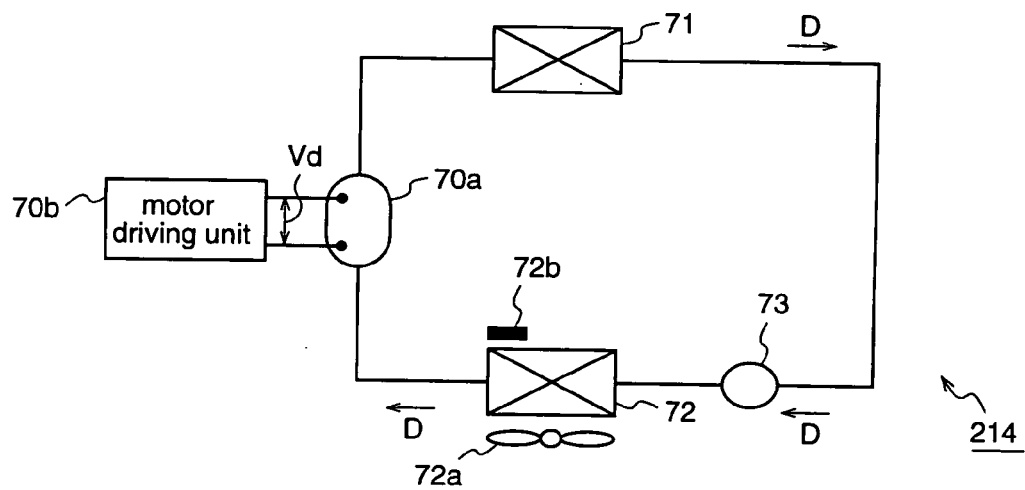
FIG. 16 is a schematic diagram for explaining a cryogenic freezer 214 according to a fourteenth embodiment of the present invention.

FIG. 16 is a block diagram for explaining a cryogenic freezer according to a fourteenth embodiment of the present invention.

A cryogenic freezer 214 according to the fourteenth embodiment has a freezing chamber (not shown), and cools the inside of the chamber at a cryogenic temperature (lower than −50° C.). As for objects to be frozen by the cryogenic freezer 214, there are electromagnetic circuit elements such as resistors, coils, magnets to be used as superconducting elements, electronic elements such as low-temperature reference parts for infrared sensors, medical objects such as blood and viscera, and foods such as tunas.

Electronic elements are preserved in the cryogenic states to increase their operating efficiencies or increase their sensitivities by removing thermal noises. As for foods, perishable foods are preserved in the cryogenic states to facilitate transportation, maintain freshness, or perform freeze-dry.

Although the freezing temperature of the cryogenic freezer 214 varies with applications, it is lower than −50° C. and, especially in applications for superconducting, the temperature varies over a wide range of 0–100 K (Kelvin). For example, the freezing temperature of the cryogenic freezer 214 is set at about 50–100 K in applications for high-temperature superconducting, and about 0–50 K in applications formormal superconducting. Further, when the cryogenic freezer 214 is used for maintaining freshness of foods or the like, the freezing temperature is set at a little under −50° C.

Hereinafter, the cryogenic freezer 214 will be described in detail.

The cryogenic freezer 214 according to the fourteenth embodiment comprises a linear compressor 70a, a compressor driving unit 70b, a heat radiator 71, a heat storage 72, and a throttle 73.

The linear compressor 70a, the heat radiator 71, the throttle 73, and the heat storage 72 form a refrigerant circulation path. The compressor driving unit 70b is a motor driving unit for driving and controlling a linear vibration motor as a driving source of the linear compressor 70a. The linear compressor 70a and the motor driving unit 70b are identical to the linear compressor 40 and the motor driving apparatus 211 according to the eleventh embodiment, respectively.

The throttle 73 reduces the liquid refrigerant sent from the heat radiator 71 to the heat storage 72 to expand the refrigerant, like the throttle 53 of the twelfth embodiment.

The heat radiator 71 condenses the high-temperature and high-pressure refrigerant gas flowing in it, and discharges heat of the refrigerant to the outside air, like the condenser 61 of the refrigerator 213 of the thirteenth embodiment.

The heat storage 72 evaporates the low-temperature refrigerant liquid to cool the inside of the freezing chamber, thereby to preserve the objects at the cryogenic temperature, like the evaporator 62 of the thirteenth embodiment. The heat storage 72 has a temperature sensor 72b for detecting the temperature of the objects. The heat storage 72 may have an air blower 72a for increasing efficiency of heat exchange as shown in FIG. 16.

In the cryogenic freezer 214, the motor driving unit 70b controls the output of the linear vibration motor of the linear compressor 70a on the basis of the operating conditions of the cryogenic freezer 214, i.e., the target temperature that is set on the cryogenic freezer 214 and the temperature of the objects to be frozen.

In the cryogenic freezer 214 according to the fourteenth embodiment, when an AC voltage Vd is supplied from the motor driving unit 70b to the linear vibration motor of the linear compressor 70a, the linear compressor 70a is operated, and the refrigerant circulates in the refrigerant circulation path in the direction of arrow D, whereby heat exchange is carried out in the heat radiator 71 and the heat storage 72. Thereby, the inside of the freezing chamber is cooled, and the objects in the chamber are frozen.

That is, the refrigerant is liquefied in the heat radiator 71, and the flow rate of the refrigerant is reduced by the throttle 73 to expand the refrigerant, resulting in a low-temperature liquid refrigerant. When the low-temperature liquid refrigerant is sent to the heat storage 72, the liquid refrigerant is evaporated in the heat storage 72, whereby the freezing chamber is cooled.

Further, in the cryogenic freezer 214, the motor driving unit 70b controls the output of the linear vibration motor of the linear compressor 70a on the basis of the target temperature set on the cryogenic freezer 214 and the temperature of the object to be frozen. Thereby, in the cryogenic freezer 214, the temperature of the object to be frozen is maintained at the target temperature.

As described above, in the cryogenic freezer 214 according to the fourteenth embodiment, since the linear compressor 70a having the linear vibration motor as a power source is used as the compressor for compressing and circulating the refrigerant, friction loss in the compressor is reduced as compared with a cryogenic freezer using a compressor having a rotation-type motor as a power source, and furthermore, sealability for sealing the refrigerant in the compressor is enhanced, resulting an increase in operation efficiency of the compressor, as in the air conditioner 212 according to the twelfth embodiment.

Furthermore, in the cryogenic freezer 214, since friction loss in the compressor is reduced, the amount of waste oil (spent lubricating oil) and the amount of refrigerant to be filled in the compressor can be reduced, as in the air conditioner 212 of the twelfth embodiment. Therefore, the freezer 214 can contribute to conservation of global environment.

Moreover, in the cryogenic freezer 214, the motor driving unit 70b calculates the spring constant k in the arithmetic mode in which the linear vibration motor is not operated and then calculates the position of the mover of the linear vibration motor using the calculated spring constant k in the driving mode in which the linear vibration motor is operated, like in the motor driving apparatus 211 according to the eleventh embodiment. Therefore, it is possible to detect the position of the piston with high accuracy during the operation of the linear compressor 70a. Accordingly, the clearance between the piston and the cylinder head can be reduced, resulting in miniaturization of the linear compressor, which leads to miniaturization of the cryogenic freezer.

Embodiment 15

Figure 17:
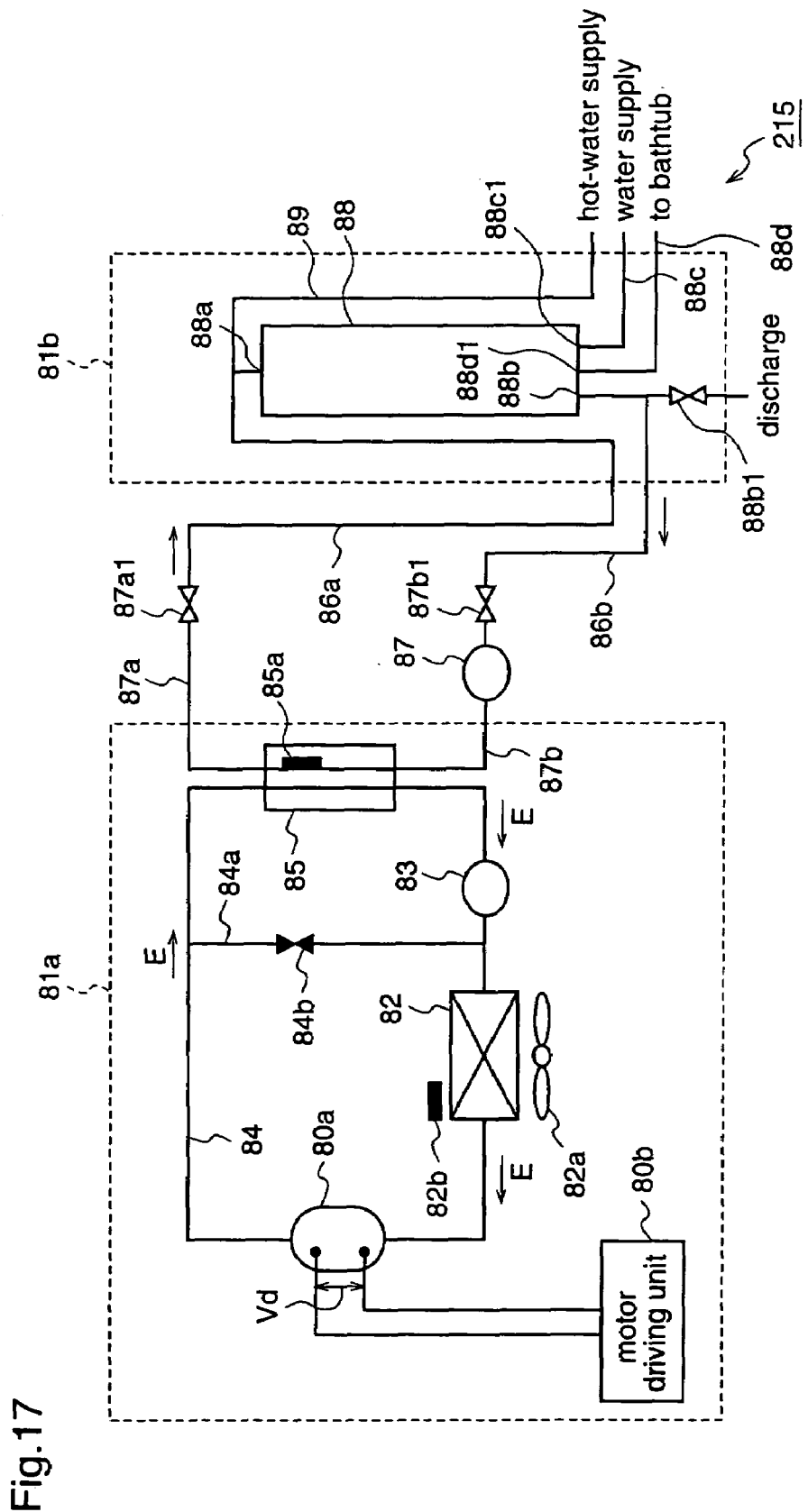
FIG. 17 is a schematic diagram for explaining a hot-water supply unit 215 according to a fifteenth embodiment of the present invention.

FIG. 17 is a block diagram for explaining a hot-water supply unit according to a fifteenth embodiment of the present invention.

A hot-water supply unit 215 according to the fifteenth embodiment has a refrigeration cycle unit 81a for heating supplied water to discharge hot water, a hot-water storage 81b in which the hot water discharged from the refrigeration cycle unit 81a is stored, and pipes 86a, 86b, 87a, and 87b connecting the unit 81a and the storage 81b.

The refrigeration cycle unit 81a has a linear compressor 80a, a compressor driving unit 80b, an air-refrigerant heat exchanger 82, a throttle 83, and a water-refrigerant heat exchanger 85.

The linear compressor 80a, the air-refrigerant heat exchanger 82, the throttle 83, and the water-refrigerant heat exchanger 85 form a refrigerant circulation path.

The compressor driving unit 80b drives a linear vibration motor (not shown) as a driving source of the linear compressor 80a. The linear compressor 80a is identical to the linear compressor 40 having the linear vibration motor 46 according to the eleventh embodiment. Further, the compressor driving unit 80b is identical in construction to the motor driving apparatus 211 of the eleventh embodiment.

The throttle 83 reduces the flow rate of the liquid refrigerant sent from the water-refrigerant heat exchanger 85 to the air-refrigerant heat exchanger 82 to expand the liquid refrigerant, as in the throttle 53 of the air conditioner 212 according to the twelfth embodiment.

The water-refrigerant heat exchanger 85 is a condenser for heating up the water supplied to the refrigeration cycle unit 81a, and has a temperature sensor 85a for detecting the temperature of the heated water. The air-refrigerant heat exchanger 82 is an evaporator for absorbing heat from the ambient atmosphere, and has an air blower 82a for increasing the efficiency of heat exchange and a temperature sensor 82b for detecting the ambient temperature.

In FIG. 17, reference numeral 84 denotes a refrigerant pipe for circulating the refrigerant along the refrigerant circulation path that is formed by the linear compressor 80a, the water-refrigerant heat exchanger 85, the throttle 83, and the air-refrigerant heat exchanger 82. A defrost bypass pipe 84a for supplying the refrigerant discharged from the linear compressor 80a to the air-refrigerant heat exchanger 82, bypassing the water-refrigerant heat exchanger 85 and the throttle 83, is connected to the refrigerant pipe 84, and a defrost bypass valve 84b is provided in a portion of the bypass pipe 84a.

The hot-water storage 81b has a hot-water storage tank 88 for storing water or hot water. A water supply pipe 88c for supplying water from the outside to the storage tank 88 is connected to a water intake port 88c1 of the storage tank 88, and a hot-water supply pipe 88d for supplying hot-water from the storage tank 88 to a bathtub is connected to a hot-water discharge port 88d1 of the storage tank 88. Further, a hot-water supply pipe 89 for supplying the hot water stored in the storage tank 88 to the outside is connected to a water intake/discharge port 88a of the storage tank 88.

The storage tank 88 and the water-refrigerant heat exchanger 85 of the refrigeration cycle unit 81a are connected by pipes 86a, 86b, 87a, and 87b, and a water circulation path is formed between the storage tank 88 and the water-refrigerant heat exchanger 85.

The water supply pipe 86b is a pipe for supplying water from the storage tank 88 to the water-refrigerant heat exchanger 85, and an end of this pipe is connected to a water discharge port 88b of the storage tank 88 while the other end is connected to a water intake side pipe 87b of the water-refrigerant heat exchanger 85 through a joint 87b1. Further, a discharge valve 88b1 for discharging the water or hot water stored in the storage tank 88 is fixed to an end of the water supply pipe 86b. The water supply pipe 86a is a pipe for returning the water from the water-refrigerant heat exchanger 85 to the storage tank 88, and an end of this pipe is connected to the water intake/discharge port 88a of the storage tank 88 while the other end is connected to a discharge side pipe 87a of the water-refrigerant heat exchanger 85 through a joint 87a1.

A pump 87 for circulating the water in the water circulation path is provided in a portion of the water intake side pipe 87b of the water-refrigerant heat exchanger 85.

Further, in the hot-water supply unit 215, the motor driving unit 80b determines a motor output required of the linear vibration motor of the linear compressor 80a on the basis of the operating conditions of the hot-water supply unit, i.e., the target temperature of the hot water that is set on the hot-water supply unit, the temperature of the water supplied from the hot-water storage 81b to the water-refrigerant heat exchanger 85 of the refrigeration cycle unit 81a, and the outdoor temperature.

Next, the operation will be described.

When an AC voltage Vd from the motor driving unit 80b is applied to the linear vibration motor (not shown) of the linear compressor 80a to operate the linear compressor 80a, the high-temperature refrigerant compressed by the linear compressor 80a circulates in the direction of arrow E, i.e., it passes through the refrigerant pipe 84, to be supplied to the water-refrigerant heat exchanger 85. Further, when the pump 87 in the water circulation path is driven, water is supplied from the storage tank 88 to the water-refrigerant heat exchanger 85.

In the water-refrigerant heat exchanger 85, heat exchange is carried out between the refrigerant and the water supplied from the storage tank 88, whereby heat moves from the refrigerant to the water. That is, the supplied water is heated, and the heated water is supplied to the storage tank 88. At this time, the temperature of the heated water is observed by the condensation temperature sensor 85a.

Further, in the water-refrigerant heat exchanger 85, the refrigerant is condensed by the above-mentioned heat exchange, and the flow rate of the condensed liquid refrigerant is reduced by the throttle 83, whereby the refrigerant is expanded and sent to the air-refrigerant heat exchanger 82. In the hot-water supply unit 215, the air-refrigerant heat exchanger 82 serves as an evaporator. That is, the air-refrigerant heat exchanger 82 absorbs heat from the outside air that is sent by the air blower 82b, thereby to evaporate the low-temperature liquid refrigerant. At this time, the temperature of the ambient atmosphere of the air-refrigerant heat exchanger 82 is observed by the temperature sensor 82b.

Further, in the refrigeration cycle unit 81a, when the air-refrigerant heat exchanger 82 is frosted, the defrost bypass valve 84b opens, and the high-temperature refrigerant is supplied to the air-refrigerant heat exchanger 82 through the defrost bypass line 84a. Thereby, the air-refrigerant heat exchanger 82 is defrosted.

On the other hand, the hot water is supplied from the water-refrigerant heat exchanger 85 of the refrigeration cycle unit 81a to the hot-water storage 81b through the pipes 87a and 86a, and the supplied hot water is stored in the storage tank 88. The hot water in the storage tank 88 is supplied to the outside through the hot-water supply pipe 89 as required. Especially when the hot water is supplied to a bathtub, the hot water in the storage tank 88 is supplied to the bathtub through a hot-water supply pipe 88d for the bathtub.

Further, when the amount of water or hot water stored in the storage tank 88 becomes lower than a predetermined amount, water is supplied from the outside through the water supply pipe 88c.

Further, in the hot-water supply unit 215, the motor driving unit 80b determines a motor output required of the linear vibration motor of the linear compressor 80a on the basis the target temperature of the hot water that is set on the hot-water supply unit 215, the temperature of the water supplied to the water-refrigerant heat exchanger 85, and the outdoor temperature. Thereby, the hot-water supply unit 215 supplies the hot water at the target temperature.

As described above, in the hot-water supply unit 215 according to the fifteenth embodiment, since the linear compressor 80a having the linear vibration motor as a power source is used as the compressor for compressing and circulating the refrigerant in the refrigeration cycle unit 81a, friction loss in the compressor is reduced as compared with a hot-water supply unit using a compressor having a rotation-type motor as a power source, and furthermore, sealability for sealing the refrigerant in the compressor is enhanced, resulting in an increase in operation efficiency of the compressor, gas in the air conditioner 212 of the twelfth embodiment.

Furthermore, in the hot-water supply unit 215, since friction loss in the compressor is reduced, the amount of waste oil (spent lubricating oil) and the amount of refrigerant to be filled in the compressor can be reduced, as in the air conditioner 212 of the twelfth embodiment. Therefore, the hot-water supply unit 215 can contribute to conservation of global environment.

Moreover, in the hot-water supply unit 215, the motor driving unit 80b calculates the spring constant k in the arithmetic mode in which the linear vibration motor is not operated and then calculates the position of the mover of the linear vibration motor using the calculated spring constant k in the driving mode in which the linear vibration motor is operated, like in the motor driving apparatus 211 according to the eleventh embodiment. Therefore, it is possible to detect the position of the piston with high accuracy during the operation of the linear compressor 80a. Accordingly, the clearance between the piston and the cylinder head can be reduced, resulting in miniaturization of the linear compressor, which leads to miniaturization of the hot-water supply unit.

The motor driving apparatus for driving the linear vibration motor that is used as a power source of the air conditioner, the refrigerator, the cryogenic freezer, and the hot-water may be the motor driving apparatus according to any of the second to tenth embodiments.

Embodiment 16

Figure 18:
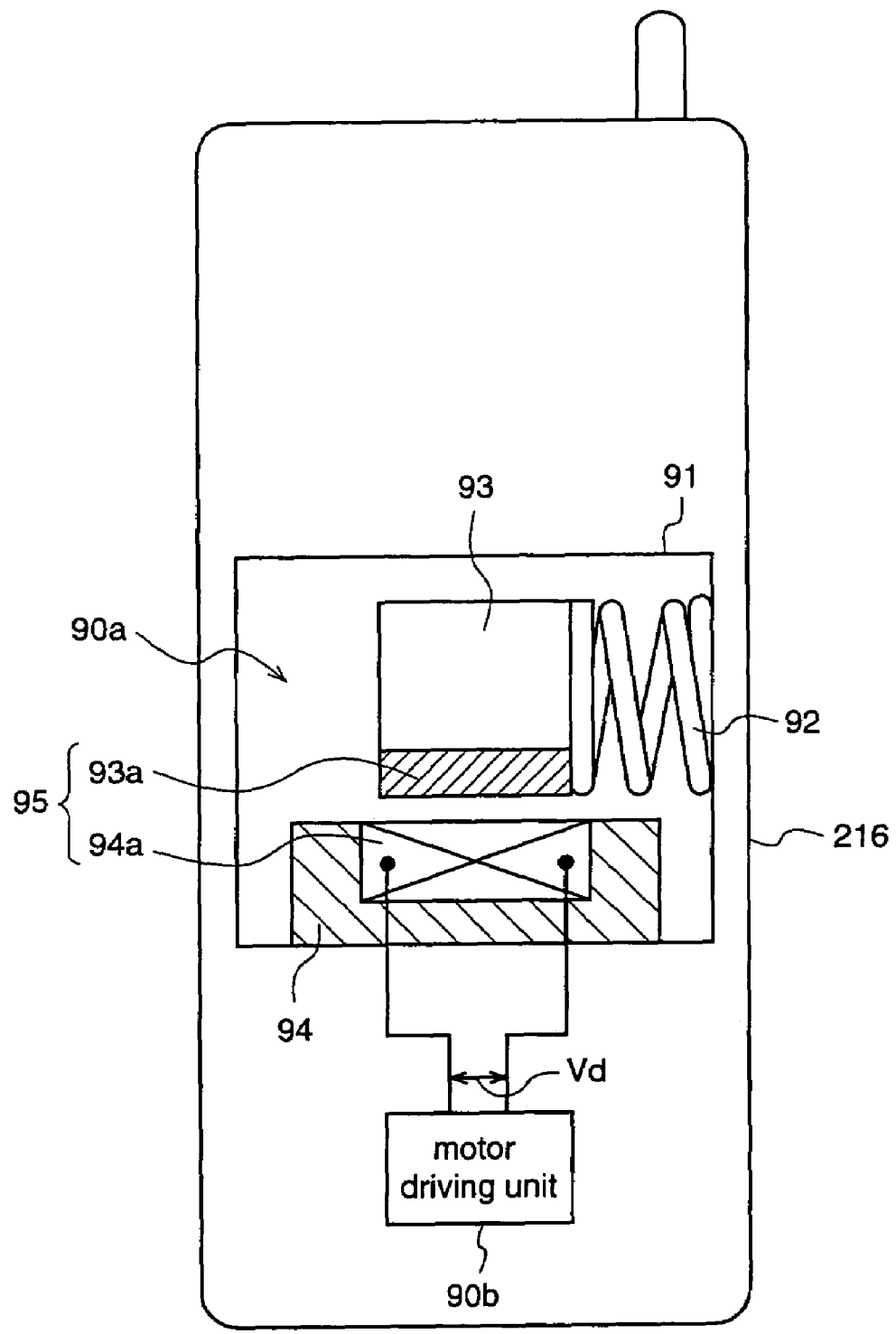
FIG. 18 is a schematic diagram for explaining a handy phone 216 according to a sixteenth embodiment of the present invention.

FIG. 18 is a block diagram for explaining a handy phone according to a sixteenth embodiment of the present invention.

A handy phone 216 of this sixteenth embodiment has a vibrator 90a that mechanically vibrates, and a driving unit 90b for driving the vibrator 90a. The handy phone 216 informs an incoming call or the like to the user by vibration.

The vibrator 90a is provided with a weight member 93 that is placed in a case 91 and is vibratably supported by a spring member 92, a magnet 93a fixed to a portion of the weight member 93, and a stator 94 in which a coil 94*a* is embedded, which stator 94 is placed in the case 91 to be opposed to the magnet 93*a* of the weight member 93. A linear vibration motor 95 is constituted by the magnet 93*a* fixed to the weight member 93, and the coil 94*a* embedded in the stator 94. The weight member 93 and the magnet 93*a* constitute a mover of the linear vibration motor 95. In this linear vibration motor 95, the weight member 93 reciprocates in the expansion direction of the spring member 92 due to an electromagnetic power generated between the coil 94*a* and the magnet 93*a*, and elasticity of the spring member 92.

The driving unit 90*b* according to the sixteenth embodiment employs a battery (not shown) that is mounted on the handy phone 216 as a power supply and drives the linear vibration motor 95 of the vibrator 90*a*, and it is identical in construction to the motor driving apparatus 101*a* of the first embodiment.

In the handy phone 216 so constructed, when receiving a call, power is supplied from the motor drive unit 90*b* to the linear vibration motor 95 of the vibrator 90*a*, whereby the weight member 93 reciprocates in the expansion direction of the spring member 92, and the vibrator 90*a* vibrates.

That is, when the AC voltage Vd is applied to the coil 94*a*, an AC magnetic field is generated in the stator 94, and the magnetic field attracts the magnet 93*a*, whereby the magnet 93*a* and the weight member 93 to which the magnet 93*a* is fixed start to reciprocate.

As described above, in the handy phone 216 according to the sixteenth embodiment, since mechanical vibration is generated by the linear vibration motor 95, the mechanical vibration can be varied with two degrees of freedom, i.e., the number of vibrations and the amplitude, as compared with the case where vibration is generated by a rotation-type motor, whereby the vibrator 91 which informs an incoming call or the like to the user by vibration can be provided with a variety of vibration patterns.

Further, in the handy phone 216 of the sixteenth embodiment, the motor driving unit 90*b* calculates the spring constant k in the arithmetic mode in which the linear vibration motor is not operated and then calculates the position of the mover using the calculated spring constant k in the driving mode in which the linear vibration motor is operated, like in the motor driving apparatus 101*a* according to the first embodiment. Therefore, it is possible to detect the position of the mover with high accuracy during the operation of the linear vibration motor 95. Accordingly, the clearance between the mover and the case can be reduced, resulting in miniaturization of the linear vibration motor, which leads to miniaturization of the handy phone.

Further, while in the sixteenth embodiment the motor driving apparatus 101*a* according to the first embodiment is used as the motor driving unit 90*b*, any of the motor driving apparatuses 101*b* to 101*j* according to the second to tenth embodiments may be used as the motor driving unit 90*b*.

While in this sixteenth embodiment the linear vibration motor and the driving apparatus thereof according to the first embodiment are used as a vibrator for informing an incoming call in a handy phone to the user by the vibrations and a driving apparatus thereof, respectively, the linear vibration motor and the driving apparatus according to the first embodiment may be used as a power source of a reciprocation-type electric razor and a driving apparatus thereof, respectively. Further, any of the motor driving apparatuses 101*b* to 101*j* may be used as a driving unit of the reciprocation-type electric razor.

What is claimed is:

1. A motor driving apparatus for driving a linear vibration motor having a mover which is reciprocatably provided and a spring member which supports the mover, said motor driving apparatus including:
    a mover force vibration unit for making the mover freely vibrate;
    a vibration parameter obtaining unit for obtaining a natural vibration parameter that shows natural vibration of the mover on the basis of a free vibration state of the mover;
    a spring constant decision unit for calculating a spring constant of the spring member by using the natural vibration parameter obtained by said vibration parameter obtaining unit; and
    a mover position calculation unit for calculating the position of the mover on the basis of a driving current and a driving voltage which are applied to the linear vibration motor, by using the spring constant calculated by said spring constant decision unit.

2. The motor driving apparatus as defined in claim 1, wherein said vibration parameter obtaining unit includes:
    a timing detection unit for detecting a timing when the freely vibrating mover passes through a prescribed relative position with respect to a reference position of the vibration; and
    a natural frequency detection unit for detecting a natural frequency as the natural vibration parameter of the mover on the basis of an output from said timing detection unit, and
    wherein said spring constant decision unit is operable to calculate the spring constant by multiplying the natural frequency detected by said natural frequency detection unit by a twofold of the ratio of the circumference to the diameter, squaring the result of the multiplication, and multiplying the squared value by a mass of the mover.

3. The motor driving apparatus as defined in claim 1, wherein said vibration parameter obtaining unit includes:
    a timing detection unit for detecting a timing when the freely vibrating mover passes through a prescribed relative position with respect to a reference position of the vibration; and
    a natural angular frequency detection unit for detecting a natural angular frequency as the natural vibration parameter of the mover on the basis of an output from said timing detection unit, and
    wherein said spring constant decision unit is operable to calculate the spring constant by squaring the natural angular frequency detected by said natural angular frequency detection unit and multiplying the squared natural angular frequency by a mass of the mover.

4. The motor driving apparatus as defined in claim 1, wherein said vibration parameter obtaining unit includes:
    a timing detection unit for detecting a timing when the freely vibrating mover passes through a prescribed relative position with respect to a reference position of the vibration; and
    a natural frequency period detection unit for detecting a natural frequency period as the natural vibration parameter of the mover on the basis of an output from said timing detection unit, and
    wherein said spring constant decision unit is operable to calculate the spring constant by dividing the natural frequency period detected by said natural frequency period detection unit by a twofold of the ratio of the circumference to the diameter, squaring the result of the division, multiplying the squared value by an inverse of a mass of the mover, and calculating an inverse of the result of the multiplication.

5. The motor driving apparatus as defined in claim 1, wherein said vibration parameter obtaining unit includes a timing detection unit operable to detect a timing when the freely vibrating mover passes through a prescribed relative position with respect to a reference position of the vibration by using an induced voltage that occurs on a coil of the linear vibration motor due to the free vibration of the mover.

6. The motor driving apparatus as defined in claim 1, wherein said mover force vibration unit is operable to mechanically apply a force to the mover so that the mover freely vibrates.

7. The mover driving apparatus as defined in claim 1, wherein said mover force vibration unit is operable to temporarily cut off the current that is applied to the linear vibration motor so that the mover freely vibrates.

8. The motor driving apparatus as defined in claim 1, wherein said mover force vibration unit is operable to disconnect a load that is connected to the linear vibration motor so that the mover freely vibrates.

9. The motor driving apparatus as defined in claim 1, further including a control unit for setting an operation mode to either a driving mode for driving the linear vibration motor to operate a load that is connected to the linear vibration motor, or an arithmetic mode for calculating the spring constant of the spring member, wherein:
   said control unit is operable to temporarily set the operation mode to the arithmetic mode before a start of the operation of the load;
   said spring constant calculation unit is operable to calculate the spring constant in the arithmetic mode before the start of the operation of the load; and
   said mover position calculation unit is operable to calculate the position of the mover in the driving mode by using the spring constant that has been calculated before the start of the operation of the load.

10. The motor driving apparatus as defined in claim 1, further including a control unit for setting an operation mode to either a driving mode for driving the linear vibration motor to operate a load that is connected to the linear vibration motor, or an arithmetic mode for calculating the spring constant of the spring member, wherein:
    said control unit is operable to temporarily set the operation mode to the arithmetic mode after a completion of the operation of the load;
    said spring constant calculation unit is operable to calculate the spring constant in the arithmetic mode after the completion of the operation of the load; and
    said mover position calculation unit is operable to calculate the position of the mover in the driving mode by using the spring constant that has been calculated in a recently set arithmetic mode.

11. The motor driving apparatus as defined in claim 1, further including:
    a control unit for setting an operation mode to either a driving mode for driving the linear vibration motor to operate a load that is connected to the linear vibration motor, or an arithmetic mode for calculating the spring constant of the spring member;
    a temperature detection unit for detecting a temperature of the linear vibration motor; and
    a spring constant estimation unit for estimating the spring constant in a load operating state, wherein:
    said control unit is operable to temporarily set the operation mode to the arithmetic mode at least one of before a start of the operation of the load and after a completion of the operation of the load;
    said spring constant estimation unit is operable to,
        in the arithmetic mode, derive a relationship between the temperature of the linear vibration motor and the spring constant on the basis of the calculated spring constant and the temperature that is detected by said temperature detection unit when the spring constant is calculated, and
        in the driving mode, estimate the spring constant in the load operating state on the basis of the temperature detected by said temperature detection unit by using the derived relationship between the temperature and the spring constant; and
    said mover position calculation unit is operable to calculate the position of the mover in the driving mode by using the spring constant estimated by said spring constant estimation unit.

12. An air conditioner provided with a compressor which has a cylinder and a piston, and for compressing a liquid in the cylinder by a reciprocating motion of the piston, said air conditioner including:
    a linear vibration motor for making the piston reciprocate, said linear vibration motor having a mover which is reciprocatably provided, and a spring member which supports said mover; and
    a motor driving apparatus for driving said linear vibration motor;
    wherein said motor driving apparatus is the motor driving apparatus as defined in claim 1.

13. A refrigerator provided with a compressor which has a cylinder and a piston, and for compressing a liquid in the cylinder by a reciprocating motion of the piston, said refrigerator including:
    a linear vibration motor for making the piston reciprocate, said linear vibration motor having a mover which is reciprocatably provided, and a spring member which supports said mover; and
    a motor driving apparatus for driving said linear vibration motor;
    wherein said motor driving apparatus is the motor driving apparatus as defined in claim 1.

14. A cryogenic freezer provided with a compressor which has a cylinder and a piston, for compressing a liquid in the cylinder by a reciprocating motion of the piston, said cryogenic freezer including:
    a linear vibration motor for making the piston reciprocate, said linear vibration motor having a mover which is reciprocatably provided, and a spring member which supports said mover; and
    a motor driving apparatus for driving said linear vibration motor;
    wherein said motor driving apparatus is the motor driving apparatus as defined in claim 1.

15. A hot-water supply unit provided with a compressor which has a cylinder and a piston, and for compressing a liquid in the cylinder by a reciprocating motion of the piston, said hot-water supply unit including:
    a linear vibration motor for making the piston reciprocate, said linear vibration motor having a mover which is reciprocatably provided, and a spring member which supports said mover; and
    a motor driving apparatus for driving said linear vibration motor;
    said motor driving apparatus is the motor driving apparatus as defined in claim 1.

16. A handy phone comprising a linear vibration motor for generating vibration, and a motor driving apparatus for driving said linear vibration motor, wherein:
- said linear vibration motor has a mover which is reciprocatably provided, and a spring member which supports said mover; and
- said motor driving apparatus is the motor driving apparatus as defined in claim 1.

17. A motor driving apparatus for driving a linear vibration motor having a mover which is reciprocatably provided and a spring member which supports the mover, said motor driving apparatus including:
- a motor driver for applying a driving current and a driving voltage to the linear vibration motor;
- a current detection unit for detecting a current that is applied from the said motor driver to the linear vibration motor;
- a voltage detection unit for detecting a voltage that is applied from said motor driver to the linear vibration motor;
- a resonance frequency detection unit for detecting a resonance frequency of the linear vibration motor from the detected current and the detected voltage;
- a spring constant decision unit for calculating a spring constant of the spring member by multiplying the resonance frequency detected by said resonance frequency detection unit by a twofold of the ratio of the circumference to the diameter, squaring the result of the multiplication, and multiplying the squared value by a mass of the mover; and
- a mover position calculation unit for calculating the position of the mover on the basis of the driving current and the driving voltage, by using the spring constant calculated by said spring constant decision unit.

18. The motor driving apparatus as defined in claim 17, further including a control unit for setting an operation mode to either a driving mode for driving the linear vibration motor to operate a load that is connected to the linear vibration motor, or an arithmetic mode for calculating the spring constant of the spring member, wherein:
- said control unit is operable to temporarily set the operation mode to the arithmetic mode before a start of the operation of the load;
- said spring constant calculation unit is operable to calculate the spring constant in the arithmetic mode before the start of the operation of the load; and said mover position calculation unit is operable to calculate the position of the mover in the driving mode by using the spring constant that has been calculated before the start of the operation of the load.

19. The motor driving apparatus as defined in claim 17, further including a control unit for setting an operation mode to either a driving mode for driving the linear vibration motor to operate a load that is connected to the linear vibration motor, or an arithmetic mode for calculating the spring constant of the spring member, wherein:
- said control unit is operable to temporarily set the operation mode to the arithmetic mode after a completion of the operation of the load;
- said spring constant calculation unit is operable to calculate the spring constant in the arithmetic mode after the completion of the operation of the load; and
- said mover position calculation unit is operable to calculate the position of the mover in the driving mode by using the spring constant that has been calculated in a recently set arithmetic mode.

20. The motor driving apparatus as defined in claim 17, further including:
- a control unit for setting an operation mode to either a driving mode for driving the linear vibration motor to operate a load that is connected to the linear vibration motor, or an arithmetic mode for calculating the spring constant of the spring member;
- a temperature detection unit for detecting a temperature of the linear vibration motor; and
- a spring constant estimation unit for estimating the spring constant in a load operating state, wherein:
- said control unit is operable to temporarily set the operation mode to the arithmetic mode at least one of before a start of the operation of the load and after a completion of the operation of the load;
- said spring constant estimation unit is operable to,
  - in the arithmetic mode, derive a relationship between the temperature of the linear vibration motor and the spring constant on the basis of the calculated spring constant and the temperature that is detected by said temperature detection unit when the spring constant is calculated, and
  - in the driving mode, estimate the spring constant in the load operating state on the basis of the temperature detected by said temperature detection unit by using the derived relationship between the temperature and the spring constant; and
- said mover position calculation unit is operable to calculate the position of the mover in the driving mode by using the spring constant estimated by said spring constant estimation unit.

21. An air conditioner provided with a compressor which has a cylinder and a piston, and for compressing a liquid in the cylinder by a reciprocating motion of the piston, said air conditioner including:
- a linear vibration motor for making the piston reciprocate, said linear vibration motor having a mover which is reciprocatably provided, and a spring member which supports said mover; and
- a motor driving apparatus for driving said linear vibration motor;
- wherein said motor driving apparatus is the motor driving apparatus as defined in claim 17.

22. A refrigerator provided with a compressor which has a cylinder and a piston, and for compressing a liquid in the cylinder by a reciprocating motion of the piston, said refrigerator including:
- a linear vibration motor for making the piston reciprocate, said linear vibration motor having a mover which is reciprocatably provided, and a spring member which supports said mover; and
- a motor driving apparatus for driving said linear vibration motor;
- wherein said motor driving apparatus is the motor driving apparatus as defined in claim 17.

23. A cryogenic freezer provided with a compressor which has a cylinder and a piston, and for compressing a liquid in the cylinder by a reciprocating motion of the piston, said cryogenic freezer including:
- a linear vibration motor for making the piston reciprocate, said linear vibration motor having a mover which is reciprocatably provided, and a spring member which supports said mover; and
- a motor driving apparatus for driving said linear vibration motor;
- wherein said motor driving apparatus is the motor driving apparatus as defined in claim 17.

24. A hot-water supply unit provided with a compressor which has a cylinder and a piston, and for compressing a liquid in the cylinder by a reciprocating motion of the piston, said hot-water supply unit including:

a linear vibration motor for making the piston reciprocate, said linear vibration motor having a mover which is reciprocatably provided, and a spring member which supports said mover; and a motor driving apparatus for driving said linear vibration motor;

wherein said motor driving apparatus is the motor driving apparatus as defined in claim 17.

25. A handy phone comprising a linear vibration motor for generating vibration, and a motor driving apparatus for driving said linear vibration motor, wherein:

said linear vibration motor has a mover which is reciprocatably provided, and a spring member which supports said mover; and said motor driving apparatus is the motor driving apparatus as defined in claim 17.

26. A motor driving apparatus for driving a linear vibration motor having a mover which is reciprocatably provided and a spring member which supports the mover, said motor driving apparatus including:

a mover force vibration unit for making the mover freely vibrate;

a vibration parameter obtaining unit for obtaining a natural vibration parameter that shows natural vibration of the mover on the basis of a free vibration state of the mover;

a mass/spring ratio decision unit for deciding a mass/spring ratio that is a ratio between a mass of the mover and a spring constant of the spring member by using the natural vibration parameter obtained by said vibration parameter obtaining unit; and a mover position calculation unit for calculating the position of the mover on the basis of a driving current and a driving voltage which are applied to the linear vibration motor, by using the mass/spring ratio decided by said mass/spring ratio decision unit.

27. The motor driving apparatus as defined in claim 26, wherein said vibration parameter obtaining unit includes:

a timing detection unit for detecting a timing when the freely vibrating mover passes through a prescribed relative position with respect to a reference position of the vibration; and a natural frequency detection unit for detecting a natural frequency as the natural vibration parameter of the mover on the basis of an output from said timing detection unit, and wherein said mass/spring ratio decision unit is operable to decide the mass/spring ratio by multiplying the natural frequency detected by said natural frequency detection unit by a twofold of the ratio of the circumference to the diameter, squaring the result of the multiplication, and calculating an inverse of the squared value.

28. The motor driving apparatus as defined in claim 26 wherein said vibration parameter obtaining unit includes:

a timing detection unit for detecting a timing when the freely vibrating mover passes through a prescribed relative position with respect to a reference position of the vibration; and a natural angular frequency detection unit for detecting a natural angular frequency as the natural vibration parameter of the mover on the basis of an output from said timing detection unit, and wherein said mass/spring ratio decision unit is operable to calculate the mass/spring ratio by squaring the natural angular frequency detected by said natural angular frequency detection unit and calculating an inverse of the squared natural angular frequency.

29. The motor driving apparatus as defined in claim 26, wherein said vibration parameter obtaining unit includes:

a timing detection unit for detecting a timing when the freely vibrating mover passes through a prescribed relative position with respect to a reference position of the vibration; and a natural frequency period detection unit for detecting a natural frequency period as the natural vibration parameter of the mover on the basis of an output from said timing detection unit, and wherein said mass/spring ratio decision unit is operable to decide the mass/spring ratio by dividing the natural frequency period detected by said natural frequency detection unit by a twofold of the ratio of the circumference to the diameter, and squaring the result of the division.

30. The motor driving apparatus as defined in claim 26, wherein said vibration parameter obtaining unit includes a timing detection unit operable to detect a timing when the freely vibrating mover passes through a prescribed relative position with respect to a reference position of the vibration by using an induced voltage that occurs on a coil of the linear vibration motor due to the free vibration of the mover.

31. The motor driving apparatus as defined in claim 26, wherein said mover force vibration unit is operable to mechanically apply a force to the mover so that the mover freely vibrates.

32. The motor driving apparatus as defined in claim 26, wherein said mover force vibration unit is operable to temporarily cut off the current that is apppplied to the linear vibration motor so that the mover freely vibrates.

33. The motor driving apparatus as defined in claim 26, wherein said mover force vibration unit is operable to disconnect a load that is connected to the linear vibration motor so that the mover freely vibrates.

34. The motor driving apparatus as defined in claim 26, further including a control unit for setting an operation mode to either a driving mode for driving the linear vibration motor to operate a load that is connected to the linear vibration motor, or an arithmetic mode for calculating the mass/spring ratio, wherein:

said control unit is operable to temporarily set the operation mode to the arithmetic mode before a start of the operation of the load;

said mass/spring ratio decision unit is operable to decide the mass/spring ratio in the arithmetic mode before the start of the operation of the load; and said mover position calculation unit is operable to calculate the position of the mover in the driving mode by using the mass/spring ratio that has been calculated before the start of the operation of the load.

35. The motor driving apparatus as defined in claim 26, further including a control unit for setting an operation mode to either a driving mode for driving the linear vibration motor to operate a load that is connected to the linear vibration motor, or an arithmetic mode for calculating the mass/spring ratio, wherein:

said control unit is operable to temporarily set the operation mode to the arithmetic mode after a completion of the operation of the load;

said mass/spring ratio decision unit is operable to decide the mass/spring ratio in the arithmetic mode after the completion of the operation of the load; and said mover position calculation unit is operable to calculate the position of the mover in the driving mode by using the mass/spring ratio that has been calculated in a recently set arithmetic mode.

36. The motor driving apparatus as defined in claim 26, further including:

a control unit for setting an operation mode to either a driving mode for driving the linear vibration motor to operate a load that is connected to the linear vibration motor, or an arithmetic mode for calculating the mass/spring ratio;

a temperature detection unit for detecting a temperature of the linear vibration motor;

a mass/spring ratio estimation unit for estimating the mass/spring ratio in a load operating state, wherein:

said control unit temporarily is operable to set the operation mode to the arithmetic mode at least one of before a start of the operation of the load and after a completion of the operation of the load;

said mass/spring ratio estimation unit is operable to,
in the arithmetic mode, derive a relationship between the temperature of the linear vibration motor and the mass/spring ratio on the basis of the calculated mass/spring ratio and the temperature that is detected by said temperature detection unit when the mass/spring ratio is calculated, and in the driving mode, estimate the mass/spring ratio in the load operating state on the basis of the temperature detected by said temperature detection unit by using the derived relationship between the temperature and the mass/spring ratio; and said mover position calculation unit is operable to calculate the position of the mover in the driving mode by using the mass/spring ratio estimated by said mass/spring ratio estimation unit.

37. An air conditioner provided with a compressor which has a cylinder and a piston, and for compressing a liquid in the cylinder by a reciprocating motion of the piston, said air conditioner including:

a linear vibration motor for making the piston reciprocate, said linear vibration motor having a mover which is reciprocatably provided, and a spring member which supports said mover; and a motor driving apparatus for driving said linear vibration motor;

wherein said motor driving apparatus is the motor driving apparatus as defined in claim 26.

38. A refrigerator provided with a compressor which has a cylinder and a piston, and for compressing a liquid in the cylinder by a reciprocating motion of the piston, said refrigerator including:

a linear vibration motor for making the piston reciprocate, said linear vibration motor having a mover which is reciprocatably provided, and a spring member which supports said mover; and a motor driving apparatus for driving said linear vibration motor;

wherein said motor driving apparatus is the motor driving apparatus as defined in claim 26.

39. A cryogenic freezer provided with a compressor which has a cylinder and a piston, and for compressing a liquid in the cylinder by a reciprocating motion of the piston, said cryogenic freezer including:

a linear vibration motor for making the piston reciprocate, said linear vibration motor having a mover which is reciprocatably provided, and a spring member which supports said mover; and a motor driving apparatus for driving said linear vibration motor;

wherein said motor driving apparatus is the motor driving apparatus as defined in claim 26.

40. A hot-water supply unit provided with a compressor which has a cylinder and a piston, and for compressing a liquid in the cylinder by a reciprocating motion of the piston, said lot-water supply unit including:

a linear vibration motor for making the piston reciprocate, said linear vibration motor having a mover which is reciprocatably provided, and a spring member which supports said mover; and a motor driving apparatus for driving said linear vibration motor;

wherein said motor driving apparatus is the motor driving apparatus as defined in claim 26.

41. A handy phone comprising a linear vibration motor for generating vibration, and a motor driving apparatus for driving said linear vibration motor, wherein:

said linear vibration motor has a mover which is reciprocatably provided, and a spring member which supports the mover; and said motor driving apparatus is the motor driving apparatus as defined in claim 26.

42. A motor driving apparatus for driving a linear vibration motor having a mover which is reciprocatably provided and a spring member which supports the mover, said motor driving apparatus including:

a motor driver for applying a driving current and a driving voltage to the linear vibration motor;

a current detection unit for detecting a current that is applied from said motor driver to the linear vibration motor;

a voltage detection unit for detecting a voltage that is applied from said motor driver to the linear vibration motor;

a resonance frequency detection unit for detecting a resonance frequency of the linear vibration motor from the detected current and the detected voltage;

a mass/spring ratio decision unit for deciding a mass/spring ratio by multiplying the resonance frequency detected by said resonance frequency detection unit by a twofold of the ratio of the circumference to the diameter, squaring the result of the multiplication, and calculating an inverse of the squared value; and a mover position calculation unit for calculating the position of the mover on the basis of the driving current and the driving voltage, by using the mass/spring ratio decided by said mass/spring ratio decision unit.

43. The motor driving apparatus as defined in claim 42, further including a control unit for setting an operation mode to either a driving mode for driving the linear vibration motor to operate a load that is connected to the linear vibration motor, or an arithmetic mode for calculating the mass/spring ratio, wherein:

said control unit is operable to temporarily set the operation mode to the arithmetic mode before a start of the operation of the load;

said mass/spring ratio decision unit is operable to decide the mass/spring ratio in the arithmetic mode before the start of the operation of the load; and said mover position calculation unit is operable to calculate the position of the mover in the driving mode by using the mass/spring ratio that has been calculated before the start of the operation of the load.

44. The motor driving apparatus as defined in claim 42, further including a control unit for setting an operation mode to either a driving mode for driving the linear vibration motor to operate a load that is connected to the linear vibration motor, or an arithmetic mode for calculating the mass/spring ratio, wherein:
   said control unit is operable to temporarily set the operation mode to the arithmetic mode after a completion of the operation of the load;
   said mass/spring ratio decision unit is operable to decide the mass/spring ratio in the arithmetic mode after the completion of the operation of the load; and
   said mover position calculation unit is operable to calculate the position of the mover in the driving mode by using the mass/spring ratio that has been calculated in a recently set arithmetic mode.

45. The motor driving apparatus as defined in claim 42, further including:
   a control unit for setting an operation mode to either a driving mode for driving the linear vibration motor to operate a load that is connected to the linear vibration motor, or an arithmetic mode for calculating the mass/spring ratio;
   a temperature detection unit for detecting a temperature of the linear vibration motor;
   a mass/spring ratio estimation unit for estimating the mass/spring ratio in a load operating state, wherein:
   said control unit is operable to temporarily set the operation mode to the arithmetic mode at least one of before a start of the operation of the load and after a completion of the operation of the load;
   said mass/spring ratio estimation unit is operable to,
      in the arithmetic mode, derive a relationship between the temperature of the linear vibration motor and the mass/spring ratio on the basis of the calculated mass/spring ratio and the temperature that is detected by said temperature detection unit when the mass/spring ratio is calculated, and
      in the driving mode, estimate the mass/spring ratio in the load operating state on the basis of the temperature detected by said temperature detection unit by using the derived relationship between the temperature and the mass/spring ratio; and
   said mover position calculation unit is operable to calculate the position of the mover in the driving mode by using the mass/spring ratio estimated by said mass/spring ratio estimation unit.

46. An air conditioner provided with a compressor which has a cylinder and a piston, and for compressing a liquid in the cylinder by a reciprocating motion of the piston, said air conditioner including:
   a linear vibration motor for making the piston reciprocate, said linear vibration motor having a mover which is reciprocatably provided, and a spring member which supports said mover; and
   a motor driving apparatus for driving said linear vibration motor;
   wherein said motor driving apparatus is the motor driving apparatus as defined in claim 42.

47. A refrigerator provided with a compressor which has a cylinder and a piston, and for compressing a liquid in the cylinder by a reciprocating motion of the piston, said refrigerator including:
   a linear vibration motor for making the piston reciprocate, said linear vibration motor having a mover which is reciprocatably provided, and a spring member which supports said mover; and
   a motor driving apparatus for driving said linear vibration motor;
   wherein said motor driving apparatus is the motor driving apparatus as defined in claim 42.

48. A cryogenic freezer provided with a compressor which has a cylinder and a piston, and for compressing a liquid in the cylinder by a reciprocating motion of the piston, said cryogenic freezer including:
   a linear vibration motor for making the piston reciprocate, said linear vibration motor having a mover which is reciprocatably provided, and a spring member which supports said mover; and
   a motor driving apparatus for driving said linear vibration motor;
   wherein said motor driving apparatus is the motor driving apparatus as defined in claim 42.

49. A hot-water supply unit provided with a compressor which has a cylinder and a piston, and for compressing a liquid in the cylinder by a reciprocating motion of the piston, said hot-water supply unit including:
   a linear vibration motor for making the piston reciprocate, said linear vibration motor having a mover which is reciprocatably provided, and a spring member which supports said mover; and
   a motor driving apparatus for driving said linear vibration motor;
   wherein said motor driving apparatus is the motor driving apparatus as defined in claim 42.

50. A handy phone comprising a linear vibration motor for generating vibration, and a motor driving apparatus for driving said linear vibration motor, wherein:
   said linear vibration motor has a mover which is reciprocatably provided, and a spring member which supports said mover; and
   said motor driving apparatus is the motor driving apparatus as defined in claim 42.

* * * * *

UNITED STATES PATENT AND TRADEMARK OFFICE
CERTIFICATE OF CORRECTION

| | | |
|---|---|---|
| PATENT NO. | : 7,151,348 B1 | |
| APPLICATION NO. | : 10/822805 | |
| DATED | : December 19, 2006 | |
| INVENTOR(S) | : Mitsuo Ueda et al. | |

It is certified that error appears in the above-identified patent and that said Letters Patent is hereby corrected as shown below:

ON THE TITLE PAGE

In Item (73), replace "Matsushita Electric Industrila Co., Ltd." with -- Matsushita Electric Industrial Co., Ltd.--.

In Item (56), line 6, replace "6,880,403 B1*" with --6,880,403 B2*--.

In Item (56), line 7, replace "6,960,893 B1*" with --6,960,893 B2*--.

In column 66, claim 12, line 28, replace "motor;" with --motor,--.

In column 66, claim 13, line 40, replace "motor;" with --motor,--.

In column 66, claim 14, line 44, replace "piston, for" with --piston, and for--.

In column 66, claim 14, line 52, replace "motor;" with --motor,--.

In column 66, claim 15, line 64, replace "motor;" with --motor,--.

In column 67, claim 17, line 16, delete "the" after "from".

In column 67, claim 18, line 46, start a new paragraph after "...operation of the load; and".

In column 68, claim 21, line 41, replace "motor;" with --motor,--.

In column 68, claim 22, line 53, replace "motor;" with --motor,--.

In column 68, claim 23, line 65, replace "motor;" with --motor,--.

In column 69, claim 24, line 10, replace "motor;" with --motor,--.

In column 70, claim 32, line 35, replace "appplied" with --applied--.

In column 71, claim 37, line 48, replace "motor;" with --motor,--.

In column 71, claim 38, line 60, replace "motor;" with --motor,--.

UNITED STATES PATENT AND TRADEMARK OFFICE
CERTIFICATE OF CORRECTION

PATENT NO. : 7,151,348 B1
APPLICATION NO. : 10/822805
DATED : December 19, 2006
INVENTOR(S) : Mitsuo Ueda et al.

It is certified that error appears in the above-identified patent and that said Letters Patent is hereby corrected as shown below:

In column 72, claim 39, line 6, replace "motor;" with --motor,--.

In column 72, claim 40, line 18, replace "motor;" with --motor,--.

In column 72, claim 40, line 12, replace "lot-water" to --hot-water--.

In column 74, claim 46, line 2, replace "motor;" with --motor,--.

In column 74, claim 47, line 14, replace "motor;" with --motor,--.

In column 74, claim 48, line 26, replace "motor;" with --motor,--.

In column 74, claim 49, line 38, replace "motor;" with --motor,--.

Signed and Sealed this

Third Day of July, 2007

JON W. DUDAS
*Director of the United States Patent and Trademark Office*